United States Patent
Crouch et al.

(10) Patent No.: US 12,196,854 B2
(45) Date of Patent: Jan. 14, 2025

(54) LIDAR SYSTEM TO ADJUST DOPPLER EFFECTS

(71) Applicant: Aurora Operations, Inc., Pittsburgh, PA (US)

(72) Inventors: Stephen C. Crouch, Bozeman, MT (US); Randy R. Reibel, Bozeman, MT (US); James Curry, Bozeman, MT (US); Michelle Milvich, Bozeman, MT (US); Krishna Rupavatharam, Bozeman, MT (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 8 days.

(21) Appl. No.: 18/099,842

(22) Filed: Jan. 20, 2023

(65) Prior Publication Data

US 2023/0161038 A1    May 25, 2023

(51) Int. Cl.
*G01S 17/32* (2020.01)
*G01S 7/487* (2006.01)
(Continued)

(52) U.S. Cl.
CPC .............. *G01S 17/32* (2013.01); *G01S 7/487* (2013.01); *G01S 17/26* (2020.01); *G01S 17/42* (2013.01); *G01S 17/58* (2013.01); *G01S 7/51* (2013.01)

(58) Field of Classification Search
None
See application file for complete search history.

(56) References Cited

U.S. PATENT DOCUMENTS

| 4,099,249 A | 7/1978 | Casasent |
| 4,620,192 A | 10/1986 | Collins |

(Continued)

FOREIGN PATENT DOCUMENTS

| CA | 3222242 A1 | 6/2024 |
| CN | 101346773 A | 1/2009 |

(Continued)

OTHER PUBLICATIONS

Stamatis et al.,"3D automatic target recognition for future LIDAR missiles", Dec. 2016, IEEE Transactions on Aerospace and Electronic Systems 52(6):2662-2675, DOI:10.1109/TAES.2016.150300.

(Continued)

*Primary Examiner* — Hovhannes Baghdasaryan
(74) *Attorney, Agent, or Firm* — FOLEY & LARDNER LLP

(57) ABSTRACT

Doppler correction of phase-encoded LIDAR includes a code indicating a sequence of phases for a phase-encoded signal, and determining a first Fourier transform of the signal. A laser optical signal is used as a reference and modulated based on the code to produce a transmitted phase-encoded optical signal. A returned optical signal is received in response. The returned optical signal is mixed with the reference. The mixed optical signals are detected to produce an electrical signal. A cross spectrum is determined between in-phase and quadrature components of the electrical signal. A Doppler shift is based on a peak in the cross spectrum. A device is operated based on the Doppler shift. Sometimes a second Fourier transform of the electrical signal and the Doppler frequency shift produce a corrected Fourier transform and then a cross correlation. A range is determined based on a peak in the cross correlation.

20 Claims, 22 Drawing Sheets

(51) Int. Cl.
  *G01S 17/26* (2020.01)
  *G01S 17/42* (2006.01)
  *G01S 17/58* (2006.01)
  *G01S 7/51* (2006.01)

(56) References Cited

U.S. PATENT DOCUMENTS

| | | |
|---|---|---|
| 4,648,276 A | 3/1987 | Klepper et al. |
| 4,804,893 A | 2/1989 | Melocik |
| 5,043,553 A | 8/1991 | Corfe et al. |
| 5,075,864 A | 12/1991 | Sakai |
| 5,216,534 A | 6/1993 | Boardman et al. |
| 5,223,986 A | 6/1993 | Mayerjak et al. |
| 5,227,910 A | 7/1993 | Khattak |
| 5,231,401 A | 7/1993 | Kaman et al. |
| 5,461,505 A | 10/1995 | Nishikawa et al. |
| 5,687,017 A | 11/1997 | Katoh et al. |
| 5,781,156 A | 7/1998 | Krasner |
| 5,828,585 A | 10/1998 | Welk et al. |
| 5,947,903 A | 9/1999 | Ohtsuki et al. |
| 5,999,302 A | 12/1999 | Sweeney et al. |
| 6,029,496 A | 2/2000 | Kreft |
| 6,211,888 B1 | 4/2001 | Ohtsuki et al. |
| 6,671,595 B2 | 12/2003 | Lu et al. |
| 6,753,950 B2 | 6/2004 | Morcom |
| 6,871,148 B2 | 3/2005 | Morgen et al. |
| 6,931,055 B1 | 8/2005 | Underbrink et al. |
| 7,122,691 B2 | 10/2006 | Oshima et al. |
| 7,152,490 B1 | 12/2006 | Freund et al. |
| 7,486,802 B2 | 2/2009 | Hougen |
| 7,511,824 B2 | 3/2009 | Sebastian et al. |
| 7,639,347 B2 | 12/2009 | Eaton |
| 7,742,152 B2 | 6/2010 | Hui et al. |
| 7,917,039 B1 | 3/2011 | Delfyett |
| 8,135,513 B2 | 3/2012 | Bauer et al. |
| 8,531,650 B2 | 9/2013 | Feldkhun et al. |
| 8,751,155 B2 | 6/2014 | Lee |
| 8,805,197 B2 | 8/2014 | Delfyett |
| 8,818,609 B1 | 8/2014 | Boyko et al. |
| 8,831,780 B2 | 9/2014 | Zelivinski et al. |
| 8,954,252 B1 | 2/2015 | Urmson et al. |
| 9,041,915 B2 | 5/2015 | Earhart et al. |
| 9,046,909 B2 | 6/2015 | Leibowitz et al. |
| 9,086,273 B1 | 7/2015 | Gruver et al. |
| 9,097,800 B1 | 8/2015 | Zhu |
| 9,257,048 B1 | 2/2016 | Offer et al. |
| 9,348,137 B2 | 5/2016 | Plotkin et al. |
| 9,383,753 B1 | 7/2016 | Templeton et al. |
| 9,607,220 B1 | 3/2017 | Smith et al. |
| 9,618,742 B1 | 4/2017 | Droz et al. |
| 9,753,462 B2 | 9/2017 | Gilliland et al. |
| 10,036,812 B2 | 7/2018 | Crouch et al. |
| 10,231,705 B2 | 3/2019 | Lee |
| 10,345,434 B2 | 7/2019 | Hinderling et al. |
| 10,422,649 B2 | 9/2019 | Engelman et al. |
| 10,485,508 B2 | 11/2019 | Miyaji et al. |
| 10,520,602 B2 | 12/2019 | Villeneuve et al. |
| 10,534,084 B2 | 1/2020 | Crouch et al. |
| 10,568,258 B2 | 2/2020 | Wahlgren |
| 10,571,567 B2 | 2/2020 | Campbell et al. |
| 11,002,856 B2 | 5/2021 | Heidrich et al. |
| 11,041,954 B2 | 6/2021 | Crouch et al. |
| 11,249,192 B2 | 2/2022 | Crouch et al. |
| 11,402,506 B2 | 8/2022 | Ohtomo et al. |
| 11,402,834 B2 | 8/2022 | Yang et al. |
| 11,441,899 B2 | 9/2022 | Pivac et al. |
| 11,537,808 B2 | 12/2022 | Crouch et al. |
| 11,822,010 B2 | 11/2023 | Angus et al. |
| 2002/0071109 A1 | 6/2002 | Allen et al. |
| 2002/0140924 A1 | 10/2002 | Wangler et al. |
| 2002/0180868 A1 | 12/2002 | Lippert et al. |
| 2003/0117312 A1 | 6/2003 | Nakanishi et al. |
| 2004/0034304 A1 | 2/2004 | Sumi |
| 2004/0109155 A1 | 6/2004 | Deines |
| 2004/0158155 A1 | 8/2004 | Njemanze |
| 2004/0222366 A1 | 11/2004 | Frick |
| 2005/0149240 A1 | 7/2005 | Tseng et al. |
| 2006/0132752 A1 | 6/2006 | Kane |
| 2006/0239312 A1 | 10/2006 | Kewitsch et al. |
| 2007/0005212 A1 | 1/2007 | Xu et al. |
| 2007/0181810 A1 | 8/2007 | Tan et al. |
| 2008/0018881 A1 | 1/2008 | Hui et al. |
| 2008/0024756 A1 | 1/2008 | Rogers |
| 2008/0040029 A1 | 2/2008 | Breed |
| 2008/0100822 A1 | 5/2008 | Munro |
| 2009/0002679 A1 | 1/2009 | Ruff et al. |
| 2009/0009842 A1 | 1/2009 | Destain et al. |
| 2009/0030605 A1 | 1/2009 | Breed |
| 2009/0059201 A1* | 3/2009 | Willner .................. G01S 17/58 356/5.01 |
| 2010/0094499 A1 | 4/2010 | Anderson |
| 2010/0183309 A1 | 7/2010 | Etemad et al. |
| 2010/0188504 A1 | 7/2010 | Dimsdale et al. |
| 2010/0312432 A1 | 12/2010 | Hamada et al. |
| 2011/0007299 A1 | 1/2011 | Moench et al. |
| 2011/0013245 A1 | 1/2011 | Tanaka et al. |
| 2011/0015526 A1 | 1/2011 | Tamura |
| 2011/0026007 A1 | 2/2011 | Gammenthaler |
| 2011/0026008 A1 | 2/2011 | Gammenthaler |
| 2011/0205523 A1 | 8/2011 | Rezk et al. |
| 2011/0292371 A1 | 12/2011 | Chang |
| 2012/0038902 A1 | 2/2012 | Dotson |
| 2012/0044556 A1 | 2/2012 | Yamada |
| 2012/0083960 A1 | 4/2012 | Zhu et al. |
| 2012/0127252 A1 | 5/2012 | Lim et al. |
| 2012/0229627 A1 | 9/2012 | Wang |
| 2012/0274922 A1 | 11/2012 | Hodge |
| 2012/0281907 A1 | 11/2012 | Samples et al. |
| 2012/0306383 A1 | 12/2012 | Munro |
| 2013/0104661 A1 | 5/2013 | Klotz et al. |
| 2013/0120989 A1 | 5/2013 | Sun et al. |
| 2013/0268163 A1 | 10/2013 | Comfort et al. |
| 2013/0279392 A1 | 10/2013 | Rubin et al. |
| 2013/0279393 A1 | 10/2013 | Rubin et al. |
| 2013/0279491 A1 | 10/2013 | Rubin et al. |
| 2013/0325244 A1 | 12/2013 | Wang et al. |
| 2014/0036252 A1 | 2/2014 | Amzajerdian et al. |
| 2014/0064607 A1 | 3/2014 | Grossmann et al. |
| 2015/0005993 A1 | 1/2015 | Breuing |
| 2015/0006117 A1 | 1/2015 | Zhang et al. |
| 2015/0046119 A1 | 2/2015 | Sandhawalia et al. |
| 2015/0130607 A1 | 5/2015 | MacArthur |
| 2015/0160332 A1 | 6/2015 | Sebastian et al. |
| 2015/0177379 A1 | 6/2015 | Smith et al. |
| 2015/0185244 A1 | 7/2015 | Inoue et al. |
| 2015/0260836 A1 | 9/2015 | Hayakawa |
| 2015/0267433 A1 | 9/2015 | Leonessa et al. |
| 2015/0269438 A1 | 9/2015 | Samarasekera et al. |
| 2015/0270838 A1 | 9/2015 | Chan et al. |
| 2015/0282707 A1 | 10/2015 | Tanabe et al. |
| 2015/0323660 A1 | 11/2015 | Hampikian |
| 2015/0331103 A1 | 11/2015 | Jensen |
| 2015/0331111 A1 | 11/2015 | Newman et al. |
| 2016/0078303 A1 | 3/2016 | Samarasekera et al. |
| 2016/0084946 A1 | 3/2016 | Turbide |
| 2016/0091599 A1 | 3/2016 | Jenkins |
| 2016/0123720 A1 | 5/2016 | Thorpe et al. |
| 2016/0125739 A1 | 5/2016 | Stewart et al. |
| 2016/0216366 A1 | 7/2016 | Phillips et al. |
| 2016/0245903 A1 | 8/2016 | Kalscheur et al. |
| 2016/0260324 A1 | 9/2016 | Tummala et al. |
| 2016/0266243 A1 | 9/2016 | Marron |
| 2016/0274589 A1 | 9/2016 | Templeton et al. |
| 2016/0299228 A1 | 10/2016 | Maleki et al. |
| 2016/0302010 A1 | 10/2016 | Sebastian et al. |
| 2016/0350926 A1 | 12/2016 | Flint et al. |
| 2016/0377721 A1 | 12/2016 | Lardin et al. |
| 2016/0377724 A1 | 12/2016 | Crouch et al. |
| 2017/0160541 A1 | 6/2017 | Carothers et al. |
| 2017/0248691 A1 | 8/2017 | McPhee et al. |
| 2017/0299697 A1 | 10/2017 | Swanson |
| 2017/0329014 A1 | 11/2017 | Moon et al. |
| 2017/0329332 A1 | 11/2017 | Pilarski et al. |
| 2017/0343652 A1 | 11/2017 | De Mersseman et al. |

(56) References Cited

U.S. PATENT DOCUMENTS

| | | |
|---|---|---|
| 2017/0350964 A1 | 12/2017 | Kaneda |
| 2017/0350979 A1 | 12/2017 | Uyeno et al. |
| 2017/0356983 A1 | 12/2017 | Jeong et al. |
| 2018/0003805 A1 | 1/2018 | Popovich et al. |
| 2018/0136000 A1 | 5/2018 | Rasmusson et al. |
| 2018/0188355 A1 | 7/2018 | Bao et al. |
| 2018/0224547 A1 | 8/2018 | Crouch et al. |
| 2018/0267556 A1 | 9/2018 | Templeton et al. |
| 2018/0276986 A1 | 9/2018 | Delp |
| 2018/0284286 A1 | 10/2018 | Eichenholz et al. |
| 2018/0299534 A1 | 10/2018 | LaChapelle et al. |
| 2018/0307913 A1 | 10/2018 | Finn et al. |
| 2019/0064831 A1 | 2/2019 | Gali et al. |
| 2019/0086514 A1 | 3/2019 | Dussan et al. |
| 2019/0107606 A1 | 4/2019 | Russell et al. |
| 2019/0154439 A1 | 5/2019 | Binder |
| 2019/0154807 A1 | 5/2019 | Steinkogler et al. |
| 2019/0154816 A1 | 5/2019 | Hughes et al. |
| 2019/0154832 A1 | 5/2019 | Maleki et al. |
| 2019/0154835 A1 | 5/2019 | Maleki et al. |
| 2019/0258251 A1 | 8/2019 | Ditty et al. |
| 2019/0310351 A1 | 10/2019 | Hughes et al. |
| 2019/0310469 A1 | 10/2019 | Sapir |
| 2019/0317219 A1 | 10/2019 | Smith et al. |
| 2019/0318206 A1 | 10/2019 | Smith et al. |
| 2019/0346856 A1 | 11/2019 | Berkemeier et al. |
| 2019/0361119 A1 | 11/2019 | Kim et al. |
| 2020/0025879 A1 | 1/2020 | Pacala et al. |
| 2020/0049819 A1 | 2/2020 | Cho et al. |
| 2020/0049879 A1 | 2/2020 | Sato |
| 2020/0182978 A1 | 6/2020 | Maleki et al. |
| 2020/0192082 A1 | 6/2020 | Zhou et al. |
| 2020/0249349 A1 | 8/2020 | Steinberg |
| 2021/0089047 A1 | 3/2021 | Smith et al. |
| 2021/0165102 A1 | 6/2021 | Crouch et al. |
| 2021/0302579 A1 | 9/2021 | Jin |
| 2021/0325664 A1 | 10/2021 | Adams et al. |
| 2021/0349196 A1 | 11/2021 | Wang et al. |
| 2022/0057626 A1 | 2/2022 | Wang et al. |
| 2022/0057627 A1 | 2/2022 | Lee et al. |
| 2022/0260686 A1 | 8/2022 | Wang et al. |
| 2022/0413260 A1 | 12/2022 | Gassend et al. |
| 2023/0025474 A1 | 1/2023 | Baker et al. |
| 2024/0280703 A1 | 8/2024 | Petilli et al. |

FOREIGN PATENT DOCUMENTS

| | | |
|---|---|---|
| CN | 102150007 A | 8/2011 |
| CN | 103227559 A | 7/2013 |
| CN | 103608696 A | 2/2014 |
| CN | 104793619 A | 7/2015 |
| CN | 104914445 A | 9/2015 |
| CN | 104956400 A | 9/2015 |
| CN | 105116922 A | 12/2015 |
| CN | 105425245 A | 3/2016 |
| CN | 105629258 A | 6/2016 |
| CN | 105652282 A | 6/2016 |
| CN | 105713730 | 6/2016 |
| CN | 107015238 A | 8/2017 |
| CN | 107024686 A | 8/2017 |
| CN | 107193011 A | 9/2017 |
| CN | 207318710 U | 5/2018 |
| DE | 10 2004 050 682 A1 | 6/2005 |
| DE | 10 2007 001 103 A1 | 7/2008 |
| DE | 10 2017 200 692 A1 | 8/2018 |
| EP | 1 298 453 A2 | 4/2003 |
| EP | 1 298 453 B1 | 4/2003 |
| EP | 2 243 042 B1 | 10/2010 |
| EP | 3 330 766 A1 | 6/2018 |
| FR | 2568688 A1 | 2/1986 |
| GB | 2 349 231 A | 10/2000 |
| JP | S63-071674 A | 4/1988 |
| JP | H06-148556 A | 5/1994 |
| JP | H09-257415 A | 10/1997 |
| JP | H09-325290 A | 12/1997 |
| JP | 2765767 B2 | 6/1998 |
| JP | H11-153664 A | 6/1999 |
| JP | 2000-338244 A | 12/2000 |
| JP | 2002-249058 A | 9/2002 |
| JP | 3422720 B2 | 6/2003 |
| JP | 2003-185738 A | 7/2003 |
| JP | 2006-148556 A | 6/2006 |
| JP | 2006-226931 A | 8/2006 |
| JP | 2007-155467 A | 6/2007 |
| JP | 2007-214564 A | 8/2007 |
| JP | 2007-214694 A | 8/2007 |
| JP | 2009-257415 A | 11/2009 |
| JP | 2009-288255 A | 12/2009 |
| JP | 2009-291294 A | 12/2009 |
| JP | 2011-044750 A | 3/2011 |
| JP | 2011-107165 A | 6/2011 |
| JP | 2011-203122 A | 10/2011 |
| JP | 2012-502301 A | 1/2012 |
| JP | 2012-103118 A | 5/2012 |
| JP | 2012-154863 A | 8/2012 |
| JP | 2015-125062 A | 7/2015 |
| JP | 2015-172510 A | 10/2015 |
| JP | 2015-212942 A | 11/2015 |
| JP | 2015-535925 A | 12/2015 |
| JP | 2017-138219 A | 8/2017 |
| JP | 2017-524918 A | 8/2017 |
| JP | 2018-173346 A | 11/2018 |
| JP | 2018-204970 A | 12/2018 |
| KR | 2018-0058068 A | 5/2018 |
| KR | 2018-0126927 A | 11/2018 |
| TW | 201516612 A | 5/2015 |
| TW | 201818183 A | 5/2018 |
| TW | 201832039 A | 9/2018 |
| TW | 201833706 A | 9/2018 |
| TW | 202008702 A | 2/2020 |
| WO | WO-2007/124063 A2 | 11/2007 |
| WO | WO-2010/127151 A2 | 11/2010 |
| WO | WO-2011/102130 A1 | 8/2011 |
| WO | WO-2014/011241 A2 | 1/2014 |
| WO | WO-2014/132020 A1 | 9/2014 |
| WO | WO-2015/037173 A1 | 3/2015 |
| WO | WO-2016/134321 A1 | 8/2016 |
| WO | WO-2016/164435 A1 | 10/2016 |
| WO | WO-2017/018065 A1 | 2/2017 |
| WO | WO-2018/066069 A1 | 4/2018 |
| WO | WO-2018/067158 A1 | 4/2018 |
| WO | WO-2018/102188 A1 | 6/2018 |
| WO | WO-2018/102190 A1 | 6/2018 |
| WO | WO-2018/107237 A1 | 6/2018 |
| WO | WO-2018/125438 A2 | 7/2018 |
| WO | WO-2018/144853 A1 | 8/2018 |
| WO | WO-2018/160240 A2 | 9/2018 |
| WO | WO-2019/014177 A1 | 1/2019 |
| WO | WO-2020/062301 A1 | 4/2020 |

OTHER PUBLICATIONS

Adany, P. et al., "Chirped Lidar Using Simplified Homodyne Detection," Journal of Lightwave Technology, vol. 27, No. 16, Aug. 15, 2009, pp. 3351-3357.

Anonymous, "Fundamentals of Direct Digital Synthesis," Analog Devices, MT-085 Tutorial Rev. D, copyright 2009, pp. 1-9.

Anonymous, "Occlusion—Shadows and Occlusion—Peachpit", Jul. 3, 2006 (Jul. 3, 2006), P055697780, Retrieved from the Internet:URL:https://www.peachpit.com/articles/article.aspx?p=486505&seqNum=7[retrieved on May 25, 2020] 2 pages.

Aull, B. et al., "Geiger-Mode Avalanche Photodiodes for Three-Dimensional Imaging," Lincoln Laboratory Journal, vol. 13, No. 2, 2002, pp. 335-350.

Bashkansky, M. et al., "RF phase-coded random-modulation LIDAR," Optics Communications, vol. 231, 2004, pp. 93-98.

Beck, S. et al., "Synthetic-aperture imaging laser radar: laboratory demonstration and signal processing," Applied Optics, vol. 44, No. 35, Dec. 10, 2005, pp. 7621-7629.

Berkovic, G. and Shafir, E., "Optical methods for distance and displacement measurements", Advances in Optics and Photonics, vol. 4, Issue 4, Dec. 2012, pp. 441-471.

(56) References Cited

OTHER PUBLICATIONS

Besl, P. and McKay, N., "A Method for Registration of 3-D shapes", IEEE Transactions on Pattern Analysis and Machine Intelligence, vol. 14, No. 2, Feb. 1992, pp. 239-256.
Campbell, J. et al., "Super-resolution technique for CW lidar using Fourier transform reordering and Richardson-Lucy deconvolution." Optics Letters, vol. 39, No. 24, Dec. 15, 2014, pp. 6981-6984.
Canadian Office Action issued in connection with CA Appl. Ser. No. 3125553 dated Sep. 28, 2022.
Cao, X. et al., "Lidar Signal Depolarization by Solid Targets and its Application to Terrain Mapping and 3D Imagery," Defence R&D, Contract Report DRDC Valcartier CR 2011-236, Mar. 2011, retrieved at URL:http://publications.gc.ca/collections/collection_2016/rddc-drdc/D68-3-236-2011-eng.pdf, pp. 1-74.
Cheng, H., "Autonomous Intelligent Vehicles: Theory, Algorithms, and Implementation", copyright 2011, Springer, retrieved from http://ebookcentral.proquest.com, created from epo-ebooks on Jun. 1, 2020, 24 pages.
Chinese Office Action issued in related CN Appl. Ser. No. 201780081804.0 dated Dec. 1, 2022 (20 pages).
Chinese Office Action on CN Appl. Ser. No. 201880009947.5 dated Oct. 11, 2021 (5 pages).
Contu, F., "The Do's and Don'ts of High Speed Serial Design in FPGA's". Xilinix All Programmable, Copyright 2013, High Speed Digital Design & Validation Seminars 2013, pp. 1-61.
Corrected Notice of Allowance on U.S. Appl. No. 16/725,419 dated May 28, 2020 (2 pages).
Crouch, S. and Barber, Z., "Laboratory demonstrations of interferometric and spotlight synthetic aperture ladar techniques," Optics Express, vol. 20, No. 22, Oct. 22, 2012, pp. 24237-24246.
Crouch, S. et al., "Three dimensional digital holographic aperture synthesis", Optics Express, vol. 23, No. 18, Sep. 7, 2015, pp. 23811-23816.
Dapore, B. et al., "Phase noise analysis of two wavelength coherent imaging system", Optics Express, vol. 21, No. 25, Dec. 16, 2013, pp. 30642-30652.
Decision of Rejection on JP Appl. Ser. No. 2019-527155 dated Jun. 8, 2021 (8 pages).
Decision of Rejection on JP Appl. Ser. No. 2020-559530 dated Aug. 31, 2021 (13 pages).
Duncan, B. and Dierking, M., "Holographic aperture ladar: erratum", Applied Optics, vol. 52, No. 4, Feb. 1, 2013, pp. 706-708.
Duncan, B. et al., "Holographic aperture ladar", Applied Optics, vol. 48, Issue 6, Feb. 20, 2009, pp. 1168-1177.
El Gayar, N. (Ed.) et al., "Multiple Classifier Systems", 9th International Workshop, International Workshop on Multiple Classifier Systems, MCS 2010, Cairo, Egypt, Apr. 7-9, 2010, specifically Farhad Samadzadegan et al., "A Multiple Classifier System for Classification of LIDAR Remote Sensing Data Using Multi-class SVM", pp. 254-263 (337 total pages).
European Office Action on EP 17876731.5 dated Feb. 21, 2022 (5 pages).
Examination Report No. 1 issued in connection with AU Appl. Ser. No. 2021229207 dated Oct. 10, 2022.
Examination Report on EP Appl. Ser. No. 17898933.1 dated May 25, 2022 (5 pages).
Examination Report on EP Appl. Ser. No. 19791789.1 dated Dec. 21, 2021 (12 pages).
Extended European Search Report on EP Appl. Ser. No. 17876081.5 dated Jun. 3, 2020 (9 pages).
Extended European Search Report on EP Appl. Ser. No. 17876731.5 dated Jun. 17, 2020 (14 pages).
Extended European Search Report on EP Appl. Ser. No. 17888807.9 dated Jun. 3, 2020 (9 pages).
Extended European Search Report on EP Appl. Ser. No. 17898933.1 dated May 12, 2020 (7 pages).
Farhad Samadzadegan et al., "A Multiple Classifier System for Classification of LIDAR Remote Sensing Data Using Multi-class SVM", International Workshop on Multiple Classifier Systems, MCS 2010, Lecture Notes in Computer Science, 2010, vol. 5997, pp. 254-263.
Fehr, D. et al., "Compact Covariance descriptors in 3D point clouds for object recognition," presented at the Robotics and Automation (ICRA), May 14, 2012, IEEE International Conference, pp. 1793-1798.
Final Office Action on U.S. Appl. No. 16/464,657 DTD Jun. 30, 2022.
Final Office Action on U.S. Appl. No. 16/875,114 DTD Dec. 22, 2022.
Final Office Action on U.S. Appl. No. 17/592,286 DTD Aug. 18, 2022.
Final Office Action on U.S. Appl. No. 16/725,399 dated Aug. 26, 2020 (57 pages).
Final Rejection on U.S. Appl. No. 17/167,857 dated Oct. 25, 2021 (46 pages).
Final US Office Action on U.S. Appl. No. 17/331,362 dated Nov. 29, 2021 (17 pages).
First Chinese Office Action on CN Appl. Ser. No. 201980087957.5 dated Mar. 7, 2022 (8 pages).
First Office Action on CN Appl. Ser. No. 201780081215.2 dated Mar. 3, 2021 (14 pages).
First Office Action on CN Appl. Ser. No. 201780081968.3 dated Dec. 3, 2020 (6 pages).
First Office Action on CN Appl. Ser. No. 201980033898.3 dated Apr. 20, 2021 (14 pages).
Foreign Action other than Search Report on CN DTD Dec. 1, 2022.
Foreign Action other than Search Report on EP 17876081.5 DTD Jun. 1, 2022.
Foreign Action other than Search Report on EP 17888807.9 DTD Jun. 1, 2022.
Foreign Action other than Search Report on JP DTD Nov. 8, 2022.
Foreign Action other than Search Report on PCT DTD Nov. 24, 2022.
Foucras, M. et al., "Detailed Analysis of the Impact of the Code Doppler on the Acquisition Performance of New GNSS Signals," ION ITM, International Technical Meeting of the Institute of Navigation, San Diego, California, Jan. 27, 2014, pp. 1-13.
Garcia Monreal, J. et al., "Detection of Three Dimensional Objects Based on Phase Encoded Range Images", Sixth International Conference on Correlation Optics, vol. 5477, Jun. 4, 2004, pp. 269-280.
Griggs, R.(Ed.), "Implementation Agreement for Integrated Dual Polarization Micro-Intradyne Coherent Receivers", OIF (Optical Internetworking Forum), IA# OIF-DPC-MRX-01.0, Mar. 31, 2015, pp. 1-32.
Haralick, R. et al., "Image Analysis Using Mathematical Morphology," IEEE Transactions In Pattern Analysis and Machine Intelligence, Jul. 1987, vol. PAMI-9, No. 4, pp. 532-550.
International Preliminary Report and Written Opinion on Patentability on Appl. Ser. No. PCT/US2018/041388 dated Jan. 23, 2020 (12 pages).
International Preliminary Report and Written Opinion on Patentability on Appl. Ser. No. PCT/US2019/028532 dated Oct. 27, 2020 (11 pages).
International Preliminary Report and Written Opinion on Patentability on Appl. Ser. No. PCT/US2019/068351 dated Jul. 15, 2021 (8 pages).
International Preliminary Report on Patentability and Written Opinion issued in connection with PCT Appl. Ser. No. PCT/US2021/032515 dated Nov. 15, 2022.
International Search Report and Written Opinion on Appl. Ser. No. PCT/US2017/062703 dated Aug. 27, 2018 (13 pages).
International Search Report and Written Opinion on Appl. Ser. No. PCT/US2017/062708 dated Mar. 16, 2018 (14 pages).
International Search Report and Written Opinion on Appl. Ser. No. PCT/US2017/062714 dated Aug. 23, 2018 (13 pages).
International Search Report and Written Opinion on Appl. Ser. No. PCT/US2017/062721 dated Feb. 6, 2018 (12 pages).
International Search Report and Written Opinion on Appl. Ser. No. PCT/US2018/016632 dated Apr. 24, 2018 (6 pages).
International Search Report and Written Opinion on Appl. Ser. No. PCT/US2018/041388 dated Sep. 20, 2018 (13 pages).

(56) References Cited

OTHER PUBLICATIONS

International Search Report and Written Opinion on Appl. Ser. No. PCT/US2018/044007 dated Oct. 25, 2018 (17 pages).
International Search Report and Written Opinion on Appl. Ser. No. PCT/US2019/028532 dated Aug. 16, 2019 (16 pages).
International Search Report and Written Opinion on Appl. Ser. No. PCT/US2019/068351 dated Apr. 9, 2020 (14 pages).
International Search Report and Written Opinion on Appl. Ser. No. PCT/US2021/032515 dated Aug. 3, 2021 (18 pages).
Johnson, A. et al., "Using spin images for efficient object recognition in cluttered 3D scenes", IEEE Trans. Pattern Anal. Mach. Intell., vol. 21, No. 5, May 1999, pp. 433-448.
Johnson, A., "Spin-Images: A Representation for 3-D Surface Matching," doctoral dissertation, tech. report CMU-RI-TR-97-47, Robotics Institute, Carnegie Mellon University, Aug. 1997, 308 pages.
Kachelmyer, A., "Range-Doppler Imaging with a Laser Radar", The Lincoln Laboratory Journal, vol. 3, No. 1, 1990, pp. 87-118.
Klasing, K. et al., "Comparison of Surface Normal Estimation Methods for Range Sensing Applications," 2009 IEEE International Conference on Robotics and Automation, May 12, 2009, pp. 3206-3211.
Krause, B. et al., "Motion compensated frequency modulated continuous wave 3D coherent imaging ladar with scannerless architecture", Applied Optics, vol. 51, No. 36, Dec. 20, 2012, pp. 8745-8761.
Le, T., "Arbitrary Power Splitting Couplers Based on 3x3 Multimode Interference Structures for All-Optical Computing", LACSIT International Journal of Engineering and Technology, vol. 3, No. 5, Oct. 2011, pp. 565-569.
Lin, C. et al.; "Eigen-feature analysis of weighted covariance matrices for LiDAR point cloud classification", ISPRS Journal of Photogrammetry and Remote Sensing, vol. 94, Aug. 1, 2014 (30 pages).
Lu et al., "Recognizing objects in 3D point clouds with multi-scale features", Sensors 2014, 14, 24156-24173; doi: 10.3390/s141224156 (Year: 2014).
Lu, M. et al, "Recognizing Objects in 3D Point Clouds with Multi-Scale Local Features," Sensors 2014, Dec. 15, 2014, retrieved at URL:www.mdpi.com/1424-8220/14/12/24156/pdf, pp. 24156-24173.
MacKinnon, D. et al., "Adaptive laser range scanning", American Control Conference, Piscataway, NJ, 2008, pp. 3857-3862.
Marron, J. et al., "Three-dimensional Lensless Imaging Using Laser Frequency Diversity", Applied Optics, vol. 31, No. 2, Jan. 10, 1992, pp. 255-262.
Miyasaka, T. et al., "Moving Object Tracking and Identification in Traveling Environment Using High Resolution Laser Radar", Graphic Information Industrial, vol. 43, No. 2, pp. 61-69, Feb. 1, 2011.
Munkres, J., "Algorithms for the Assignment and Transportation Problems", Journal of the Society for Industrial and Applied Mathematics, vol. 5, No. 1, Mar. 1957, pp. 32-38.
Non-Final Office Action on U.S. Appl. No. 16/464,108 DTD Jul. 25, 2022.
Non-Final Office Action on U.S. Appl. No. 16/464,657 DTD Nov. 9, 2022.
Non-Final Office Action on U.S. Appl. No. 16/875,114 DTD Aug. 18, 2022.
Non-Final Office Action on U.S. Appl. No. 17/592,286 DTD Dec. 30, 2022.
Non-Final Office Action on U.S. Appl. No. 16/464,063 dated Apr. 22, 2022 (23 pages).
Non-Final Office Action on U.S. Appl. No. 16/464,648 dated Jun. 1, 2021 (6 pages).
Non-Final Office Action on U.S. Appl. No. 16/464,657 dated Dec. 22, 2021 (17 pages).
Non-Final Office Action on U.S. Appl. No. 16/535,127 dated Jun. 3, 2022 (6 pages).
Non-Final Office Action on U.S. Appl. No. 16/725,399 dated Mar. 5, 2020 (53 pages).
Non-Final Office Action on U.S. Appl. No. 16/725,419 dated Feb. 24, 2020 (4 pages).
Non-Final Office Action on U.S. Appl. No. 17/167,857 dated Apr. 6, 2022 (50 pages).
Non-Final Office Action on U.S. Appl. No. 17/592,286 dated Apr. 20, 2022 (16 pages).
Notice of Allowance for U.S. Appl. No. 16/725,399 dated Dec. 3, 2020 (11 pages).
Notice of Allowance on KR Appl. Ser. No. 10-2019-7019062 dated Feb. 10, 2021 (4 Pages).
Notice of Allowance on KR Appl. Ser. No. 10-2019-7019076 dated Feb. 15, 2021 (4 pages).
Notice of Allowance on KR Appl. Ser. No. 10-2019-7019078 dated Feb. 15, 2021 (4 pages).
Notice of Allowance on U.S. Appl. No. 16/464,063 DTD Aug. 9, 2022.
Notice of Allowance on U.S. Appl. No. 16/464,108 DTD Nov. 16, 2022.
Notice of Allowance on U.S. Appl. No. 16/535,127 DTD Oct. 4, 2022.
Notice of Allowance on U.S. Appl. No. 17/167,857 DTD Aug. 8, 2022.
Notice of Allowance on U.S. Appl. No. 17/167,857 DTD Aug. 24, 2022.
Notice of Allowance on U.S. Appl. No. 16/464,648 dated Oct. 13, 2021 (7 pages).
Notice of Allowance on U.S. Appl. No. 15/423,978 dated Jul. 15, 2019 (8 pages).
Notice of Allowance on U.S. Appl. No. 15/645,311 dated Apr. 18, 2019 (13 pages).
Notice of Allowance on U.S. Appl. No. 16/515,538 dated Feb. 23, 2021 (16 pages).
Notice of Allowance on U.S. Appl. No. 16/725,419 dated Apr. 15, 2020 (9 pages).
Notice of Final Rejection for KR Appl. Ser. No. 10-2021-7019744 dated Jan. 25, 2022 (3 pages).
Notice of Preliminary Rejection on KR Appl. Ser. No. 10-2021-7014545 dated Aug. 19, 2021 (17 pages).
Notice of Preliminary Rejection on KR Appl. Ser. No. 10-2021-7014560 dated Aug. 19, 2021 (5 pages).
Notice of Preliminary Rejection on KR Appl. Ser. No. 10-2021-7019744 dated Aug. 19, 2021 (15 pages).
Notice of Reasons for Refusal on JP Appl. Ser. No. 2019-527156 dated Dec. 1, 2020 (12 pages).
Notice of Reasons for Refusal on JP Appl. Ser. No. 2020-559530 dated Apr. 20, 2021 (11 pages).
Notice of Reasons for Refusal on JP Appl. Ser. No. 2021-118743 dated Jun. 7, 2022 (9 pages).
Notice of Reasons for Refusal on JP Appl. Ser. No. 2021-165072 dated Apr. 19, 2022 (10 pages).
Notice of Reasons for Refusal on JP Appl. Ser. No. 2021-165072 dated Nov. 30, 2021 (9 pages).
Notice of Reasons for Refusal on JP Appl. Ser. No. 2021-538998 dated Apr. 26, 2022 (11 pages).
Notice of Reasons for Refusal on JP Appl. Ser. No. 2021-538998 dated Nov. 30, 2021 (20 pages).
Notice of Reasons for Rejection issued in connection with JP Appl. Ser. No. JP 120261-126516 dated Dec. 13, 2022 (with English translation, 14 pages).
Notice of Reasons for Rejection issued in connection with JP Appl. Ser. No. JP 2021-126516 dated Jun. 21, 2022 (16 pages).
O'donnell, R., "Radar Systems Engineering Lecture 11 Waveforms and Pulse Compression," IEEE New Hampshire Section, Jan. 1, 2010, pp. 1-58.
Office Action for U.S. Appl. No. 17/167,857 dated Jun. 28, 2021 (37 pages).
Office Action on JP App. Ser. No. 2019-527155 dated Dec. 1, 2020 (10 pages).
Office Action on JP Appl. Ser. No. 2019-527155 dated Dec. 1, 2020 (8 pages).
Office Action on JP Appl. Ser. No. 2019-527224 dated Dec. 1, 2020 (6 pages).

(56) References Cited

OTHER PUBLICATIONS

Office Action on JP Appl. Ser. No. 2019-538482 dated Feb. 2, 2021 (6 pages).
Office Action on KR Appl. Ser. No. 10-2019-7018575 dated Jun. 23, 2020 (4 pages).
Office Action on KR Appl. Ser. No. 10-2019-7019062 dated Oct. 5, 2020 (6 pages).
Office Action on KR Appl. Ser. No. 10-2019-7019076 dated Jun. 9, 2020 (18 pages).
Office Action on KR Appl. Ser. No. 10-2019-7019078 dated Jun. 9, 2020 (14 pages).
Office Action on KR Appl. Ser. No. 10-2019-7022921 dated Aug. 26, 2020 (6 pages).
Office Action on U.S. Appl. No. 15/423,978 dated Mar. 22, 2019 (6 pages).
Office Action on U.S. Appl. No. 17/331,362 dated Aug. 19, 2021 (17 pages).
Optoplex Corporation, "90 degree Optical Hybrid", Nov. 9, 2016, 2 pages.
Rabb, D. et al., "Multi-transmitter Aperture Synthesis", Optics Express, vol. 18, No. 24, Nov. 22, 2010, pp. 24937-24945.
Roos, P. et al., "Ultrabroadband optical chirp linearization for precision metrology applications", Optics Letters, vol. 34, No. 23, Dec. 1, 2009, pp. 3692-3694.
Salehian, H. et al., "Recursive Estimation of the Stein Center of SPD Matrices and Its Applications", 2013 IEEE International Conference on Computer Vision (ICCV), Dec. 1, 2013, pp. 1793-1800.
Samadzadegan, F. et al., "A Multiple Classifier System for Classification of LIDAR Remote Sensing Data Using Multi-class SVM", Multiple Classifier Systems, 9th International Workshop, MCS 2010, Cairo, Egypt, Apr. 7-9, 2010, pp. 254-263.
Satyan, N. et al., "Precise control of broadband frequency chirps using optoelectronic feedback", Optics Express, vol. 17, No. 18, Aug. 31, 2009, pp. 15991-15999.
Second Chinese Office Action issued in connection with CN Appl. Ser. No. 201980087957.5 dated Sep. 20, 2022.
Second Chinese Office Action on CN Appl. Ser. No. 201880009947.5 dated Apr. 4, 2022 (3 pages).
Second Chinese Office Action on CN Appl. Ser. No. 201980033898.3 dated Oct. 27, 2021 (6 pages).
Second Office Action for KR Appl. Ser. No. 10-2021-7020076 dated Jun. 30, 2021 (5 pages).
Second Office Action on CN Appl. Ser. No. 201780081968.3 dated May 12, 2021 (7 pages).
Stafford, J. et al., "Holographic aperture ladar with range compression," Journal of the Optical Society of America, vol. 34, No. 5, May 2017, pp. A1-A9.
Supplementary European Search Report on EP Appl. Ser. No. 18748729.3 dated Nov. 20, 2020 (8 pages).
Supplementary European Search Report on EP Appl. Ser. No. 18831205.2 dated Feb. 12, 2021 (7 pages).
Supplementary European Search Report on EP Appl. Ser. No. 19791789.1 dated Dec. 9, 2021 (4 pages).
Third Party Submission on U.S. Appl. No. 16/725,375, filed Jun. 25, 2020 (73 pages).
Tippie, A. et al., "High-resolution synthetic-aperture digital holography with digital phase and pupil correction", Optics Express, vol. 19, No. 13, Jun. 20, 2011, pp. 12027-12038.
US Notice of Allowance on US DTD Sep. 14, 2022.
US Notice of Allowance on U.S. Appl. No. 17/331,362 dated Feb. 17, 2022 (14 pages).
US Office Action on US DTD Dec. 1, 2022.
Weinmann, M. et al., "Semantic point cloud interpretation based on optimal neighborhoods, relevant features and efficient classifiers", ISPRS Journal of Photogrammetry and Remote Sensing, vol. 105, Feb. 27, 2015, pp. 286-304.
Wikipedia, "Digital-to-analog converter", retrieved from https://en.wikipedia.org/wiki/Digital-to-analog_converter, on Apr. 15, 2017, 7 pages.
Wikipedia, "Field-programmable gate array", retrieved from https://en.wikipedia.org/wiki/Field-programmable_gate_array, on Apr. 15, 2017, 13 pages.
Wikipedia, "In-phase and quadrature components", retrieved from https://en.wikipedia.org/wiki/In-phase_and_quadrature_components, on Jan. 26, 2018, 3 pages.
Wikipedia, "Phase-shift keying", retrieved from https://en.wikipedia.org/wiki/Phase-shift_keying#Binary_phase-shift_keying.28BPSK.29, on Oct. 23, 2016, 9 pages.
Ye, J., "Least Squares Linear Discriminant Analysis", 24th International Conference on Machine Learning, pp. 1087-1093 (as of Nov. 27, 2016).
Extended European Search Report issued in connection with EP Appl. No. 23189916.2 dated Nov. 9, 2023.
Office Action issued in connection with Chinese Appl. No. 202180034633.2 dated Mar. 9, 2024.
Office Action issued in connection with Chinese Appl. No. 202310820368.1 dated Feb. 28, 2024.
Chester, David B. "A Parameterized Simulation of Doppler Lidar", All Graduate Thesis and Dissertations, Dec. 2017, Issue 6794, <URL: https://digitalcommons.usu.edu/etd/6794 > * pp. 13-14, 27-28, 45*.
Notice of Reasons of Rejection issued in connection with JP Appl. Ser. No. 2022-000212 dated Feb. 7, 2023.
International Search Report and Written Opinion issued in connection with PCT/US2023/011341 dated Feb. 16, 2024.
Office Action issued in connection with Japanese Appl. No. 2023-095571 dated Feb. 20, 2024.
Office Action issued in connection with Japanese Appl. No. 2022-569030 dated Aug. 22, 2023.
Korean Office Action issued in connection with KR Appl. Ser. No. 10-2021-7023519 dated Feb. 13, 2023.
First Office Opinion Notice re: CN Application No. 202111404151 dated May 12, 2024.
Manninen, A J., O'Connor, E. J., Vakkari, V., and Petaja, T.: A generalised background correction algorithm for a Halo Doppler lidar and its application to data from Finland, Atmos. Meas. Tech., 9, 817--827, https://doi.org/10.5194/amt-9-817-2016, 2016.

* cited by examiner

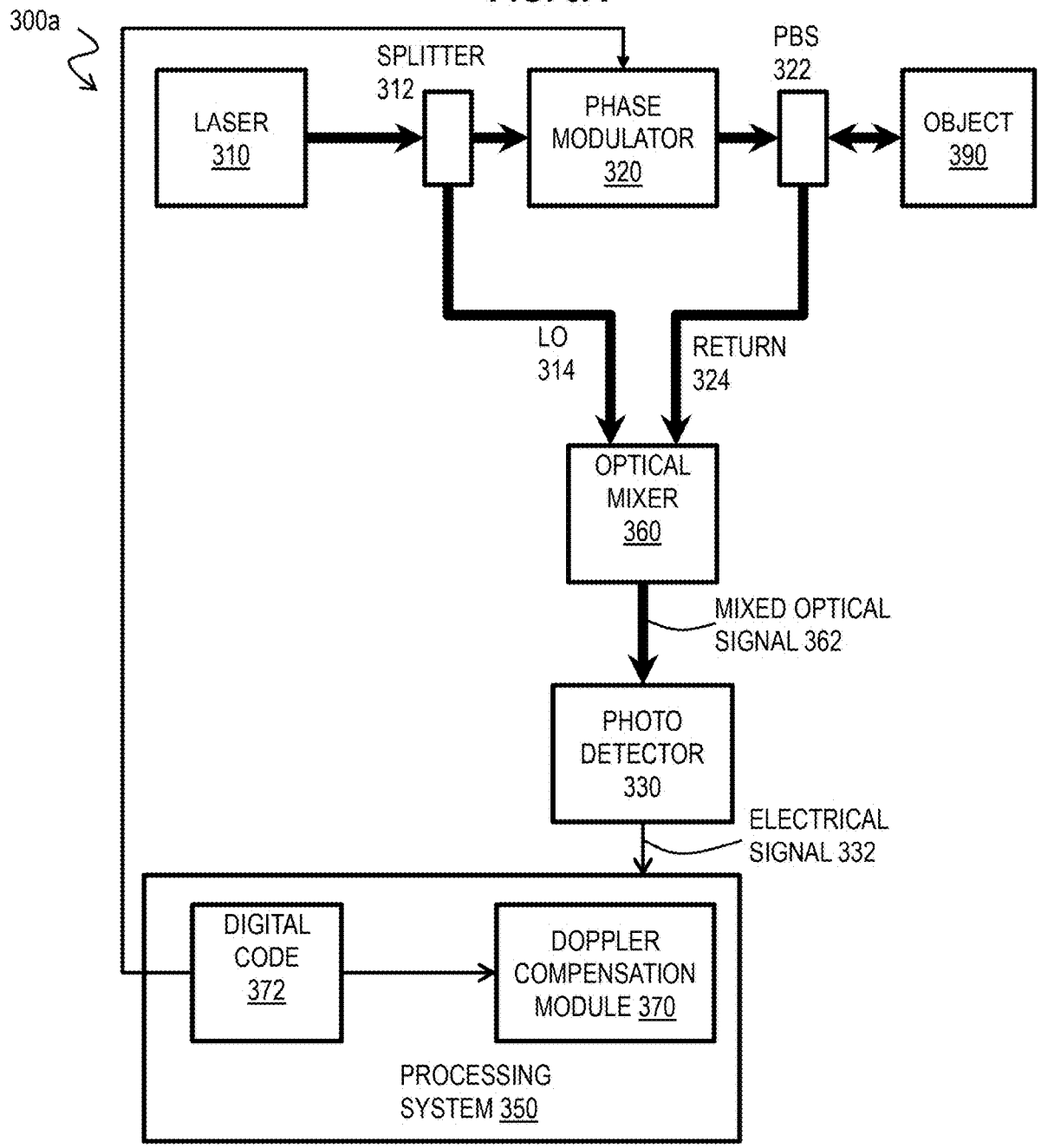

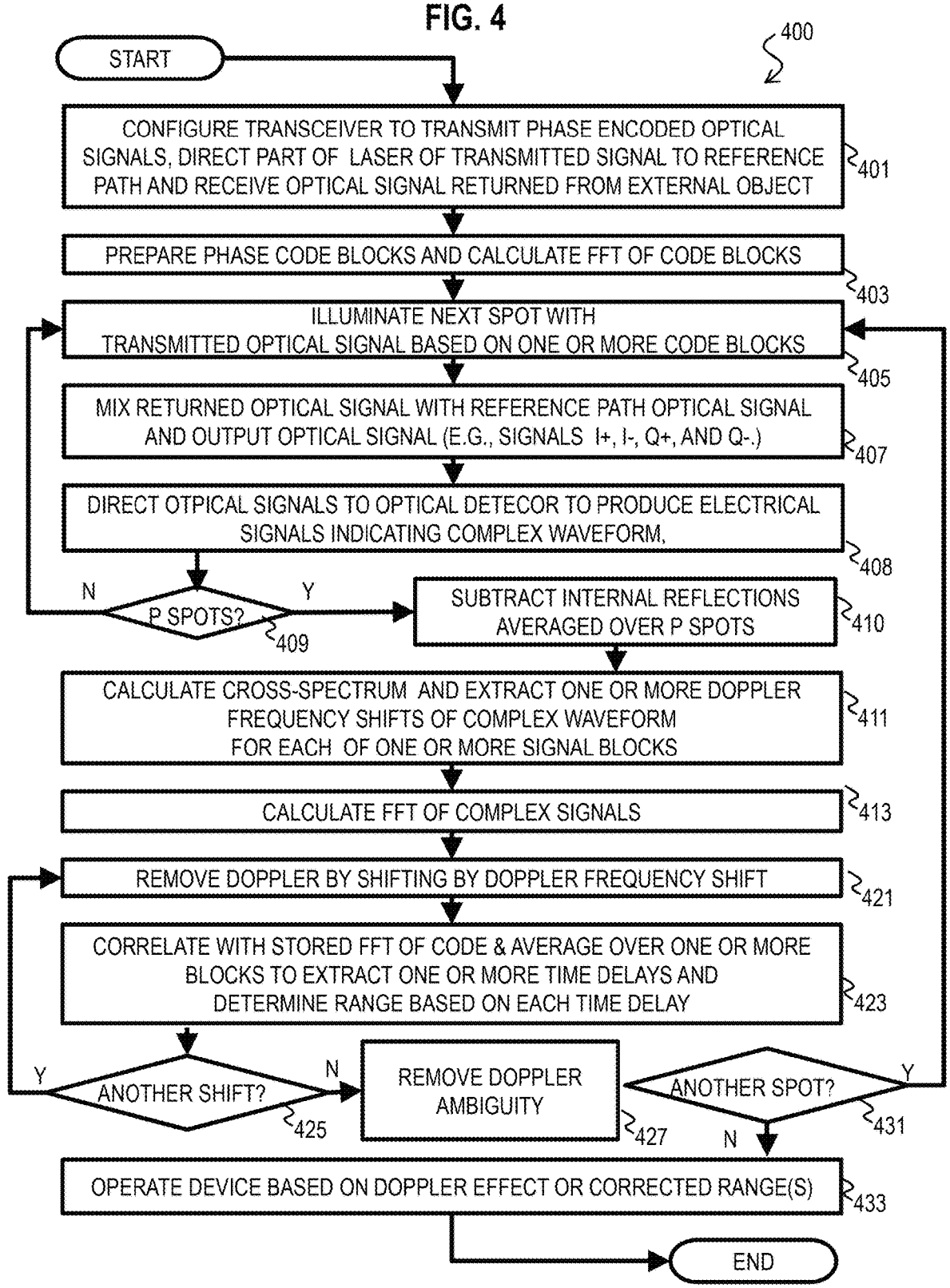

FIG. 11
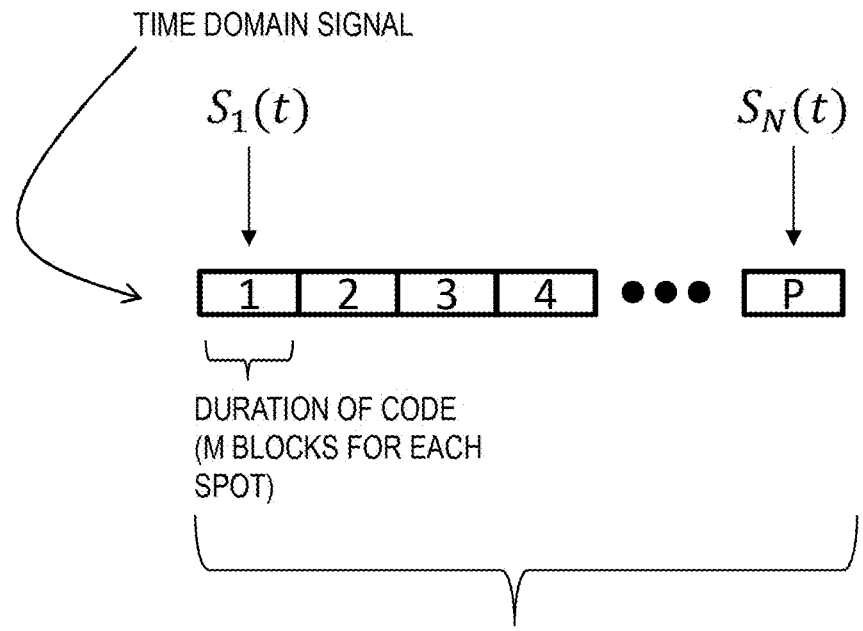
TIME DOMAIN SIGNAL
$S_1(t)$      $S_N(t)$
| 1 | 2 | 3 | 4 | ••• | P |
DURATION OF CODE
(M BLOCKS FOR EACH SPOT)
AVERAGING DURATION OVER P SPOTS
TO COMPUTE $S_S(t)$
TO ESTIMATE RETURNS FROM
INTERNAL OPTICS
$$S_{1C}(t) = S_1(t) - S_S(t)$$
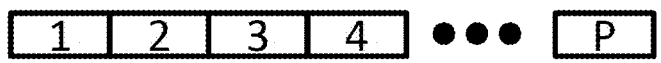
| 1 | 2 | 3 | 4 | ••• | P |
CORRECTED TIME
DOMAIN SIGNAL Range Bins

LIDAR SYSTEM TO ADJUST DOPPLER EFFECTS

CROSS-REFERENCE TO RELATED APPLICATION

This application is a Continuation of U.S. patent application Ser. No. 16/535,127, filed Aug. 8, 2019, which is a Continuation of U.S. patent application Ser. No. 15/423,978 filed Feb. 3, 2017 (now U.S. Pat. No. 10,422,880). The entire disclosures of U.S. patent application Ser. No. 16/535,127 and U.S. patent application Ser. No. 15/423,978 are hereby incorporated herein by reference in their entireties.

BACKGROUND

Optical detection of range using lasers, often referenced by a mnemonic, LIDAR, for light detection and ranging, is used for a variety of applications, from altimetry, to imaging, to collision avoidance. LIDAR provides finer scale range resolution with smaller beam sizes than conventional microwave ranging systems, such as radio-wave detection and ranging (RADAR). Optical detection of range can be accomplished with several different techniques, including direct ranging based on round trip travel time of an optical pulse to an object, and chirped detection based on a frequency difference between a transmitted chirped optical signal and a returned signal scattered from an object, and phase-encoded detection based on a sequence of single frequency phase changes that are distinguishable from natural signals.

To achieve acceptable range accuracy and detection sensitivity, direct long range LIDAR systems use short pulse lasers with low pulse repetition rate and extremely high pulse peak power. The high pulse power can lead to rapid degradation of optical components. Chirped and phase-encoded LIDAR systems use long optical pulses with relatively low peak optical power. In this configuration, the range accuracy increases with the chirp bandwidth or length of the phase codes rather than the pulse duration, and therefore excellent range accuracy can still be obtained.

Useful optical chirp bandwidths have been achieved using wideband radio frequency (RF) electrical signals to modulate an optical carrier. Recent advances in chirped LIDAR include using the same modulated optical carrier as a reference signal that is combined with the returned signal at an optical detector to produce in the resulting electrical signal a relatively low beat frequency in the RF band that is proportional to the difference in frequencies or phases between the references and returned optical signals. This kind of beat frequency detection of frequency differences at a detector is called heterodyne detection. It has several advantages known in the art, such as the advantage of using RF components of ready and inexpensive availability. Recent work described in U.S. Pat. No. 7,742,152, the entire contents of which are hereby incorporated by reference as if fully set forth herein, except for terminology that is inconsistent with the terminology used herein, show a novel simpler arrangement of optical components that uses, as the reference optical signal, an optical signal split from the transmitted optical signal. This arrangement is called homodyne detection in that patent.

LIDAR detection with phase-encoded microwave signals modulated onto an optical carrier have been used as well. Here bandwidth B is proportional to the inverse of the duration r of the pulse that carries each phase ($B=1/\tau$), with any phase-encoded signal made up of a large number of such pulses. This technique relies on correlating a sequence of phases (or phase changes) of a particular frequency in a return signal with that in the transmitted signal. A time delay associated with a peak in correlation is related to range by the speed of light in the medium. Range resolution is proportional to the pulse width r. Advantages of this technique include the need for fewer components, and the use of mass produced hardware components developed for phase-encoded microwave and optical communications.

SUMMARY

The current inventors have recognized circumstances and applications in which motion of an object, to which range is being detected using optical phase encoding, noticeably affects such applications due to Doppler frequency shifts. Techniques are provided for detecting the Doppler effect to determine the speed of an object and then compensating for the Doppler effect in range measurements from such optical phase encoding.

In a first set of embodiments, a method includes determining on a processor a code that indicates a sequence of phases for a phase-encoded radio frequency signal, and determining a first Fourier transform of the phase-encoded radio frequency signal. The method also includes modulating an optical signal from a laser based on the code to produce a phase-encoded optical signal, and transmitting the phase-encoded optical signal. Furthermore, the method includes receiving a returned optical signal in response to transmitting the phase-encoded optical signal, and mixing the returned optical signal with a reference optical signal based on the optical signal from the laser. Still further, the method includes detecting the mixed optical signals at an optical detector to produce an electrical signal. Even more, the method includes determining on a processor a cross spectrum between an in-phase component of the electrical signal and a quadrature component of the electrical signal, determining a Doppler frequency shift of the returned optical signal based on a peak in the cross spectrum. Yet further, the method includes operating a device (e.g., a vehicle) based on the Doppler frequency shift.

In some embodiments of the first set, mixing the returned optical signal with the reference optical signal includes mixing the returned optical signal with the reference optical signal to produce an in-phase optical signal and a quadrature optical signal. Also, detecting the mixed optical signals at the optical detector includes detecting the in-phase optical signal at a first detector to produce a first electrical signal and detecting the quadrature optical signal at a second optical detector to produce a second electrical signal. Furthermore, determining the cross spectrum includes determining the cross-spectrum between the first electrical signal and the second electrical signal.

In some of these embodiments, mixing the returned optical signal with the reference optical signal to produce the in-phase optical signal and the quadrature optical signal includes mixing the returned optical signal with the reference optical signal to produce a first optical signal that is a sum of the in-phase returned optical signal and reference signal, a second optical signal that is a difference of the in-phase returned optical signal and the reference signal, a third optical signal that is a sum of the quadrature returned optical signal and the reference signal, a fourth optical signal that is a difference of the quadrature returned optical signal and the reference signal. In these embodiments, detecting the in-phase optical signal at the first detector to produce the first electrical includes detecting the first optical signal and the second optical signal at the first detector. Also in these embodiments, detecting the quadrature optical signal at the second optical detector to produce the second electrical signal includes detecting the third optical signal and the fourth optical signal at the second optical detector.

In some embodiments of the first set, the method also includes determining on the processor a second Fourier transform of the electrical signal, and determining a third Fourier transform based on the second Fourier transform and the Doppler frequency shift. Even further the method includes determining on the processor a cross correlation based on the first Fourier transform and the third Fourier transform, and determining a first range based on a time lag of a first peak in the cross correlation. In these embodiments, operating the device based on the Doppler frequency shift includes operating a device (e.g., a vehicle) based on the first range.

In other embodiments, a system or apparatus or computer-readable medium is configured to perform one or more steps of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 3A is a block diagram that illustrates example components of a phase-encoded LIDAR system, according to an embodiment;

FIG. 4 is a flow chart that illustrates an example method for using Doppler-corrected phase-encoded LIDAR system to determine and compensate for Doppler effects on ranges, according to an embodiment;

FIG. 11 is a block diagram that illustrates example multi-spot averaging to remove returns from internal optics, according to an embodiment;

DETAILED DESCRIPTION

A method and apparatus and system and computer-readable medium are described for Doppler correction of optical phase-encoded range detection. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5x to 2x, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of binary, $\pi/2$ (90 degree) phase encoding at a radio frequency modulated onto an optical signal; but, embodiments are not limited to this context. In other embodiments, other phase encoding is used, with different phase differences (e.g., 30, 60, or 180 degrees) or encoding with 3 or more different phases. Embodiments are described in the context of a single optical beam and its return on a single detector or pair of detectors, which in other embodiments can then be scanned using any known scanning means, such as linear stepping or rotating optical components or with arrays of transmitters or arrays of detectors or pairs of detectors.

1. PHASE-ENCODED DETECTION OVERVIEW

Figure 1A:
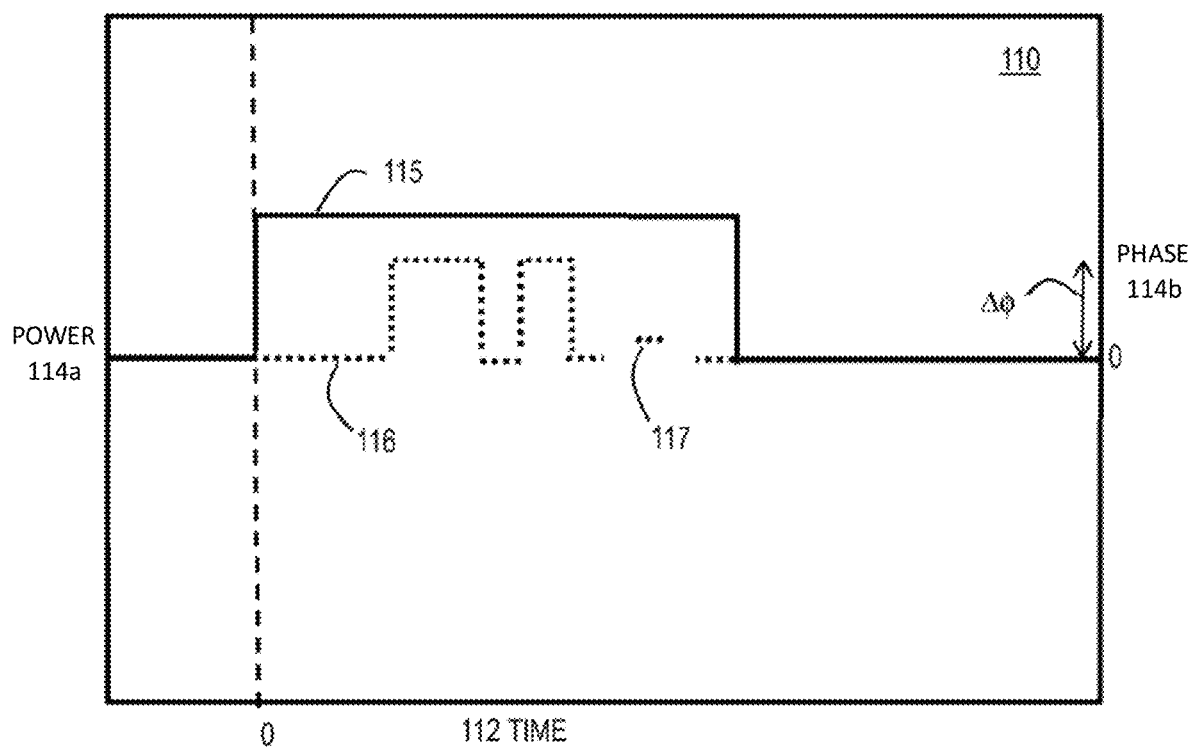
FIG. 1A is a schematic graph that illustrates an example transmitted optical phase-encoded signal for measurement of range, according to an embodiment.

FIG. 1A is a schematic graph 110 that illustrates an example transmitted optical phase-encoded signal for measurement of range, according to an embodiment. The horizontal axis 112 indicates time in arbitrary units from a start time at zero. The left vertical axis 114a indicates power in arbitrary units during a transmitted signal; and, the right vertical axis 114b indicates phase of the transmitted signal in arbitrary units. To most simply illustrate the technology of phase-encoded LIDAR, binary phase encoding is demonstrated. Trace 115 indicates the power relative to the left axis 114a and is constant during the transmitted signal and falls to zero outside the transmitted signal. Dotted trace 116 indicates phase of the signal relative to a continuous wave signal.

As can be seen, the trace is in phase with a carrier (phase=0) for part of the transmitted signal and then changes by $\Delta\phi$ (phase=$\Delta\phi$) for short time intervals, switching back and forth between the two phase values repeatedly over the transmitted signal as indicated by the ellipsis 117. The shortest interval of constant phase is a parameter of the encoding called pulse duration $\tau$ and is typically the duration of several periods of the lowest frequency in the band. The reciprocal, $1/\tau$ is baud rate, where each baud indicates a symbol. The number N of such constant phase pulses during the time of the transmitted signal is the number N of symbols and represents the length of the encoding. In binary encoding, there are two phase values and the phase of the shortest interval can be considered a 0 for one value and a 1 for the other, thus the symbol is one bit, an the baud rate is also called the bit rate. In multiphase encoding, there are multiple phase values. For example, 4 phase values such as $\Delta\phi*\{0, 1, 2$ and $3\}$, which, for $\Delta\phi=\pi/2$ (90 degrees), equals $\{0, \pi/2, 7\pi$ and $3\pi/2\}$, respectively; and, thus 4 phase values can represent 0, 1, 2, 3, respectively. In this example, each symbol is two bits and he bit rate is twice the baud rate.

Phase-shift keying (PSK) refers to a digital modulation scheme that conveys data by changing (modulating) the phase of a reference signal (the carrier wave) as illustrated in FIG. 1A. The modulation is impressed by varying the sine and cosine inputs at a precise time. At radio frequencies (RF), PSK is widely used for wireless local area networks (LANs), RF identification (RFID) and Bluetooth communication. Alternatively, instead of operating with respect to a constant reference wave, the transmission can operate with respect to itself. Changes in phase of a single transmitted waveform can be considered the symbol. In this system, the demodulator determines the changes in the phase of the received signal rather than the phase (relative to a reference wave) itself. Since this scheme depends on the difference between successive phases, it is termed differential phase-shift keying (DPSK). DPSK can be significantly simpler to implement than ordinary PSK, since there is no need for the demodulator to have a copy of the reference signal to determine the exact phase of the received signal (it is a non-coherent scheme).

For optical ranging applications, the carrier frequency is an optical frequency $f_c$ and a RF $f_0$ is modulated onto the optical carrier. The number N and duration r of symbols are selected to achieve the desired range accuracy and resolution. The pattern of symbols is selected to be distinguishable from other sources of coded signals and noise. Thus a strong correlation between the transmitted and returned signal is a strong indication of a reflected or backscattered signal. The transmitted signal is made up of one or more blocks of symbols, where each block is sufficiently long to provide strong correlation with a reflected or backscattered return even in the presence of noise. In the following discussion, it is assumed that the transmitted signal is made up of M blocks of N symbols per block, where M and N are non-negative integers.

Figure 1B:
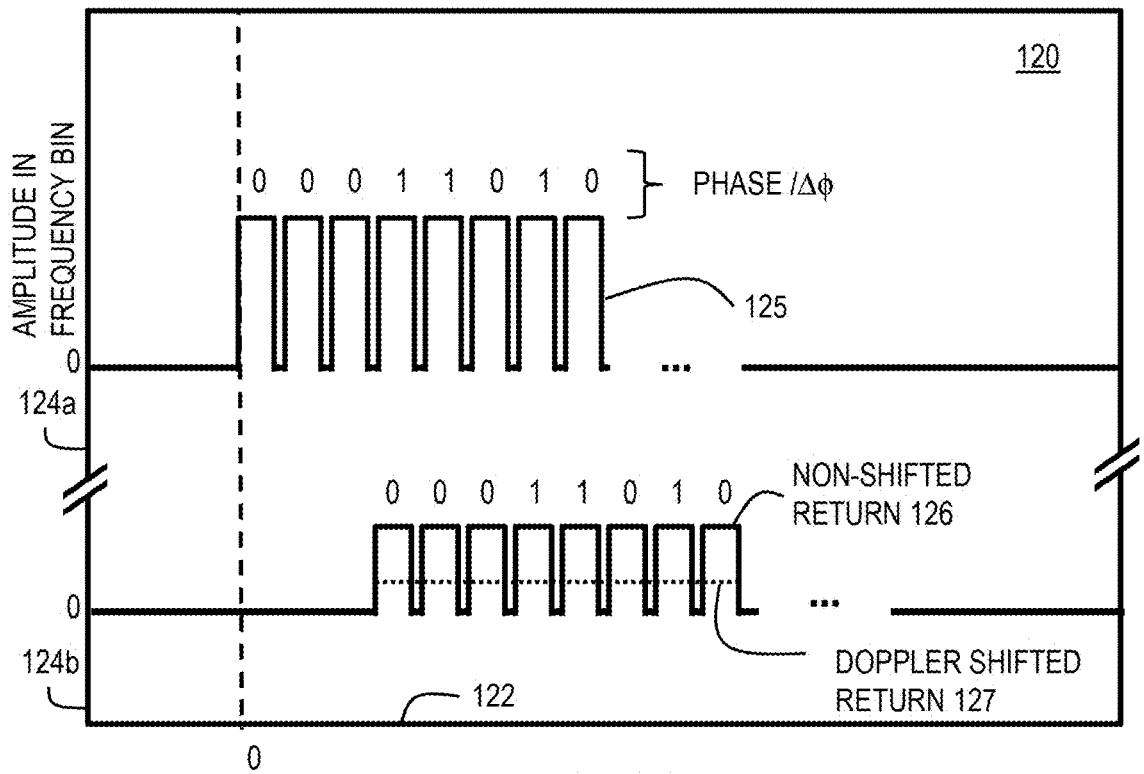
FIG. 1B is a schematic graph that illustrates the example transmitted signal of FIG. 1A as a series of binary digits along with returned optical signals for measurement of range, according to an embodiment.

FIG. 1B is a schematic graph 120 that illustrates the example transmitted signal of FIG. 1A as a series of binary digits along with returned optical signals for measurement of range, according to an embodiment. The horizontal axis 122 indicates time in arbitrary units after a start time at zero. The vertical axis 124a indicates amplitude of an optical transmitted signal at frequency $f_c+f_0$ in arbitrary units relative to zero. The vertical axis 124b indicates amplitude of an optical returned signal at frequency $f_c+f_0$ in arbitrary units relative to zero, and is offset from axis 124a to separate traces. Trace 125 represents a transmitted signal of M*N binary symbols, with phase changes as shown in FIG. 1A to produce a code starting with 00011010 and continuing as indicated by ellipsis. Trace 126 represents an idealized (noiseless) return signal that is scattered from an object that is not moving (and thus the return is not Doppler shifted). The amplitude is reduced, but the code 00011010 is recognizable. Trace 127 represents an idealized (noiseless) return signal that is scattered from an object that is moving and is therefore Doppler shifted. The return is not at the proper optical frequency $f_c+f_0$ and is not well detected in the expected frequency band, so the amplitude is diminished.

The observed frequency f' of the return differs from the correct frequency $f=f_c+f_0$ of the return by the Doppler effect given by Equation 1.

$$f' = \frac{(c+v_o)}{(c+v_s)}f \quad (1)$$

Where c is the speed of light in the medium. Note that the two frequencies are the same if the observer and source are moving at the same speed in the same direction on the vector between the two. The difference between the two frequencies, $\Delta f=f'-f$, is the Doppler shift, $\Delta f_D$, which causes problems for the range measurement, and is given by Equation 2.

$$\Delta f_D = \left[\frac{(c+v_o)}{(c+v_s)} - 1\right]f \quad (2)$$

Note that the magnitude of the error increases with the frequency f of the signal. Note also that for a stationary LIDAR system ($v_o=0$), for an object moving at 10 meters a second ($v_o=10$), and visible light of frequency about 500 THz, then the size of the error is on the order of 16 megahertz (MHz, 1 MHz=$10^6$ hertz, Hz, 1 Hz=1 cycle per second). In various embodiments described below, the Doppler shift error is detected and used to process the data for the calculation of range.

Figure 1C:
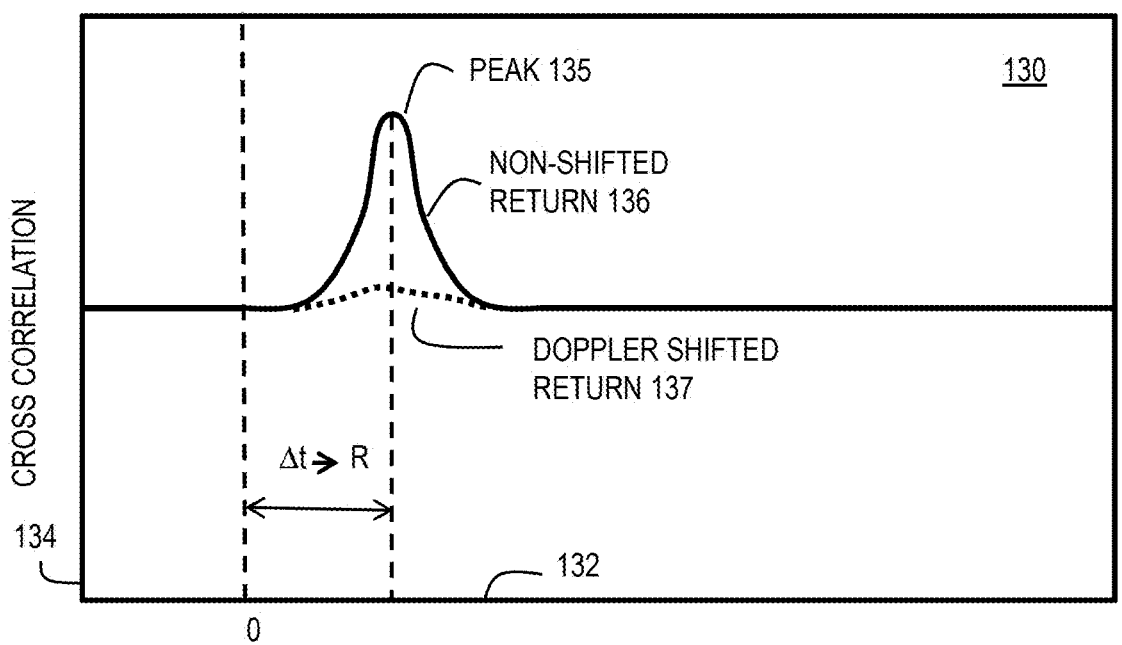
FIG. 1C is a schematic graph that illustrates example cross-correlations of a reference signal with two returned signals, according to an embodiment.

FIG. 1C is a schematic graph 130 that illustrates example cross-correlations of the transmitted signal with two returned signals, according to an embodiment. In phase coded ranging, the arrival of the phase coded reflection is detected in the return by cross correlating the transmitted signal or other reference signal with the returned signal, implemented practically by cross correlating the code for a RF signal with a electrical signal from an optical detector using heterodyne detection and thus down-mixing back to the RF band. The horizontal axis 132 indicates a lag time in arbitrary units applied to the coded signal before performing the cross correlation calculation with the returned signal. The vertical axis 134 indicates amplitude of the cross correlation computation. Cross correlation for any one lag is computed by convolving the two traces, i.e., multiplying corresponding values in the two traces and summing over all points in the trace, and then repeating for each time lag. Alternatively, the cross correlation can be accomplished by a multiplication of the Fourier transforms of each the two traces followed by an inverse Fourier transform. Efficient hardware and software implementations for a Fast Fourier transform (FFT) are widely available for both forward and inverse Fourier transforms. More precise mathematical expression for performing the cross correlation are provided for some example embodiments, below.

Note that the cross correlation computation is typically done with analog or digital electrical signals after the amplitude and phase of the return is detected at an optical detector. To move the signal at the optical detector to a RF frequency range that can be digitized easily, the optical return signal is optically mixed with the reference signal before impinging on the detector. A copy of the phase-encoded transmitted optical signal can be used as the reference signal, but it is also possible, and often preferable, to use the continuous wave carrier frequency optical signal output by the laser as the reference signal and capture both the amplitude and phase of the electrical signal output by the detector.

Trace 136 represents cross correlation with an idealized (noiseless) return signal that is reflected from an object that is not moving (and thus the return is not Doppler shifted). A peak occurs at a time $\Delta t$ after the start of the transmitted signal. This indicates that the returned signal includes a version of the transmitted phase code beginning at the time $\Delta t$. The range R to the reflecting (or backscattering) object is computed from the two way travel time delay based on the speed of light c in the medium, as given by Equation 3.

$$R=c*\Delta t/2 \quad (3)$$

Dotted trace 137 represents cross correlation with an idealized (noiseless) return signal that is scattered from an object that is moving (and thus the return is Doppler shifted). The return signal does not include the phase encoding in the proper frequency bin, the correlation stays low for all time lags, and a peak is not as readily detected. Thus $\Delta t$ is not as readily determined and range R is not as readily produced.

Figure 1D:
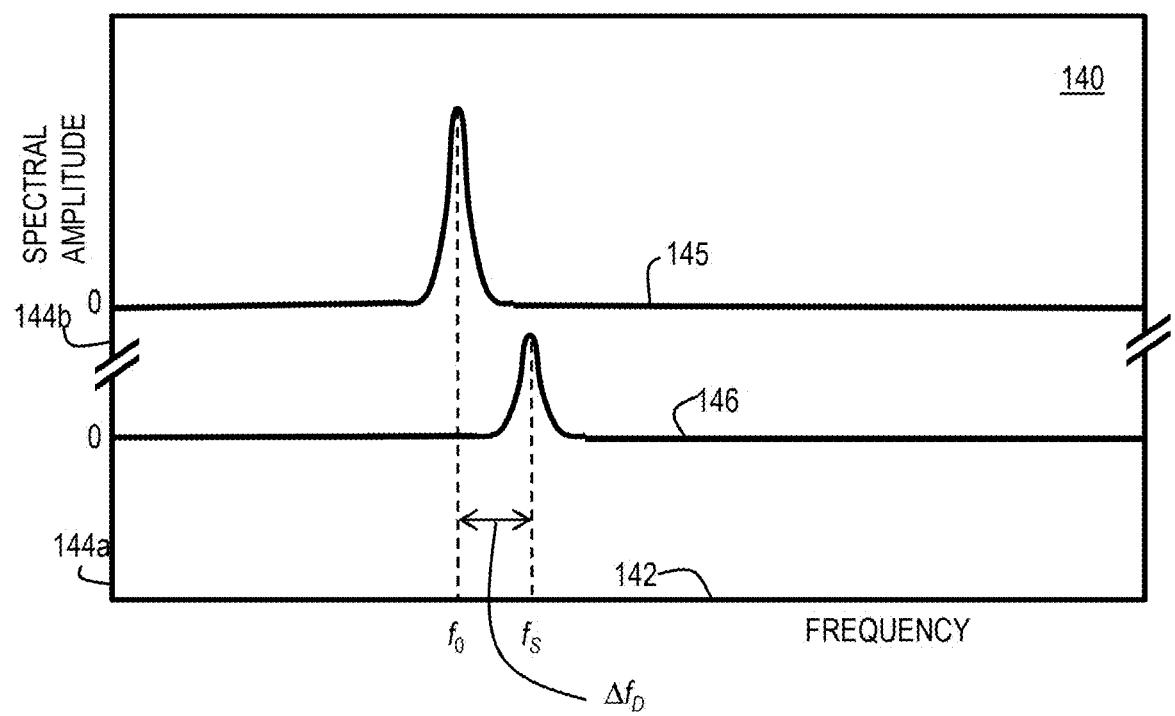
FIG. 1D is a schematic graph that illustrates an example spectrum of the reference signal and an example spectrum of a Doppler shifted return signal, according to an embodiment.

According to various embodiments described in more detail below, the Doppler shift is determined in the electrical processing of the returned signal; and the Doppler shift is used to correct the cross correlation calculation. Thus a peak is more readily found and range can be more readily determined. FIG. 1D is a schematic graph 140 that illustrates an example spectrum of the transmitted signal and an example spectrum of a Doppler shifted return signal, according to an embodiment. The horizontal axis 142 indicates RF frequency offset from an optical carrier $f_c$ in arbitrary units. The vertical axis 144a indicates amplitude of a particular narrow frequency bin, also called spectral density, in arbitrary units relative to zero. The vertical axis 144b indicates spectral density in arbitrary units relative to zero, and is offset from axis 144a to separate traces. Trace 145 represents a transmitted signal; and, a peak occurs at the proper RF $f_0$. Trace 146 represents an idealized (noiseless) return signal that is backscatter from an object that is moving and is therefore Doppler shifted. The return does not have a peak at the proper RF $f_0$; but, instead, is blue shifted by $\Delta f_D$ to a shifted frequency $f_s$.

Figure 1E:
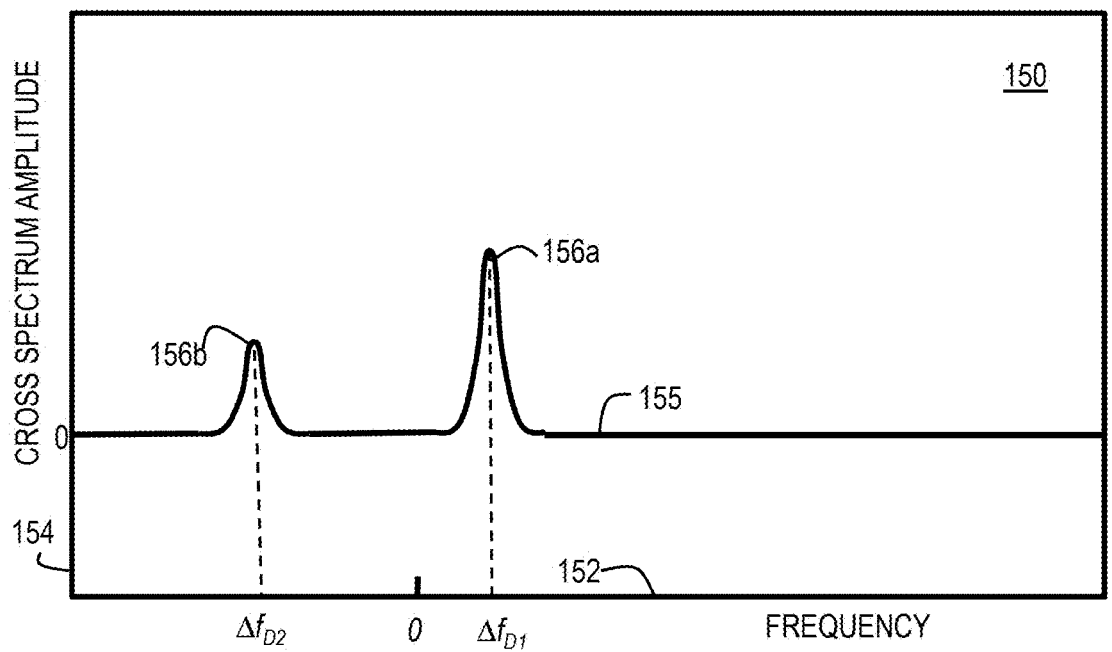
FIG. 1E is a schematic graph that illustrates an example cross-spectrum of phase components of a Doppler shifted return signal, according to an embodiment.

In some Doppler compensation embodiments, rather than finding $\Delta f_D$ by taking the spectrum of both transmitted and returned signals and searching for peaks in each, then subtracting the frequencies of corresponding peaks, as illustrated in FIG. 1D, it is more efficient to take the cross spectrum of the in-phase and quadrature component of the down-mixed returned signal in the RF band. FIG. 1E is a schematic graph 150 that illustrates an example cross-spectrum, according to an embodiment. The horizontal axis 152 indicates frequency shift in arbitrary units relative to the reference spectrum; and, the vertical axis 154 indicates amplitude of the cross spectrum in arbitrary units relative to zero. Trace 155 represents a cross spectrum with an idealized (noiseless) return signal generated by one object moving toward the LIDAR system (blue shift of $\Delta f_{D1}=\Delta f_D$ in FIG. 1D) and a second object moving away from the LIDAR system (red shift of $\Delta f_{D2}$). A peak occurs when one of the components is blue shifted $\Delta f_{D1}$; and, another peak occurs when one of the components is red shifted $\Delta f_{D2}$. Thus the Doppler shifts are determined. These shifts can be used to determine a velocity of approach of objects in the vicinity of the LIDAR, as can be critical for collision avoidance applications.

As described in more detail below, the Doppler shift(s) detected in the cross spectrum are used to correct the cross correlation so that the peak 135 is apparent in the Doppler compensated Doppler shifted return at lag Δt, and range R can be determined. The information needed to determine and compensate for Doppler shifts is either not collected or not used in prior phase-encoded LIDAR systems.

2. OPTICAL PHASE-ENCODED DETECTION HARDWARE OVERVIEW

Figure 2:
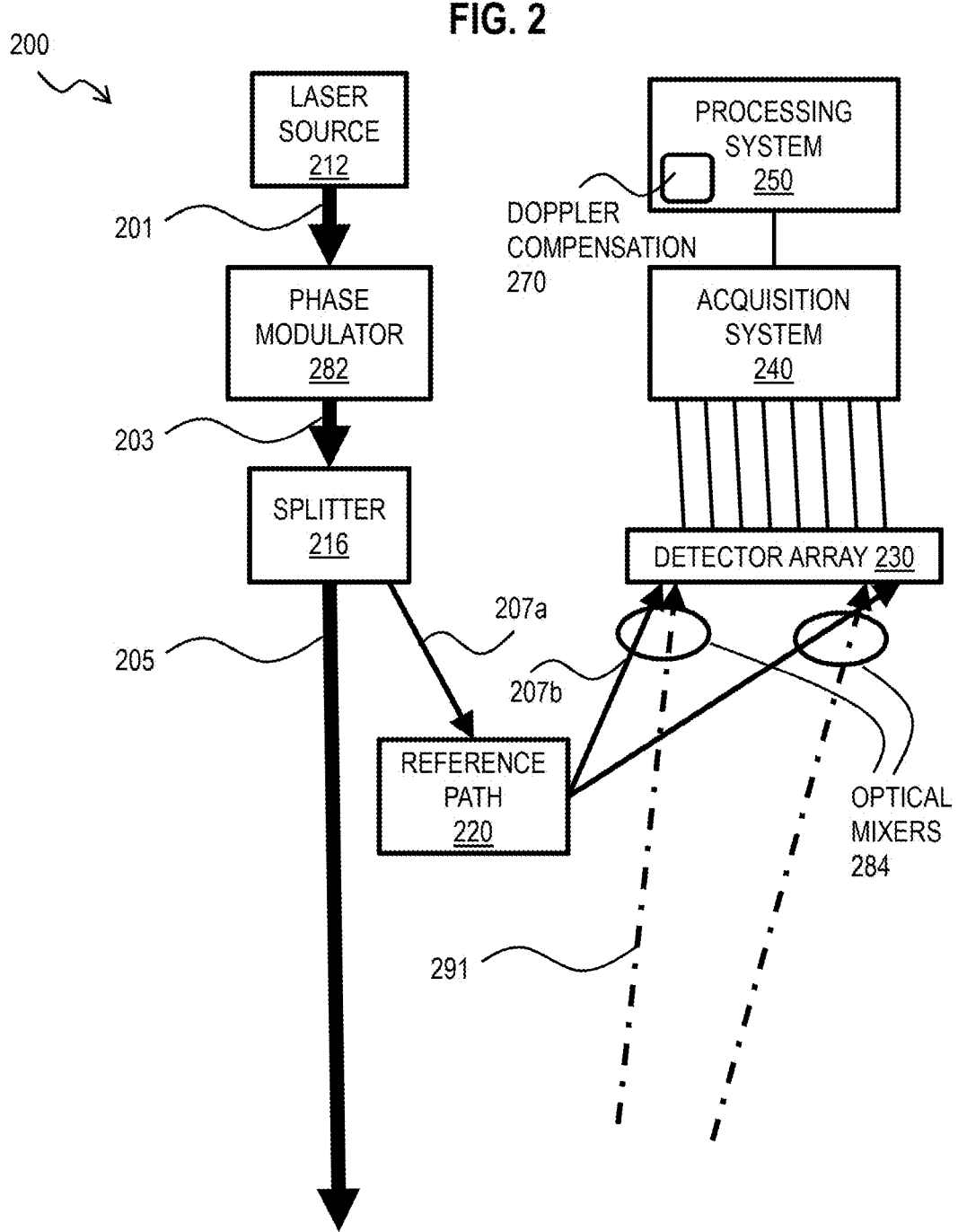
FIG. 2 is a block diagram that illustrates example components of a high resolution LIDAR system, according to an embodiment.

In order to depict how a phase-encoded detection approach is implemented, some generic and specific hardware approaches are described. FIG. 2 is a block diagram that illustrates example components of a high resolution LIDAR system, according to an embodiment. A laser source 212 emits a carrier wave 201 that is phase modulated in phase modulator 282 to produce a phase coded optical signal 203 that has a symbol length M*N and a duration D=M*N*τ. A splitter 216 splits the optical signal into a target beam 205, also called transmitted signal herein, with most of the energy of the beam 203 and a reference beam 207a with a much smaller amount of energy that is nonetheless enough to produce good mixing with the returned light 291 scattered from an object (not shown). In some embodiments, the splitter 216 is placed upstream of the phase modulator 282. The reference beam 207a passes through reference path 220 and is directed to one or more detectors as reference beam 207b. In some embodiments, the reference path 220 introduces a known delay sufficient for reference beam 207b to arrive at the detector array 230 with the scattered light. In some embodiments the reference beam 207b is called the local oscillator (LO) signal referring to older approaches that produced the reference beam 207b locally from a separate oscillator. In various embodiments, from less to more flexible approaches, the reference is caused to arrive with the scattered or reflected field by: 1) putting a mirror in the scene to reflect a portion of the transmit beam back at the detector array so that path lengths are well matched; 2) using a fiber delay to closely match the path length and broadcast the reference beam with optics near the detector array, as suggested in FIG. 2, with or without a path length adjustment to compensate for the phase difference observed or expected for a particular range; or, 3) using a frequency shifting device (acousto-optic modulator) or time delay of a local oscillator waveform modulation to produce a separate modulation to compensate for path length mismatch; or some combination. In some embodiments, the object is close enough and the transmitted duration long enough that the returns sufficiently overlap the reference signal without a delay.

The detector array is a single paired or unpaired detector or a 1 dimensional (1D) or 2 dimensional (2D) array of paired or unpaired detectors arranged in a plane roughly perpendicular to returned beams 291 from the object. The reference beam 207b and returned beam 291 are combined in zero or more optical mixers to produce an optical signal of characteristics to be properly detected. The phase or amplitude of the interference pattern, or some combination, is recorded by acquisition system 240 for each detector at multiple times during the signal duration D. The number of temporal samples per signal duration affects the down-range extent. The number is often a practical consideration chosen based on number of symbols per signal, signal repetition rate and available camera frame rate. The frame rate is the sampling bandwidth, often called "digitizer frequency." The only fundamental limitations of range extent are the coherence length of the laser and the length of the unique code before it repeats (for unambiguous ranging). This is enabled as any digital record of the returned bits could be cross correlated with any portion of transmitted bits from the prior transmission history. The acquired data is made available to a processing system 250, such as a computer system described below with reference to FIG. 14, or a chip set described below with reference to FIG. 15. A Doppler compensation module 270 determines the size of the Doppler shift and the corrected range based thereon along with any other corrections described herein. Any known apparatus or system may be used to implement the laser source 212, phase modulator 282, beam splitter 216, reference path 220, optical mixers 284, detector array 230, or acquisition system 240. Optical coupling to flood or focus on a target or focus past the pupil plane are not depicted. As used herein, an optical coupler is any component that affects the propagation of light within spatial coordinates to direct light from one component to another component, such as a vacuum, air, glass, crystal, mirror, lens, optical circulator, beam splitter, phase plate, polarizer, optical fiber, optical mixer, among others, alone or in some combination.

In some embodiments, electro-optic modulators provide the modulation. The system is configured to produce a phase code of length M*N and symbol duration r, suitable for the down-range resolution desired, as described in more detail below for various embodiments. For example, in 3D imaging applications, the total number of pulses M*N is in a range from about 500 to about 4000. Because the processing is done in the digital domain, it is advantageous to select M*N as a power of 2, e.g., in an interval from 512 to 4096. M is 1 when no averaging is done. If there are random noise contributions, then it is advantages for M to be about 10. As a result, N is in a range from 512 to 4096 for M=1 and in a range from about 50 to about 400 for M=10. For a 500 Mbps to 1 Gbps baud rate, the time duration of these codes is then between about 500 ns and 8 microseconds. It is noted that the range window can be made to extend to several kilometers under these conditions and that the Doppler resolution can also be quite high (depending on the duration of the transmitted signal). Although processes, equipment, and data structures are depicted in FIG. 2 as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts. For example splitter 216 and reference path 220 include zero or more optical couplers.

FIG. 3A is a block diagram that illustrates example components of a phase-encoded LIDAR system 300a. Although an object 390 is depicted to illustrate operation of the system 300a, the object 390 is not part of the system 300a. The system includes laser source 310, beam splitter 312, phase modulator 320, polarizing beam splitter 322, optical mixer 360, photodetector 330, and processing system 350, the latter including a digital code module 372 and Doppler compensation module 370. Optical signals are represented by thick arrows and electrical signals by thin arrows.

In electrical engineering, a sinusoid with phase modulation (corresponding to an angle modulation between the real and imaginary parts of the mathematical function exp(iωt)) can be decomposed into, or synthesized from, two amplitude-modulated sinusoids that are offset in phase by one-quarter cycle ($\pi/2$ radians). All three functions have the same frequency. The amplitude modulated sinusoids are known as in-phase component (I) at 0 phase and quadrature component (Q) at a phase of $\pi/2$. A laser 310 produces an optical signal at a carrier frequency $f_c$. The laser optical signal, L, is represented mathematically by Equation 4.

$$L = I_0 \exp(i\omega t) \quad (4)$$

where $I_0$ is the intensity output by the laser, expo is the exponential function such that $\exp(x)=e^x$, i is the imaginary number having the properties of the square root of $-1$, t is time, and $\omega=2\pi f_c$ is the angular frequency corresponding to the optical carrier frequency $f_c$. Mathematically this expression has a real part=$I_{OR} \cos(\omega t)$ and an imaginary part=$I_{OI} \sin(\omega t)$, where $I_{OR}$ is the real part of the intensity (in-phase) and $I_{OI}$ is the imaginary part. The phase of the oscillation is given by the angle between the real and imaginary parts. Thus, $L=I_{OR} \cos(\omega t)+I_{OI} \sin(\omega t)$, and $I_0$ is the root of the sum of the squares of the real and imaginary parts, $I_0^2=I_{OR}^2+I_{OI}^2$. Splitter 312 directs a small portion of the intensity of the signal to use as a reference signal (called a local oscillator) LO given by Equation 5.

$$LO = A_{LO} \exp(i\omega t) = A_R \cos(\omega t) + iA_I \sin(\omega t). \quad (5a)$$

where A is a constant that represents the intensity effect of the splitter 312. The electric field, $E_{LO}$, can thus be written as Equation 5b.

$$E_{LO} = A_{LO} e^{i\omega t} \quad (5b)$$

When the reference signal (LO) is the unmodulated laser signal, the entire signal is in phase and the imaginary component is zero, thus $$LO = A \cos(\omega t). \quad (5c)$$

The digital code module 372 in the processing system 350 sends an electrical signal that indicates a digital code of symbols to be imposed as phase changes on the optical carrier, represented as B(t) where B(t) switches between 0 and $\pi/2$ as a function of t. The phase modulator 320 imposes the phase changes on the optical carrier by taking digital lines out of a field programmable gate array (FPGA), amplifying them, and driving the EO phase modulator. The transmitted optical signal, T, is then given by Equation 6.

$$T = C \exp(i[\omega t + B(t)]) \quad (6)$$

where C is a constant that accounts for the reduction in $I_0$ by splitting of the fraction A and any amplification or further reduction imposed by the phase modulator 320.

Any phase modulator may be used as modulator 320. For example, an electro-optic modulator (EOM) is used that includes a crystal, such as lithium niobate, whose refractive index is a function of the strength of the local electric field. That means that if lithium niobate is exposed to an electric field, light will travel more slowly through it. But the phase of the light leaving the crystal is directly proportional to the length of time it takes that light to pass through it. Therefore, the phase of the laser light exiting an EOM can be controlled by changing the electric field in the crystal according to the digital code provided by the digital code module 372. The phase change induces a broadband frequency signal, with bandwidth B approximately equal to the baud rate, 1/τ.

The phase-encoded optical signal output by the phase modulator 320 is transmitted through some optical couplers, such as the polarizing beam splitter (PBS) 322 or other circulator optics, after which it is scattered by any object 390 in the beam carrying the transmitted signal. For example, it was found that the fiber coupled polarizing beam splitter combiners offer better isolation between the ports than the fiber based circulators as this optical component. This is important as signal that is not well isolated between transmit and receive will appear as an undesirable large peak in the range profiles. So the transmit signal is injected into port 1, is emitted out of port 2 and the back-scattered return signal is received in port 2 and exits port 3. Some targets (e.g., metal targets) maintain the polarization of the beam and some targets (e.g., diffuse targets) de-polarize the returned beam. In some embodiments, a quarter wave plate is included in the transmit optics to properly compensate for targets that do not depolarize.

The returned signal 324 is directed by the optical coupler, e.g., PBS 322, to the optical mixer 360 where the return optical signal 324 is mixed with the reference optical signal (LO) 314 given by Equation 5. The returned signal R from the kth object intercepted by the transmitted beam is given by Equation 7a.

$$R_k = A_k \exp(i[(\omega + \omega_{Dk})(t + \Delta t_k) + B(t + \Delta t_k)]) \quad (7a)$$

where $A_k$ is a constant accounting for the loss of intensity due to propagation to and from the object 390 and scattering at the kth object 390, $\Delta t_k$ is the two way travel time between the LIDAR system and the kth object 390, and $\omega D_k = 2\pi \Delta f_D$ is the angular frequency of the Doppler frequency shift (called Doppler shift herein for convenience) of the kth object. The electric field of the return signal, $E_R$, summed over all targets, is then given by Equation 7b.

$$E_R = \sum_k A_k e^{i[\omega(t+\Delta t_k) + \omega_{D_k}(t+\Delta t_k) + B(t+\Delta t_k)]} \quad (7b)$$

The coincident signals 324 and 314 at the optical mixer 360 produce a mixed optical signal 362 with a beat frequency related to a difference in frequency and phase and amplitude of the two optical signals being mixed, and an output depending on the function of the optical mixer 360. As used herein, down mixing refers to optical heterodyne detection, which is the implementation of heterodyne detection principle using a nonlinear optical process. In optical heterodyne detection, called "down-mixing" herein, an optical signal of interest at some optical frequency is non-linearly mixed with a reference "local oscillator" (LO) that is set at a close-by frequency. The desired outcome is a difference frequency, which carries the information (amplitude, phase, and frequency modulation) of the original optical frequency signal, but is oscillating at a lower more easily processed frequency, called a beat frequency herein, conveniently in the RF band. Examples of such mixed optical signals, also called raw signals, are shown below with reference to FIG. 5A. In some embodiments, this beat frequency is in an RF band that can be output from the optical detector as an electrical signal 332, such as an electrical analog signal that can be easily digitized by RF analog to digital converters (ADCs). The digital electrical signal 332 is input to the processing system 350 and used, along with the digital code from module 372, by the Doppler compensation module 370 to determine cross correlation and range, and, in some embodiments, the speed and Doppler shift.

In some embodiments, the raw signals are processed to find the Doppler peak and that frequency, $\omega_D$, is used to correct the correlation computation and determine the correct range. In other embodiments, it was discovered to be advantageous if the optical mixer and processing are configured to determine the in-phase and quadrature components, and to use that separation to first estimate $\omega_D$ and then use $\omega_D$ to correct the cross correlation computation to derive $\Delta t$. The value of $\omega_D$ is also used to present the speed of the object. The value of $\Delta t$ is then used to determine and present the range to the object using Equation 3 described above. The separation of the I and Q signals by the optical mixers enable clearly determining the sign of the Doppler shift.

Here an example hardware embodiment is designed to support the coherent detection of in-phase and quadrature (I/Q) signals of a phase coded transmitted signal, according to one embodiment. The advantage of this approach is a very cheap but high bandwidth waveform production requirement (binary digital or poly-phase digital codes) and minimal modulation requirements (single electro-optic phase modulator). A 90 degree optical hybrid optical mixer allows for I/Q detection of the optically down-mixed signals on two channels which are then digitized. This system allows for an extremely flexible "software defined" measurement architecture to occur.

Figure 3B:
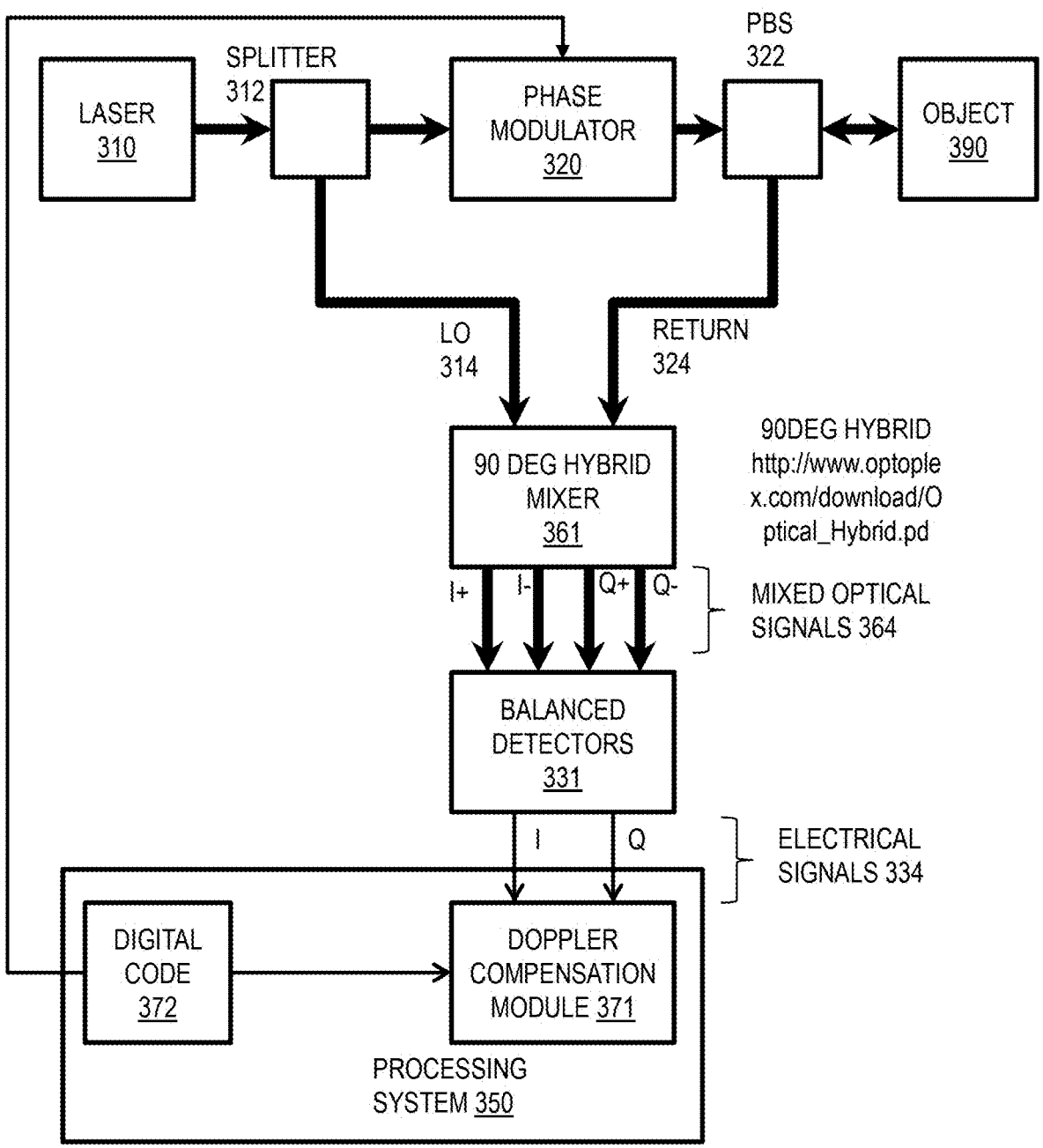
FIG. 3B is a block diagram that illustrates example components of a Doppler compensated phase-encoded LIDAR system, according to an embodiment.

FIG. 3B is a block diagram that illustrates example components of a Doppler compensated phase-encoded LIDAR system 300b, according to an embodiment. This embodiment uses binary phase encoding with the two phases separated by $\pi/2$ but with optical separation of in-phase and quadrature components rather than electrical separation. Although an object 390 is depicted to illustrate operation of the system 300a, the object 390 is not part of the system 300a. The system includes laser source 310, beam splitter 312, phase modulator 320, polarizing beam splitter 322, a 90 degree hybrid mixer 361 in place of the generic optical mixer 360 of FIG. 3A, balanced photodetectors 331 in place of the photodetector 330 of FIG. 3A, and processing system 350, the latter including a digital code module 372 and a Doppler compensation module 371. Optical signals are represented by thick arrows and electrical signals by thin arrows. A laser 310 produces an optical signal at an optical carrier frequency $f_c$. Splitter 312 directs a small portion of the power of the signal to use as a reference signal (called a local oscillator) LO 314. The digital code module 372 in the processing system 350 sends an electrical signal that indicates a digital code of symbols to be imposed as phase changes on the optical carrier. The phase modulator 320 imposes the phase changes on the optical carrier, as described above.

The phase-encoded optical signal output by the phase modulator 320 is transmitted through some optical couplers, such as the polarizing beam splitter (PBS) 322, after which it is scattered by any object 390 intercepted by the beam carrying the transmitted signal. The returned signal 324 is directed by the optical coupler, e.g., PBS 322, to the 90 degree Hybrid optical mixer 361 where the return optical signal 324 is mixed with the reference optical signal (LO) 314 given by Equation 5b. The returned signal R is given by Equation 7a. The Hybrid mixer outputs four optical signals, termed I+, I−, Q+, and Q−, respectively, combining LO with an in-phase component of the return signal R, designated $R_I$, and quadrature component of the return signal R, designated $R_Q$, as defined in Equation 8a through 8d.

$$I+=LO+R_I \quad (8a)$$

$$I-=LO-R_I \quad (8b)$$

$$Q+=LO+R_Q \quad (8c)$$

$$Q-=LO-R_Q \quad (8d)$$

where $R_I$ is the in phase coherent cross term of the AC component of the return signal R and $R_Q$ is the 90 degree out of phase coherent cross term of the AC component of the return signal R. For example, the electrical field of the above relations can be expressed based on Equations 5b and Equation 7b above and Equation 8e through Equation 8g below to produce Equations 8h through Equation 8k.

$$LO=|E_{LO}|^2 \quad (8e)$$

$$R_I=|E_R|^2+\text{Real}(E_R E_{LO}^*) \quad (8f)$$

$$R_Q=|E_R|^2+\text{Imag}(E_R E_{LO}^*) \quad (8g)$$

where * indicate a complex conjugate of a complex number, Imag( ) is a function that returns the imaginary part of a complex number, and Real( ) is a function that returns the real part of a complex number. The AC term $E_R E_{LO}^*$ cancels all of the optical frequency portion of the signal, leaving only the RF "beating" of LO with the RF portion of the return signal—in this case the Doppler shift and code function. The terms $|E_{LO}|^2$ and $|E_R|^2$ are constant (direct current, DC) terms. The latter is negligible relative to the former; so the latter term is neglected in the combinations expressed in Equations 8h through Equation 8k, as particular forms of Equation 8a through Equation 8d.

$$I+=|E_{LO}|^2+\text{Real}(E_R E_{LO}^*) \quad (8h)$$

$$I-=|E_{LO}|^2-\text{Real}(E_R E_{LO}^*) \quad (8i)$$

$$Q+=|E_{LO}|^2+\text{Imag}(E_R E_{LO}^*) \quad (8j)$$

$$Q-=|E_{LO}|^2-\text{Imag}(E_R E_{LO}^*) \quad (8k)$$

The two in-phase components I+ and I− are combined at a balanced detector pair to produce the RF electrical signal I on channel 1 (Ch1) and the two quadrature components Q+ and Q− are combined at a second balanced detector pair to produce the RF electrical signal Q on channel 2 (Ch2), according to Equations 9a and 9b.

$$I=I+-I- \quad (9a)$$

$$Q=Q+-Q- \quad (9b)$$

The use of a balanced detector (with a balanced pair of optical detectors) provides an advantage of cancellation of common mode noise, which provides reliable measurements with high signal to noise ratio (SNR). In some embodiments, such common mode noise is negligible or otherwise not of concern; so, a simple optical detector or unbalanced pair is used instead of a balanced pair The Doppler compensation module 371 then uses the signals I and Q to determine one or more Doppler shifts $\omega_D$, with corresponding speeds, and then uses the value of $\omega_D$ and the values of B(t) from the digital code module 372 and the signals I and Q to produce a corrected correlation trace in which peaks indicate one or more $\Delta t$ at each of the one or more speeds. When multiple speeds are detected, each is associated with a peak in the corresponding multiple correlation traces. In some embodiments, this is done by coincidence processing, to determine which current speed/location pairing is most probably related to previous pairings of similar speed/location. The one or more $\Delta t$ are then used to determine one or more ranges using Equation 3, described above.

It is advantageous to prepare a frequency domain representation of the code used for correlation at the start and re-used for each measuring point in the scan; so, this is done in some embodiments. A long code, of duration D=(M*N)

*τ, is encoded onto the transmitted light, and a return signal of the same length in time is collected by the data acquisition electronics. Both the code and signal are broken into M shorter blocks of length N so that the correlation can be conducted several times on the same data stream and the results averaged to improve signal to noise ratio (SNR). Each block of N symbols is distinctive from a different block of N symbols and therefore each block is an independent measurement. Thus, averaging reduces the noise in the return signal. The input I/Q signals are separated in phase by η/2. In some embodiments, further averaging is done over several illuminated spots in order to remove the effect of reflections from purely internal optics, as described in more detail below.

3. OPTICAL PHASE-ENCODED DETECTION METHOD

The presented approach takes advantage of the phase difference to compute a cross-spectrum using the I/Q signals (either in the electrical or optical signals), which provides a clear peak at the Doppler frequency. The approach also takes advantage of the phase difference of the I/Q signals to construct a complex signal for the correlation to determine range. Doppler compensation is accomplished by first taking the FFT of the complex return signals, then shifting the values of the FFT within the array of frequency bins. The corrected signals can be recovered by applying an inverse-FFT to the shifted FFT, but this is not necessary since the shifted FFT is used directly in the correlation with the code FFT in some embodiments. In other embodiments, the complex return signals are multiplied by a complex exponential formed from the Doppler frequency measured in the cross spectrum, and an FFT of the corrected signals is used for correlation with the code. In some embodiments, the correlation is determined using a finite impulse response (FIR) filter. After a correlation (also called a range profile, herein) is calculated for each code/signal block, the results are averaged over the M blocks, and the range to the target is calculated from the time delay of the peak in the averaged range profile. If there is more than one peak in the range profile, then the approach will record the range to multiple targets.

FIG. 4 is a flow chart that illustrates an example method 400 for using Doppler-corrected phase-encoded LIDAR system to determine and compensate for Doppler effects on ranges, according to an embodiment. Although steps are depicted in FIG. 4 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways. In some embodiment, steps 403 and 410 through 433 are performed by processing system 350. For example, determining the FFT of the digital code in step 403 and all of steps 410 through 433 are performed by Doppler compensation module 370 in FIG. 3A or module 371 in FIG. 3B.

In step 401, a transceiver, e.g., a LIDAR system, is configured to transmit phase-encoded optical signals based on input of a phase code sequence. A portion (e.g., 1% to 10%) of the unmodulated input optical signal from the laser, or the phase-encoded transmitted signal, is also directed to a reference optical path. The transceiver is also configured to receive a backscattered optical signal from any external object illuminated by the transmitted signals. In some embodiments, step 401 includes configuring other optical components in hardware to provide the functions of one or more of the following steps as well, as illustrated for example in FIG. 3A or FIG. 3B, or equivalents. Note that the transmitted signal need not be a beam. A diverging signal will certainly see a lot of different ranges and Doppler values within a single range profile; but, provide no cross range resolution within an illuminated spot. However, it is advantageous to use a narrow beam which provides inherent sparsity that comes with point by point scanning to provide the cross range resolution useful to identify an object.

In step 403 a code made up of a sequence of M*N symbols is generated for use in ranging, representing M blocks of N symbols, with no duplicates among the M blocks. In some embodiments, the Fourier transform of an RF signal with such phase encoding is also determined during step 403 because the transform can be used repeatedly in step 423 as described below and it is advantageous to not have to compute the Fourier transform separately for each transmission. For example, a complex (real and imaginary components) digital signal is generated with angular RF frequency co and phase π/2 according to the code is generated, and a complex digital Fast Fourier Transform (FFT) is computed for this complex digital signal. The resulting complex FFT function is prepared for the operation in step 423 by taking the complex conjugate of the complex signal. For example the complex conjugate of the complex FFT, $Code_{FFT}$, is represented by Equation 10 for each of M blocks of the code.

$$Code_{FFT}=\text{conj}(FFT(\exp(iBt))) \tag{10}$$

where conj( ) represents the complex conjugate operation, which is conj(x+iy)=x−iy. This complex FFT is stored, for example on a computer-readable medium, for subsequent use during step 423, as described below.

In step 405 a first portion of the laser output, represented by Equation 4, is phase-encoded using code received from digital code module 372 to produce a transmitted phase-encoded signal, as represented by Equation 6, and directed to a spot in a scene where there might be, or might not be, an object or a part of an object. In addition, in step 405 a second portion of the laser output is directed as a reference signal, as represented by Equation 5a or Equation 5b, also called a local oscillator (LO) signal, along a reference path.

In step 407, the backscattered returned signal, R, with any travel time delay Δt and Doppler shift $\omega_D$, as represented by Equation 7, is mixed with the reference signal LO, as represented by Equation 5a or Equation 5b, to output one or more mixed optical signals 362. The mixed signal informs on the in-phase and quadrature components. For example, in the embodiment illustrated in FIG. 3B, the mixed optical signals 362 include four optical signals that inform on in-phase and quadrature components, namely I+, I−, Q+, Q− as defined in Equations 8a through 8d. In other embodiments, other optical mixers are used. For example, in some embodiments, a 3×3 coupler is used in place of a 90 degree optical hybrid to still support I/Q detection.

In step 408, the mixed optical signals are directed to and detected at one or more optical detectors to convert the optical signals to one or more corresponding electrical signals. For example, in the embodiment illustrated in FIG. 3B, two electrical signals are produced by the detectors. One electrical signal on one channel (Ch 1) indicates down-mixed in-phase component I given by Equation 9a; and the other electrical signal on a different channel (CH 2) indicates down-mixed quadrature component Q given by Equation 9b. A complex down-mixed signal S is computed based on the two electrical signals, as given by Equation 11.

$$S=I+iQ \tag{11a}$$

Note that the signals S, I and Q are functions of time, t, of at least duration $D=M*N*\tau$.

In some embodiments, averaging is performed over several different return signals S(t) to remove spurious copies of the phase-encoded signal produced at internal optical components along the return signal path, such as PBS 322. Such spurious copies can decrease the correlation with the actual return from an external object and thus mask actual returns that are barely detectable. If the averaging is performed over a number P of different illuminated spots and returns such that a single object is not in all those illuminated spots, then the average is dominated by the spurious copy of the code produced by the internal optical components. This spurious copy of the code can then be removed from the returned signal to leave just the actual returns in a corrected complex electrical signal S(t). P is a number large enough to ensure that the same object is not illuminated in all spots. A value as low as P=100 is computationally advantageous for graphical processing unit (GPU) implementations; while a value as high as P=1000 is preferred and amenable to field-programmable gate array (FPGA) implementations. In an example embodiment, P is about 100. In other embodiments, depending on the application, P can be in a range from about 10 to about 5000. FIG. 11 is a block diagram that illustrates example multi-spot averaging to remove returns from internal optics, according to an embodiment. Steps 409 and 410 perform this correction.

In step 409 it is determined whether P returns have been received. If not, control passes to back to step 405 to illuminate another spot. If so, then control passes to step 410. In step 410 the average signal, $S_S(t)$ is computed according to Equation 11b where each received signal of duration D is designated $S_p(t)$.

$$S_S(t) = \frac{1}{P}\sum_{p=1}^{P} S_p(t) \quad (11b)$$

This average signal is used to correct each of the received signals $S_p(t)$ to produce corrected signals $S_{pC}(t)$ to use as received signal S(t) in subsequent steps, as given by Equation (11c)

$$S(t)=S_{pC}(t)=S_p(t)-S_S(t) \quad (11c)$$

In some embodiments, the internal optics are calibrated once under controlled conditions to produce fixed values for $S_S(t)$ that are stored for multiple subsequent deployments of the system. Thus step 410 includes only applying Equation 11c. In some embodiments, the spurious copies of the code produced by the internal optics are small enough, or the associated ranges different enough from the ranges to the external objects, that step 409 and 410 can be omitted. Thus, in some embodiments, steps 409 and 410 are omitted, and control passes directly from step 408 to step 411, using S(t) from step 408 rather than from Equation 11c in step 410.

In step 411, a cross spectrum is used to detect the Doppler shift. The following explanation is provided for purposes of illustration; however, the features and utility of the various techniques are not limited by the accuracy or completeness of this explanation. The frequency content of I and Q contain the Doppler (sinusoidal) and the Code (square wave). For the Doppler component, I is expected to lag or advance Q by 90 degrees as it is sinusoidal. The lag or advance depends on the sign of the Doppler shift. The code component does not demonstrate this effect—the I and Q levels that indicate the returning bits as a function of time move either in-phase or 180 degrees out of phase. The operation inside the brackets of the XS operation computes the complex phasor difference between I and Q at a given frequency. If there is a 90 degree phase difference between I and Q at a given frequency (as in the case of the Doppler component) this will be manifest in the imaginary part of the result. Code frequency content will conversely not appear in the imaginary part of the result, because as was stated above, the I and Q aspects of the code are either in phase or 180 degrees out of phase for the chose binary code, so the complex phasor difference at each frequency is always real. The cross spectrum operation, XS( ), can be viewed as a way of revealing only those aspects of the signal spectrum relating to Doppler, with the code dropping out. This makes it easier to find the Doppler frequency content. In contrast, in a regular spectrum of the return signal, the code frequency content could obscure the Doppler frequency content desired to make good Doppler estimates/corrections.

For example, the cross-spectrum of S is calculated as given by Equation 12.

$$XS(S)=FFF(I)*conj[FFT(Q)] \quad (12)$$

XS(S) resulting from Equation 12 is a complex valued array. The peaks in this cross spectrum represent one or more Doppler shifts $\omega_D$ in the returned signal. Any peak detection method may be used to automatically determine the peaks in the cross spectrum XS(S). In general, identification of large positive or negative peaks in the imaginary components of the cross spectrum will reveal information about Doppler shifts. However, under some special circumstances the real part may also reveal such information. An example of such a circumstance would be the presence of multiple range returns with similar Doppler values. Elevated amplitude in the real part can indicate such a circumstance. In some embodiments, the cross spectrum operation is performed separately on each block of data and averaged over the M blocks. These Doppler shifts and corresponding relative speeds are stored for further use, e.g., on one or more computer-readable media.

In step 413 the complex Fourier transform of the complex down mixed returned signal, S, is determined, for example using a complex FFT function FFT(S) implemented in hardware or software.

In step 421, the FFT(S) is shifted by the Doppler shift to produce a corrected spectrum, $S_{FFT}$, as given by Equation 14a or 14b, described below, for a current Doppler shift of the zero or more Doppler shifts observed in step 411. As indicated in Foucras 2014 equation 27, the time shift-theorem can be applied to achieve Doppler code compensation. Indeed, the time-shift frequency theorem is given by Equation 13.

$$\mathfrak{I}(x(t+\delta))=\exp(i\zeta\delta)F(\zeta) \quad (13)$$

where $\mathfrak{I}$ indicates the Fourier operator, x(t) is a function of time t, $\delta$ is a time shift, and $F(\zeta)$ indicates the Fourier transform of x(t). Then, for an FFT-based acquisition method, the code delay induced by code Doppler can be compensated by multiplying in the frequency domain the FFT of the local spreading code by the complex exponential. The advantage of this method is that if the Fourier transform of the spreading code sequence has been built and stored in the memory, then the Fourier transform of the receded (or extended) spreading code can be transformed to the frequency domain in a simple way. Then the correct spreading code can be produced quickly. This technique was patented by Krasner 1998. The effect of the Doppler is to frequency shift the spectrum of the code. Thus when using the convolution theorem to quickly compute the cross correlation, the frequency content of the measured code does not match the frequency content of the reference. By Doppler compensating, the frequency spectra are brought back into alignment and the cross correlation is again effective.

In some embodiments, the correct spectrum is computed using Equation 14a.

$$S_{FFT} = \text{circshift}(FFT(S), \omega_D) \quad (14a)$$

where circshift (x,y) shifts a function x of an independent variable over a finite domain by an amount y in the independent variable such that anything shifted off one end of the finite domain is shifted on to the opposite end of the finite domain. In some embodiments, the correct spectrum is computed using Equation 14b, which removes the Doppler effect by multiplication with a complex exponential and then calculating the FFT, as indicated in Equation 13.

$$S_{FFT} = FFT(S^* \exp(-i\omega_D t)) \quad (14b)$$

In step 423 the cross-correlation, XC, of the phase encoding, exp(iB(t)), with the corrected complex signal, Scorr, is determined, designated XC(Code, Scorr) for each of the M independent blocks of N symbols, and then averaged. In some embodiments, this is done by taking the inverse Fast Fourier Transform (invFFT) of the corrected complex spectrum $S_{FFT}$ and correlating that corrected complex return Scorr with the digital signal exp(iB(t)) representing the code, as given by Equation 15a.

$$XC(\text{Code}, \text{Scorr}) = \frac{1}{M} \sum_{m=1}^{M} \text{correl}[\exp(iB_m(t)), \text{invFFT}(S_{FFT})] \quad (15a)$$

where correl(x,y) is a function that determines the correlation of series x with series y and $B_m(t)$ is the code for the mth block. Both the invFFT and correl functions involve multiple operations on each member of the series. In some embodiments, computational resources are saved by performing a multiply in Fourier space using the $S_{FFT}$ already determined in step 421, and then taking an inverse FFT, as given by Equation 15b.

$$XC(\text{Code}, \text{Scorr}) = \frac{1}{M} \sum_{m=1}^{M} \text{invFFT}[FFT\{\exp(iB_m(t))\} * (S_{FFT})] \quad (15b)$$

Any peaks in the XC(Code, Scorr) are used to determine a delay time, Δt, at the current Doppler shift, and the zero or more delay times are used to compute zero or more corresponding ranges at the current Doppler shift.

In some embodiments, the FFT based convolution to determine the cross correlation (XC) can also be efficiently performed with a finite-impulse-response (FIR) filter based convolution as given by Equation 15c. This has the potential to be more efficient for some shorter code lengths and in some computational hardware settings (FPGA). For each range bin, k, in the cross-correlation.

$$XC(\text{Code}, \text{Scorr}, k) = \quad (15c)$$
$$\frac{1}{M} \sum_{m=1}^{M} \text{circshift}[\exp(iB_m(t)), k] * \text{invFFT}[(S_{FFT})]$$

Note that the dot multiply (*) implies a series of inner products at different shifts (k) between the reference code $B_m$ and the corrected signal S. As can be seen, the FIR approach of FIG. 15c implies a simple register shift operation and simple multiply compared to the more complicated FFT method of FIG. 15b. The repeated shift and multiply of the FIR approach can be more computationally efficient for shorter codes, B.

In step 425, it is determined whether there is another Doppler shift, e.g., when more than one Doppler shift is detected in step 411. If so, control passes back to step 421 to correct the complex return spectrum FFT(S) with the next Doppler shift. If not, control passes to step 427. In step 427, Doppler ambiguity, if any, is removed, for example, by coincidence processing as described above. There exists some potential for so called "split-pixel" scenarios to occur while scanning. In such scenarios, the beam may be clipped so that part of it measures a surface at one range and Doppler and the other part(s) measures different range(s) and Doppler(s). In such a scenario, an efficient processing strategy is required to extract all relevant information. For example, the cross spectrum could sense multiple non-zero Doppler values. This would lead to multiple Doppler corrections and cross correlations. One strategy is to coherently sum the Doppler corrected time domain signals prior to a single cross correlation. This avoids the computational burden of multiple cross correlations at the expense of some ambiguity in the range-Doppler pairing and the addition of the noise component of each corrected signal to the final range profile. The ambiguity could be sorted out with a spatial correspondence algorithm designed to find the "most likely" range-Doppler pairing on the basis of spatial proximity to non-ambiguous (single range-Doppler) points. The additive noise may not be sufficient to be a concern. This processing strategy is worth considering as multi-return capability can be desirable for some users. In some embodiments, step 427 is omitted and control passes directly to step 431.

In step 431, it is determined whether there is another spot to illuminate in a scene of interest, e.g., by scanning to view a new spot in the scene of interest. If so, control passes back to step 405 and following steps to illuminate the next spot and process any returns. In some embodiments using multi-spot averaging, the new spot is added to the average and the oldest spot is removed, or P new spots are collected in the loop formed by steps 405 through 409. If there is not another spot to illuminate, then the results are used, and control passes to step 433.

In step 433, a device (e.g., a vehicle) is operated based on the Doppler effect or the corrected ranges. In some embodiments, this involves presenting on a display device an image that indicates a Doppler corrected position of any object at a plurality of spots illuminated by the transmitted optical signal. In some embodiments, this involves communicating, to the device, data that identifies at least one object based on a point cloud of Doppler corrected positions at a plurality of spots illuminated by transmitted optical signals. In some embodiments, this involves presenting on a display device an image that indicates a size of the Doppler effect at a plurality of spots illuminated by the transmitted optical signals, whereby moving objects are distinguished from stationary objects and absent objects. In some embodiments, this involves moving a vehicle to avoid a collision with an object, wherein a closing speed between the vehicle and the object is determined based on a size of the Doppler effect at a plurality of spots illuminated by the transmitted optical signal. In some embodiments, this involves identifying the vehicle or identifying the object on the collision course based on a point cloud of Doppler corrected positions at a plurality of spots illuminated by the transmitted optical signal. Filtering the point cloud data based on Doppler has the effect of identifying and removing vegetation that may be moving in the breeze. Hard objects, man-made objects, or dense objects are then better revealed by the filtering process. This can be advantageous in defense and surveillance scenarios. In the vehicle scenario—the Doppler can be used to segment objects (i.e. road surface versus moving vehicle).

Figure 10:
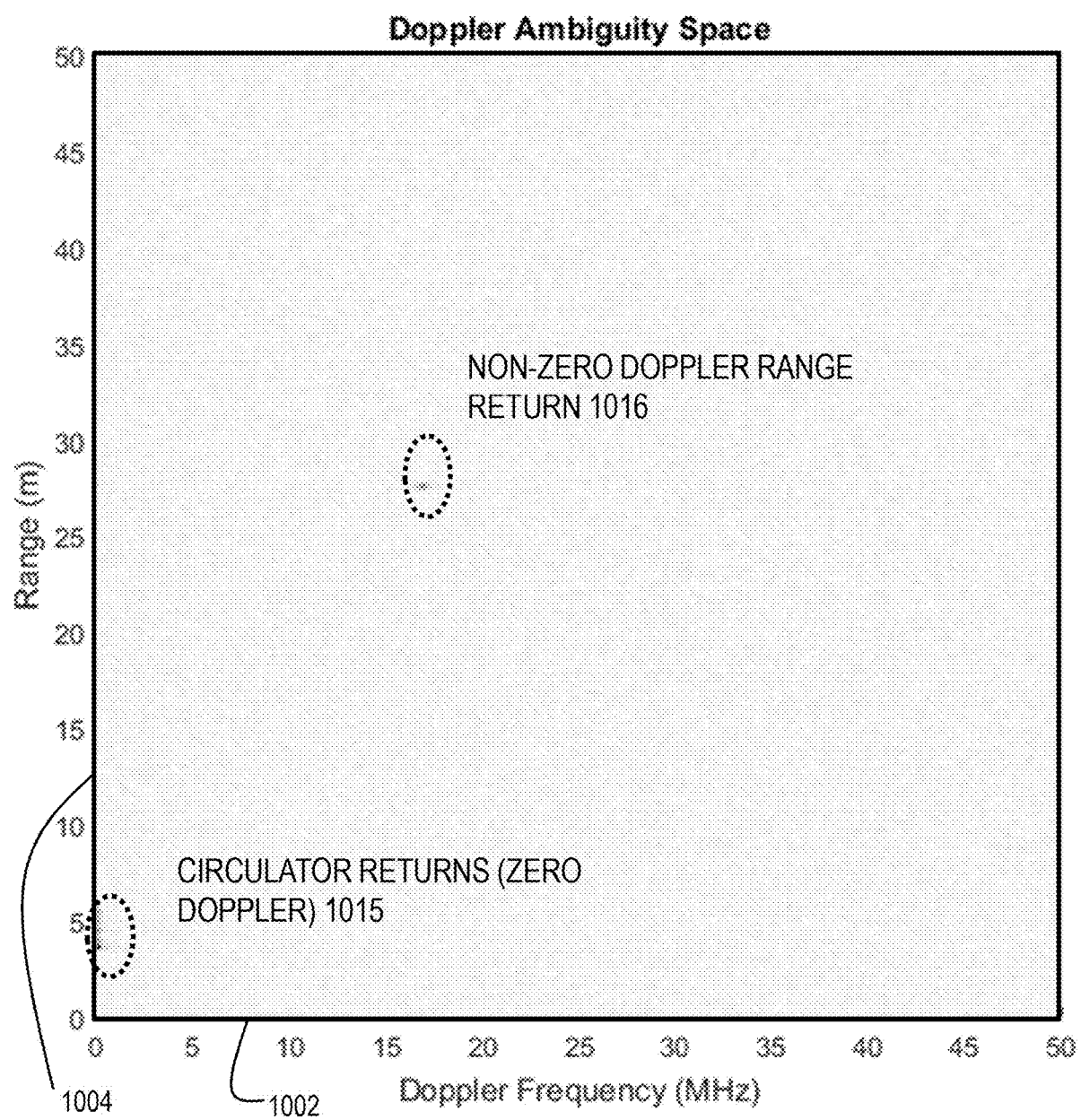
FIG. 10 is a graph that illustrates an example Doppler Ambiguity space, to show easily distinguished Doppler effects, according to an embodiment.

In some embodiments with multiple Doppler shifts for a single return, step 433 includes associating each delay time with one of the Doppler shifts, assuming that a particular return is based on an object or part of an object moving at a particular average speed over the duration of one transmitted signal. for a given Doppler correction, only those range peaks associated with that Doppler correction will be present in the cross correlation. So it is improbable to incorrectly pair a given range and Doppler in the case of multiple instances. Put another way, the ambiguity function of this approach guarantees that there can be no confusion. This is demonstrated in the example embodiment below with reference to FIG. 10 showing "Doppler Ambiguity Space". This image was created by mapping out the range-Doppler space by computing the ranging cross-correlation at a wide set of possible Doppler corrections. The spots indicate the returns and the space is indeed very sparse.

4. EXAMPLE EMBODIMENTS

In these example embodiments, the LIDAR system used components illustrated above to produce phase-encoded optical transmitted signals. In these embodiments, the symbol time (pulse width) was 2 nanoseconds (ns, 1 ns=10-9 seconds), the number of symbols per block, N, was 2048 and the number of blocks was 5. A variety of targets at ranges from about 0 to about 250 meters were used and illuminated with a beam spot size from about 5 to about 20 mm in diameter.

Figure 5A:
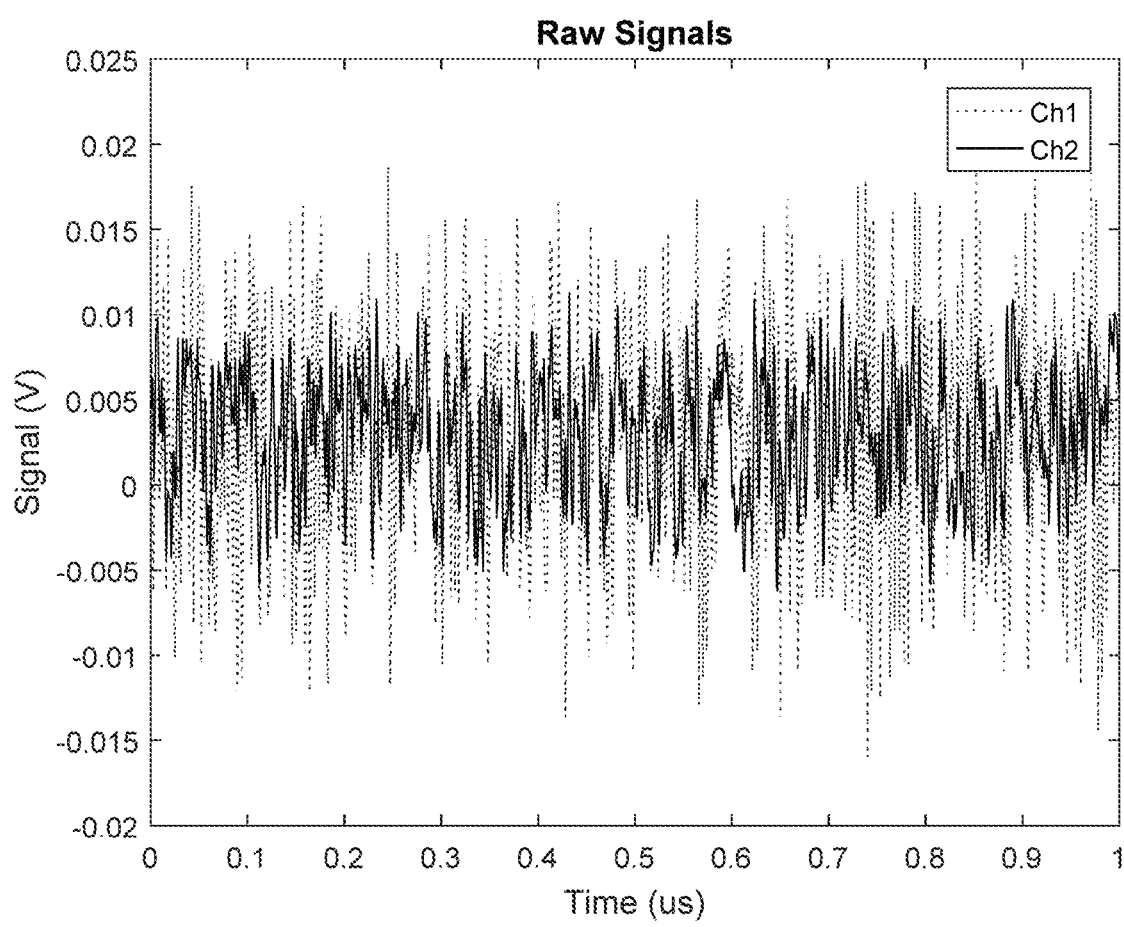
FIG. 5A is a graph that illustrates example electrical in-phase and quadrature amplitudes output by optical detectors for an essentially stationary object that does not introduce a significant Doppler shift, according to an embodiment.
Figure 5B:
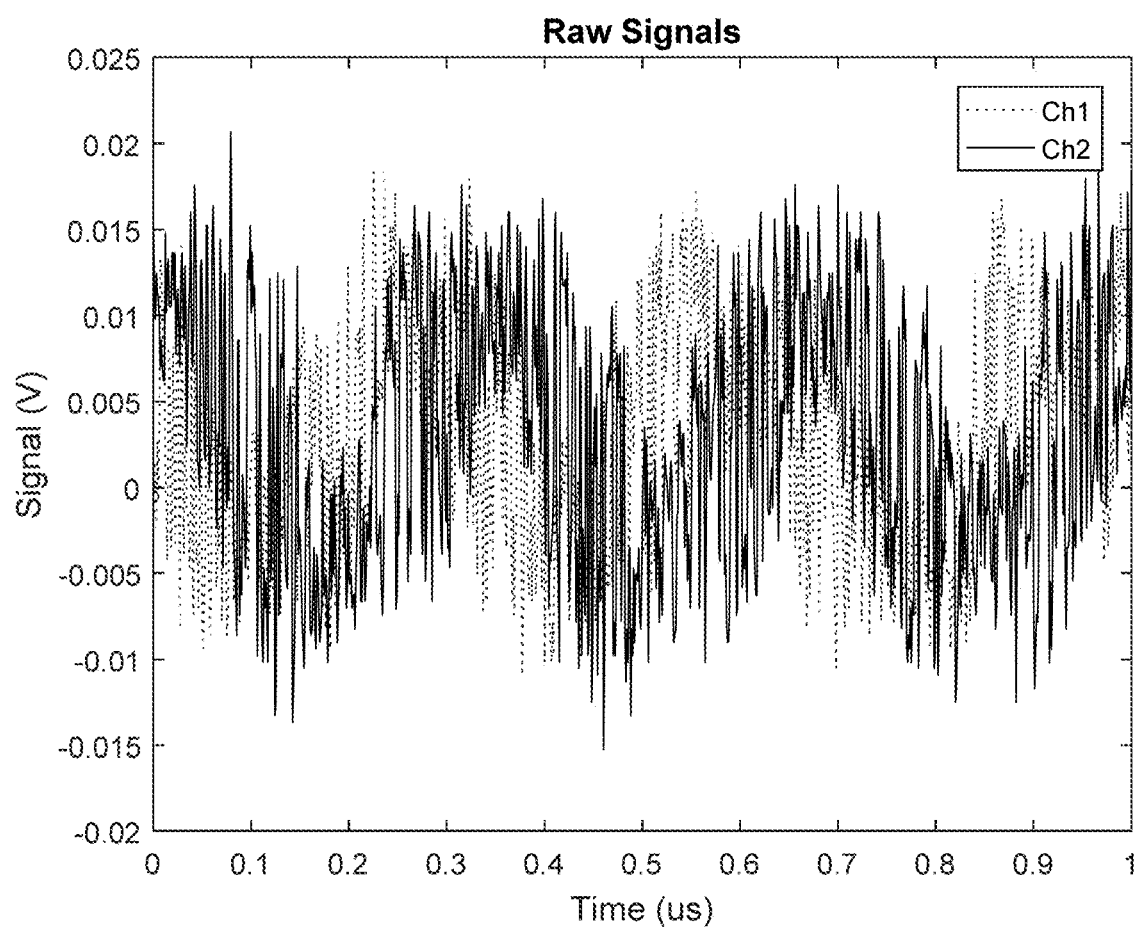
FIG. 5B is a graph that illustrates example electrical in-phase and quadrature amplitudes output by optical detectors for a moving object that does introduce a significant Doppler shift, according to an embodiment.

FIG. 5A is a graph that illustrates example electrical in-phase (I) and quadrature (Q) output by optical detectors for an essentially stationary object that does not introduce a significant Doppler shift, according to an embodiment. The horizontal axis indicates time of arrival from a start time at zero in microseconds ($\mu$s, 1 $\mu$s=$10^{-6}$ seconds). The vertical axis indicates electrical signal in volts. The drawing labels I as Ch1, and Q as Ch2, and $\mu$s as us. Data is plotted for a single block of 2048 pulses. FIG. 5B is a graph that illustrates example electrical amplitude and quadrature output by optical detectors for a moving object that does introduce a significant Doppler shift, according to an embodiment. The horizontal axis indicates time of arrival from a start time at zero in $\mu$s. The vertical axis indicates electrical signal in volts. The drawing labels I as Ch1, and Q as Ch2, and $\mu$s as us. The Doppler component of the return is evident as a sinusoidal pattern with a period of about 0.3 $\mu$s in both the in-phase, Ch1, and quadrature, Ch2, signals, corresponding to a Doppler shift of about 3 MHz This example used 1.55 micron wavelength (193.414489 THz), so this indicates a speed of about 4.7 m/s. This Doppler effect interferes with the correlation of the raw signal with the encoded phase exp(iB(t)).

Figure 6A:
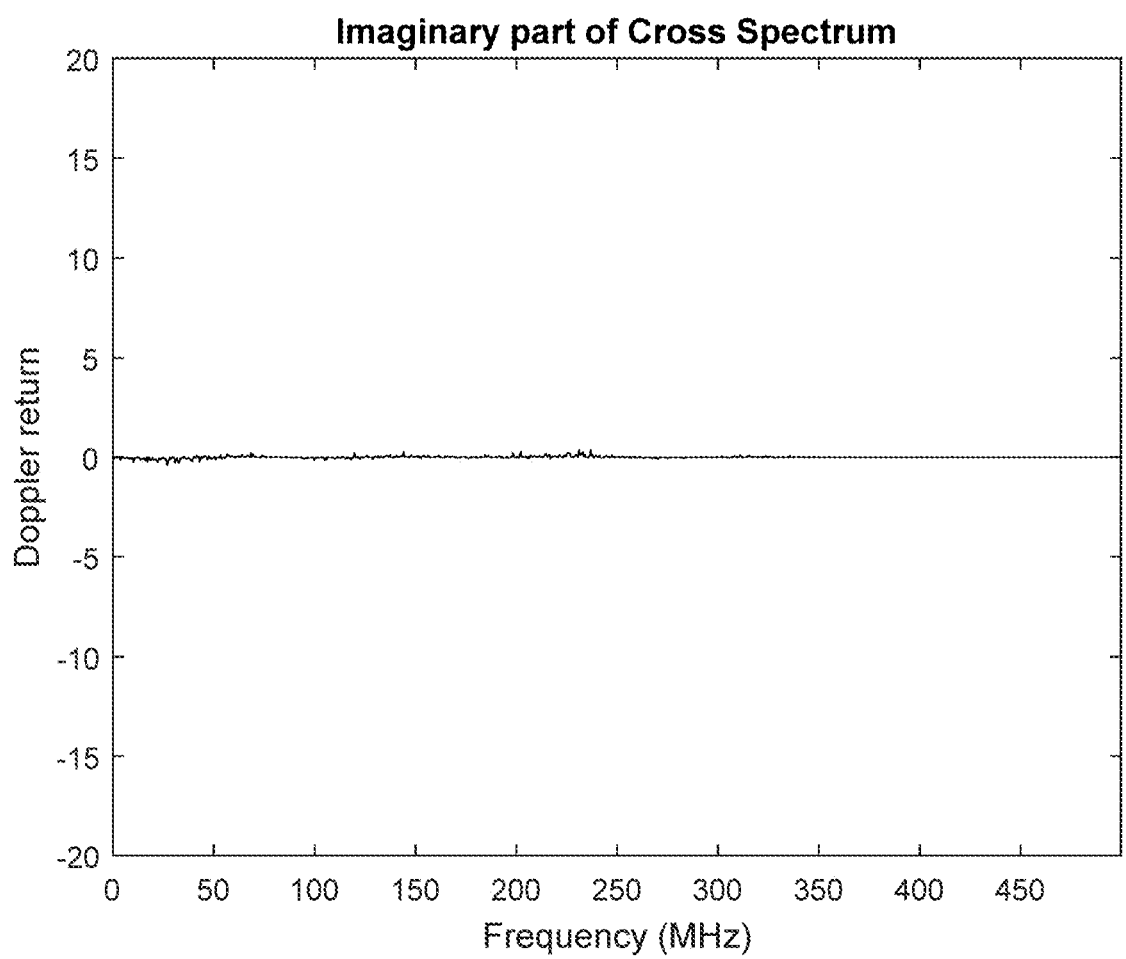
FIG. 6A is a graph that illustrates an example cross spectrum for the in-phase and quadrature components of the returned signals for an essentially stationary object that does not introduce a significant Doppler shift, according to an embodiment.

FIG. 6A is a graph that illustrates an example cross spectrum for the in-phase and quadrature components of the returned signals for an essentially stationary object that does not introduce a significant Doppler shift, according to an embodiment. The horizontal axis indicates frequency in megahertz over a span from 0 to 450 MHz. The vertical axis indicates amplitude of the imaginary component of the cross spectrum in arbitrary units and extends from −20 to +20. As indicated by Equation 12, for example, this amplitude is expected to reveal peaks at Doppler shift frequencies; and, so the drawing vertical axis is labeled Doppler return. A trace in FIG. 6A shows no evident peak; thus, any target is not moving with respect to the LIDAR system and no Doppler compensation is needed or applied.

Figure 6B:
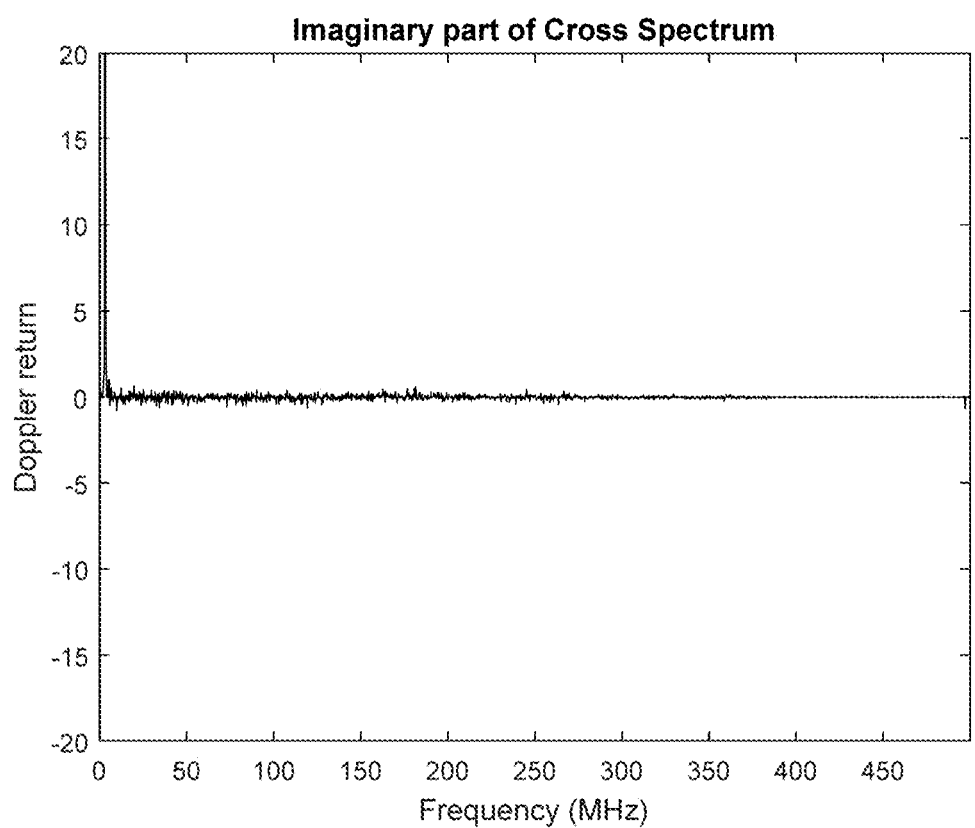
FIG. 6B and FIG. 6C are graphs that illustrate an example cross spectrum for the in-phase and quadrature components of the returned signals for a moving object that does introduce a significant Doppler shift, according to an embodiment.
Figure 6C:
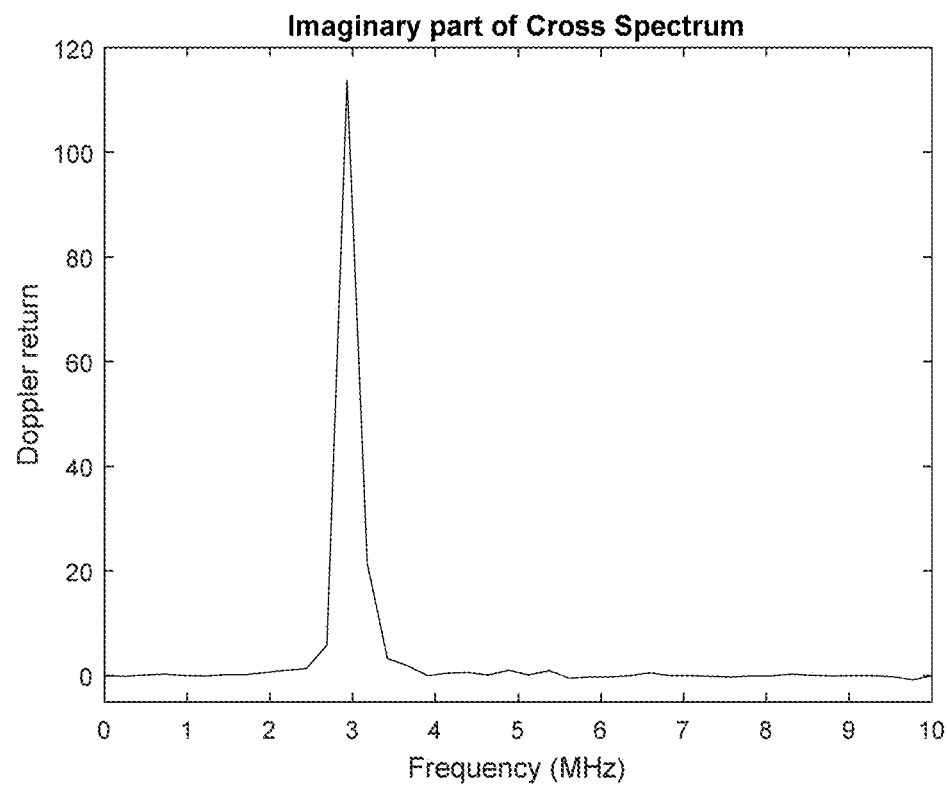

FIG. 6B and FIG. 6C are graphs that illustrate an example cross spectrum for the in-phase and quadrature components of the returned signals for a moving object that does introduce a significant Doppler shift, according to an embodiment. In FIG. 6B, the horizontal axis indicates frequency in megahertz and spans the same extent as in FIG. 6A. The vertical axis indicates amplitude of the imaginary component of the cross spectrum (indicative of Doppler return) in arbitrary units, and also spans the same extent as in FIG. 6A. A trace in FIG. 6B shows significant amplitude at low frequencies, below about 10 MHz; thus, some object is moving with respect to the LIDAR system and some Doppler compensation is applied in various embodiments. In FIG. 6C, the low frequency portion of the trace is expanded. The horizontal axis indicates frequency in megahertz and spans $\frac{1}{45}$th of the range spanned in FIG. 6A, extending only to 10 MHz. The vertical axis indicates amplitude of the imaginary component of the cross spectrum (indicative of Doppler return) in arbitrary units; and, extends from 0 to 120, 3 times the extent of the vertical axes in FIG. 6A and FIG. 6B and 6 times the positive portion of the vertical axis in the previous plots. The trace shows a clear peak at 3 MHz with a value over 110 arbitrary units.

Figure 7A:
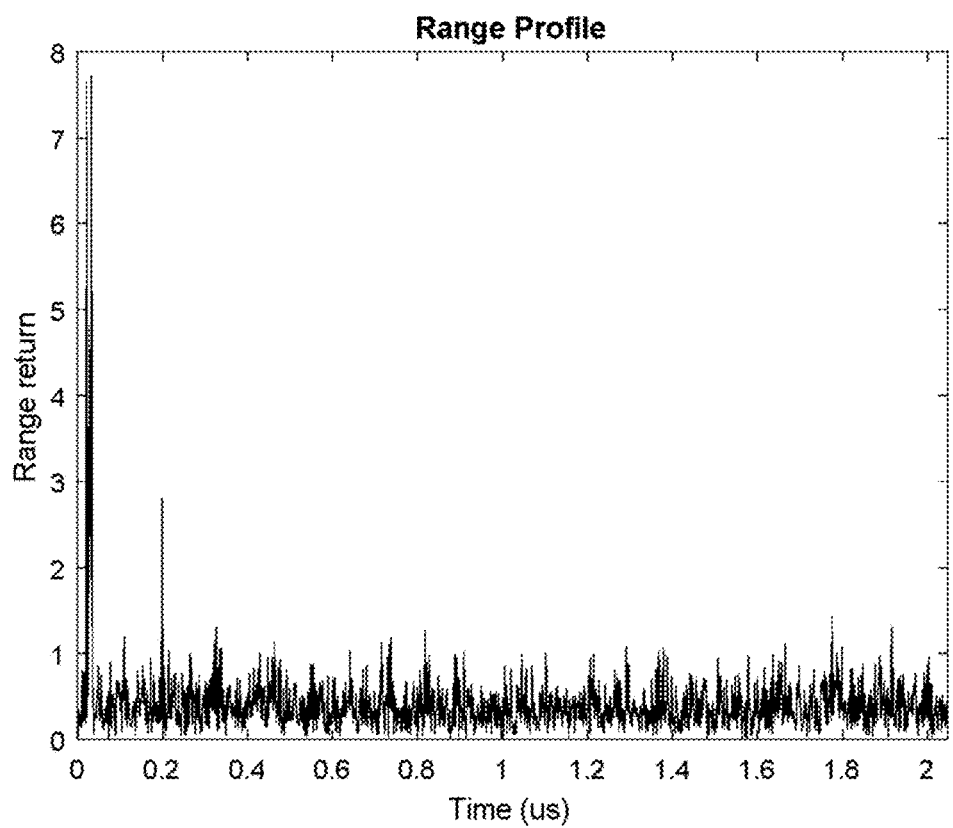
FIG. 7A and FIG. 7B are graphs that illustrate an example trace of cross-correlation amplitude versus time (range profile) in the returned signal for an essentially stationary object without averaging over several blocks of the transmitted signal, according to an embodiment.
Figure 7B:
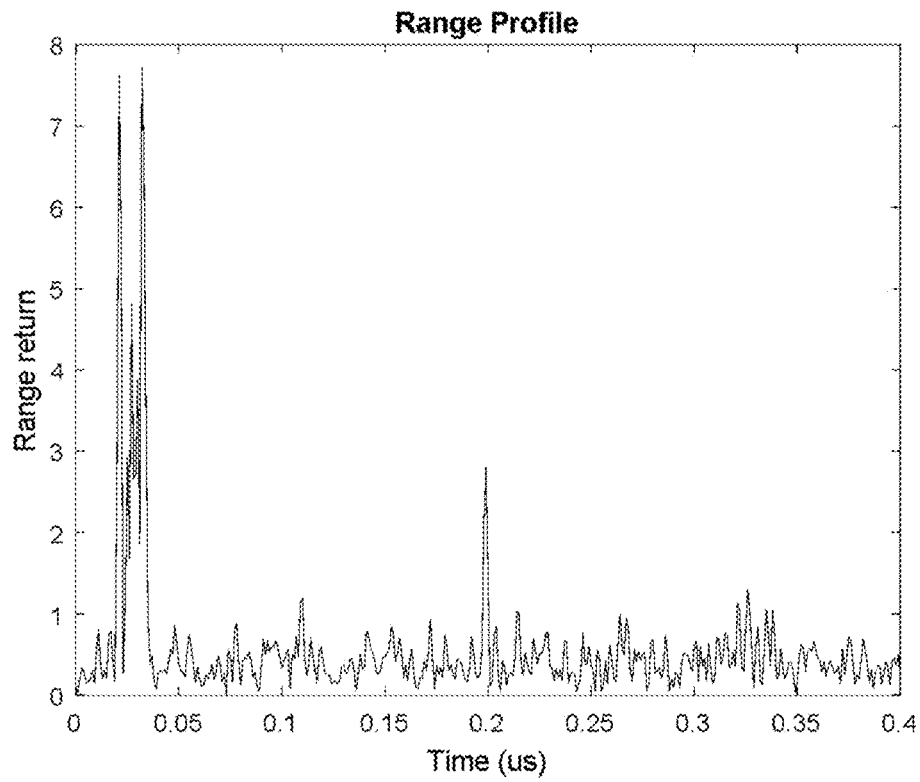

Incoherent averaging over M blocks reduces noise as demonstrated in FIG. 7A through FIG. 7D for a stationary object. FIG. 7A and FIG. 7B are graphs that illustrate an example trace of cross-correlation amplitude versus time (range profile) in the returned signal for an essentially stationary object without averaging over several blocks of the transmitted signal, according to an embodiment. In FIG. 7A, the horizontal axis indicates travel time in microseconds ($\mu$s, labelled us) and spans travel times from 0 to 2 microseconds. The vertical axis indicates amplitude of the cross-correlation (indicative of a backscattered return signal) in arbitrary units. A trace in FIG. 7A shows significant amplitude at two travel times, near 0 and near 0.2 $\mu$s. The large peak near time=0 is a return from the polarizing beam splitter 322, and the shorter peak near time=0.2 $\mu$s (us) is a return from a target object. In FIG. 7B, the short travel time portion of the trace is expanded. The horizontal axis indicates time in microseconds (us) and spans $\frac{1}{5}$th of the range spanned in FIG. 7A, extending only to 0.4 $\mu$s (us). The vertical axis is the same as the vertical axis in FIG. 7A. While both traces show a backscattered return at 0.2 $\mu$s, the traces are somewhat noisy which makes automatic detection and characterization of peaks challenging. The peak at travel time delay $\Delta t=0.2$ $\mu$s corresponds to a range of about 30 meters (m) for a speed of light, c=$3\times10^8$ meters per second (m/s), according to Equation 3.

Figure 7C:
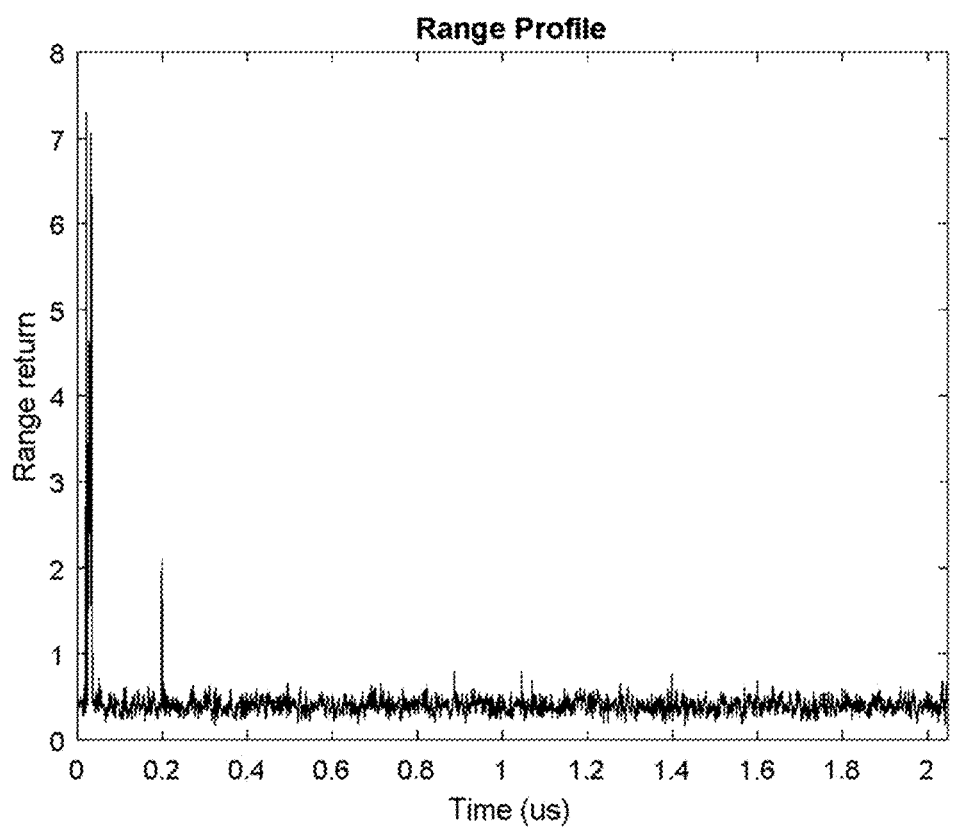
FIG. 7C and FIG. 7D are graphs that illustrate an example trace of cross-correlation amplitude versus time (range profile) in the returned signal for an essentially stationary object with averaging over several blocks of the transmitted signal, according to an embodiment.
Figure 7D:
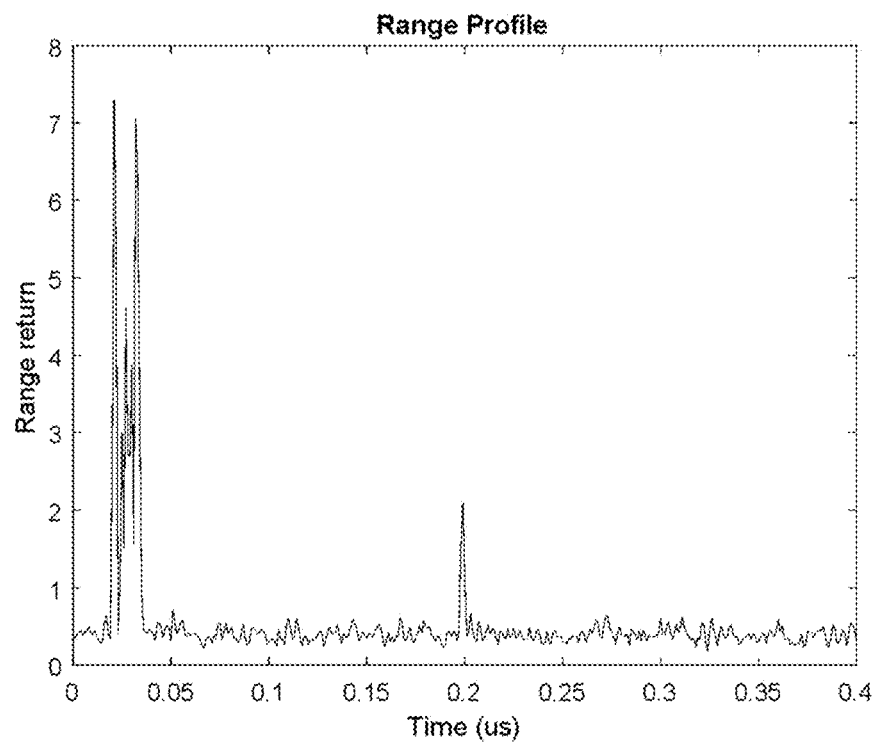

FIG. 7C and FIG. 7D are graphs that illustrate an example trace of cross-correlation amplitude versus time (range profile) in the returned signal for an essentially stationary object with averaging over several blocks of the transmitted signal, according to an embodiment. The horizontal and vertical axes are as in FIG. 7A and FIG. 7B, respectively. Again both traces show a backscattered return at 0.2 $\mu$s. However, compared to FIG. 7A and FIG. 7B, the traces of FIG. 7C and FIG. 7D, respectively, are noticeably less noisy, which makes automatic detection and characterization of peaks less difficult.

Figure 8A:
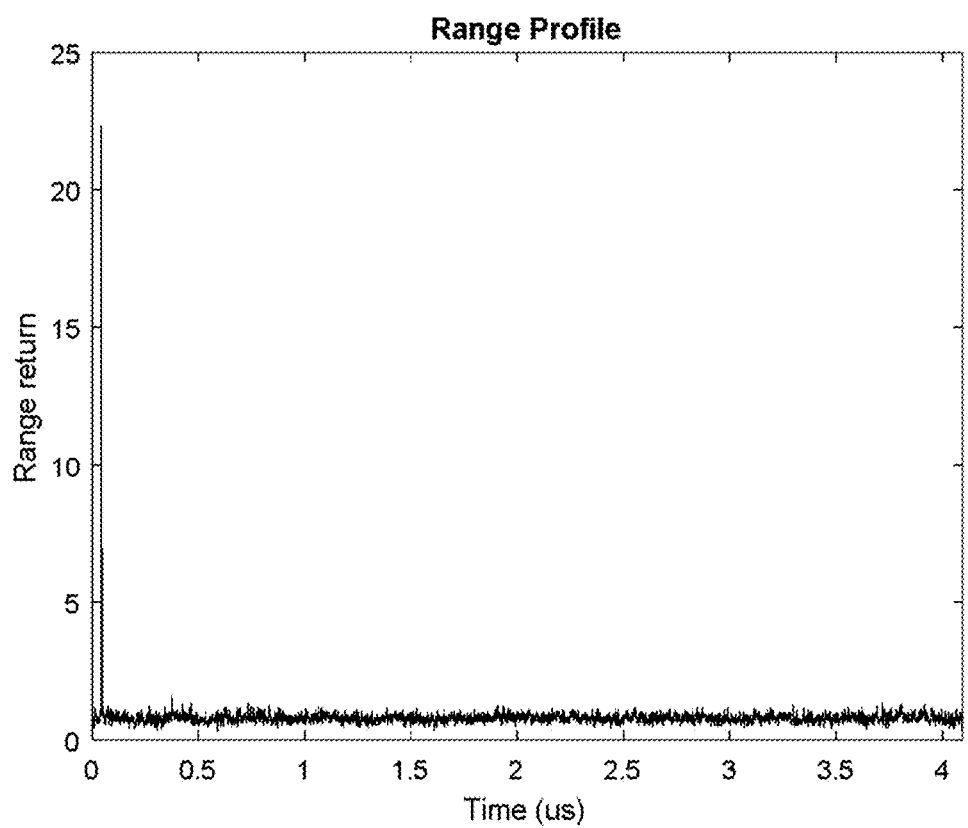
FIG. 8A and FIG. 8B are graphs that illustrate an example trace of cross-correlation amplitude versus time (range profile) in the returned signal for a moving object with Doppler compensation, according to an embodiment.
Figure 8B:
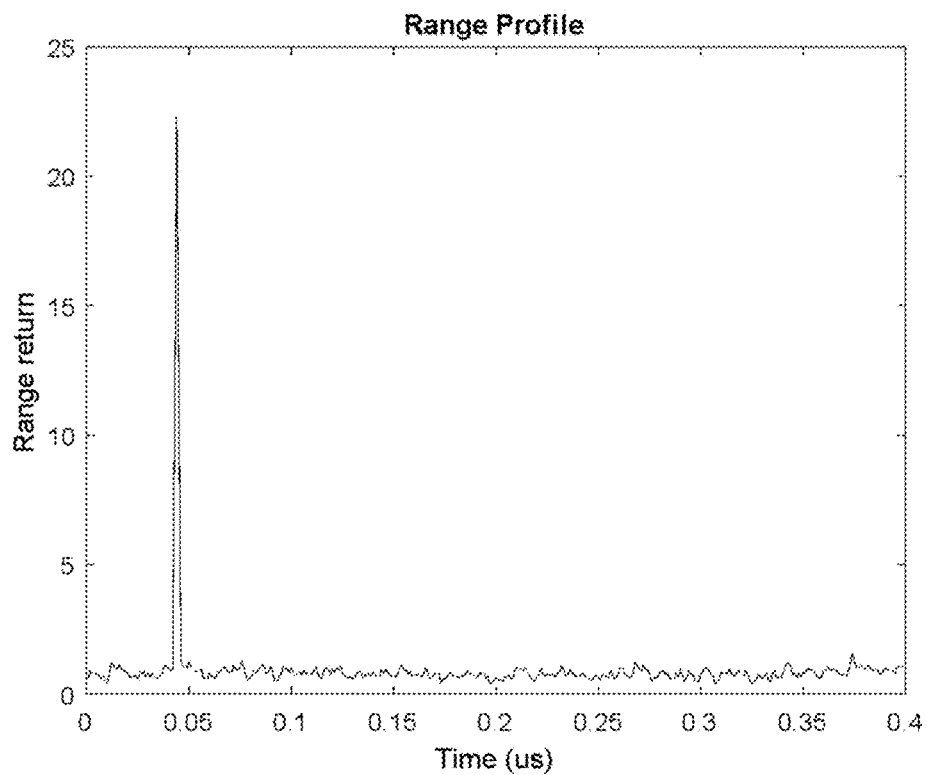

With averaging and Doppler compensation, as described herein, the correct range to an object can be determined. FIG. 8A and FIG. 8B are graphs that illustrate an example trace of cross-correlation amplitude versus time (range profile) in the returned signal for a moving object with Doppler compensation, according to an embodiment. In FIG. 8A, the horizontal axis indicates travel time in microseconds (us) and spans travel times from 0 to 4 microseconds (labeled us), twice the span of the horizontal axis in FIG. 7A and FIG. 7C. The vertical axis indicates amplitude of the cross-correlation (indicative of a backscattered return signal) in arbitrary units, spanning values from 0 to 25, more than three times the span of the vertical axis in FIG. 7A through FIG. 7D. A trace in FIG. 8A shows significant amplitude at one travel time, near 0.1. In FIG. 8B, the short travel time portion of the trace is expanded. The horizontal axis indicates time in microseconds (us) and spans $\frac{1}{10}$th of the range as FIG. 8A, extending only to 0.4 μs (us). The vertical axis is the same as the vertical axis in FIG. 8A. A peak indicating two-way travel time is clearly evident in the trace of FIG. 8B at about 0.05 μs, which corresponds to a range of about 7.5 meters (m) for a speed of light, $c=3\times10^8$ meters per second (m/s), according to Equation 3. In FIG. 8A and FIG. 8B, the returns from the PBS 322 are absent from the range profile due to the Doppler compensation.

Figure 9A:
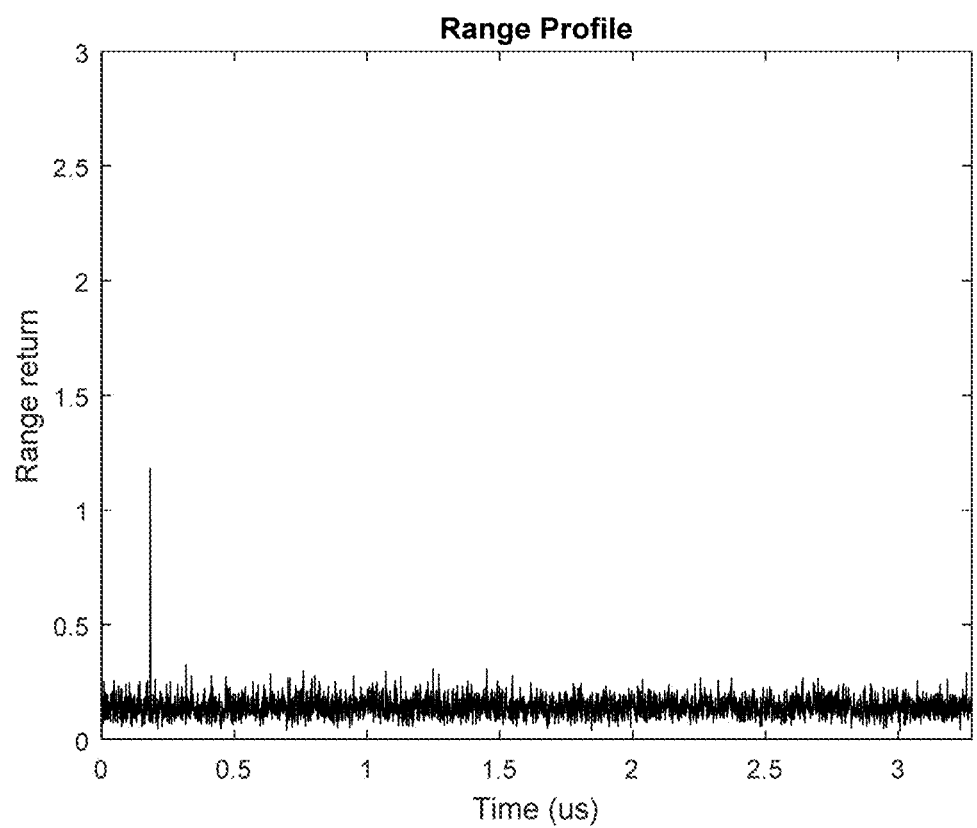
FIG. 9A is graph that illustrate an example trace of cross-correlation amplitude versus time (range profile) in the returned signal for a moving object, with Doppler compensation based on a mixed optical signal that is NOT separated into in-phase optical signal and a quadrature optical signal, according to an embodiment.

FIG. 9A is graph that illustrate an example trace of cross-correlation amplitude versus time (range profile) in the returned signal for a moving object, with Doppler compensation based on a mixed optical signal that is NOT separated into in-phase optical signal and a quadrature optical signal, according to an embodiment. The horizontal axis indicates time in microseconds (μs, signified by the abbreviation us); and, the vertical axis indicates cross correlation indicative of a return signal detected. In this embodiment the target was an actively rotating fan blade. The configuration uses only the real part of the mixed optical signal 362 depicted in FIG. 3A, that does not separate out in-phase (I) and quadrature (Q) components. The trace indicates a return is detected at about 0.2 μs.

Figure 9B:
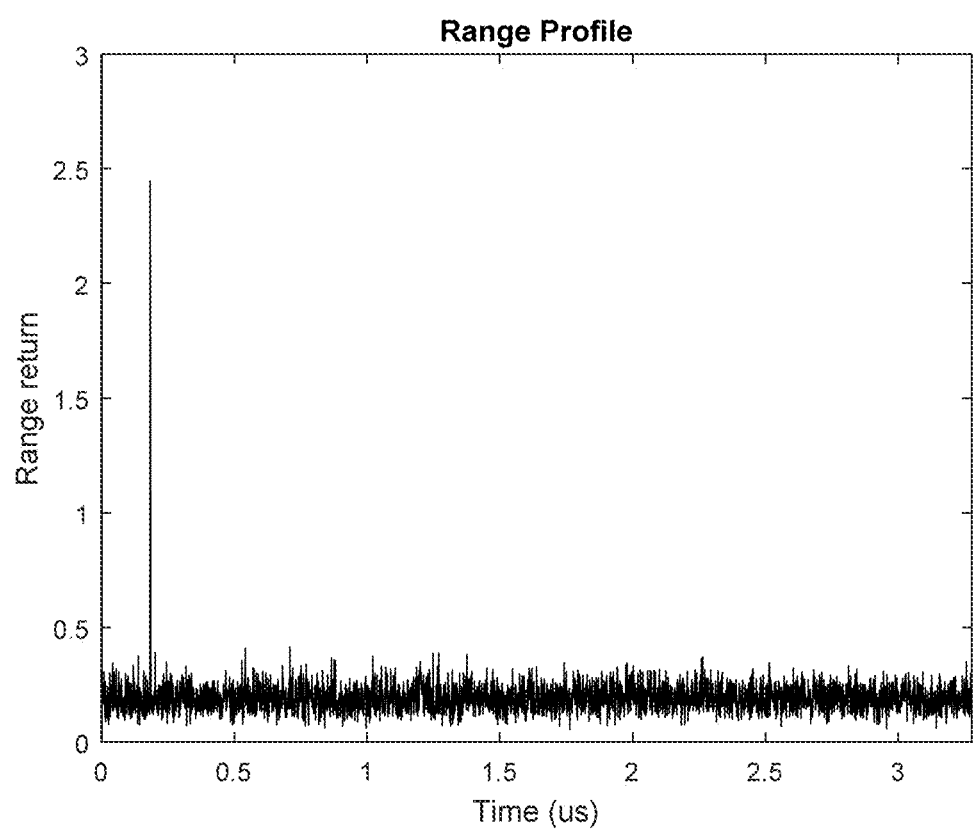
FIG. 9B is graph that illustrate an example superior trace of cross-correlation amplitude versus time (range profile) in the returned signal for a moving object, with Doppler compensation based on a mixed optical signal that is separated into in-phase optical signal and a quadrature optical signal, according to an embodiment.

FIG. 9B is graph that illustrate an example superior trace of cross-correlation amplitude versus time (range profile) in the returned signal for a moving object, with Doppler compensation based on a mixed optical signal that is separated into in-phase optical signal and a quadrature optical signal, according to an embodiment. The horizontal axis indicates time in microseconds (μs, signified by the abbreviation us); and, the vertical axis indicates cross correlation indicative of a return signal detected. In this embodiment the target was the same actively rotating fan blade as used for the data in FIG. 9A. The configuration uses separated in-phase (I) and quadrature (Q) components depicted as optical signals 364 in FIG. 3B. The trace indicates a return is detected at about 0.2 μs, again; but in this embodiment the cross correlation is much higher. This indicates the technique using separate in-phase and quadrature optical signals out of the optical mixer is more robust against noise and more likely to give good detections at longer ranges.

FIG. 10 is a graph that illustrates an example Doppler Ambiguity space, to show easily distinguished Doppler effects, according to an embodiment. This image was created by mapping out the range-Doppler space by computing the ranging cross-correlation at a wide set of possible Doppler corrections. The horizontal axis indicates Doppler Frequency in MHz; and the vertical axis indicates range in meters. Intensity of the cross correlation is indicated by darkness of pixels. The only dark pixels are in area 1015 indicating circulator output that did not leave the device and therefore has no Doppler and in area 1016 indicating a Doppler of about 17 MHz at a range of about 27 meters. The space is indeed very sparse.

It was found in experimentation that backreflections from the optical surfaces in the system contribute to a series of very large range returns in the range profile. These large returns cause large sidelobe structures in the range profile (power of cross correlation with phase code versus time intervals that correspond to range bins) that could obscure smaller range returns from real targets. To combat this issue, a coherent processing scheme was devised (as describe above with reference to steps 409 and 410 of FIG. 4) to subtract an estimate of the portion of the signal pertaining to the circulator optics. This approach relies on the coherence of the return from the circulator optics over several (more than about 32) subsequent codes. In time, this would be at least several tens of microseconds. As the circulator return is stable during the scan of the beam, a coherent average (using complex numbers) of blocks of time over the duration of stability is sufficient to estimate the portion of the signal pertaining to the circulator optics. As the beam is scanning, the signal pertaining to true targets is not consistent; and, these components average out in this operation. With the correction, $S_S(t)$, in hand, it is applied by coherently subtracting the complex vector from the subset of code blocks. The result is an extremely effect reduction in the strength of the circulator range returns and the associated sidelobes.

Figure 12A:
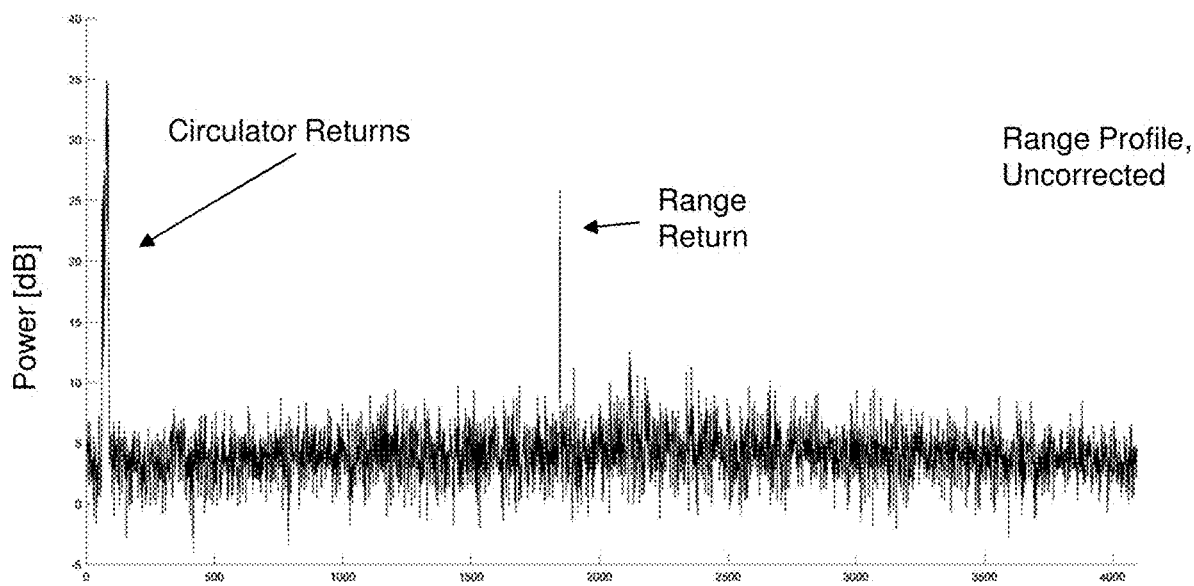
FIG. 12A through FIG. 12D are graphs that illustrate example range signals before and after corrections to remove returns from internal optics, according to an embodiment.
Figure 12B:
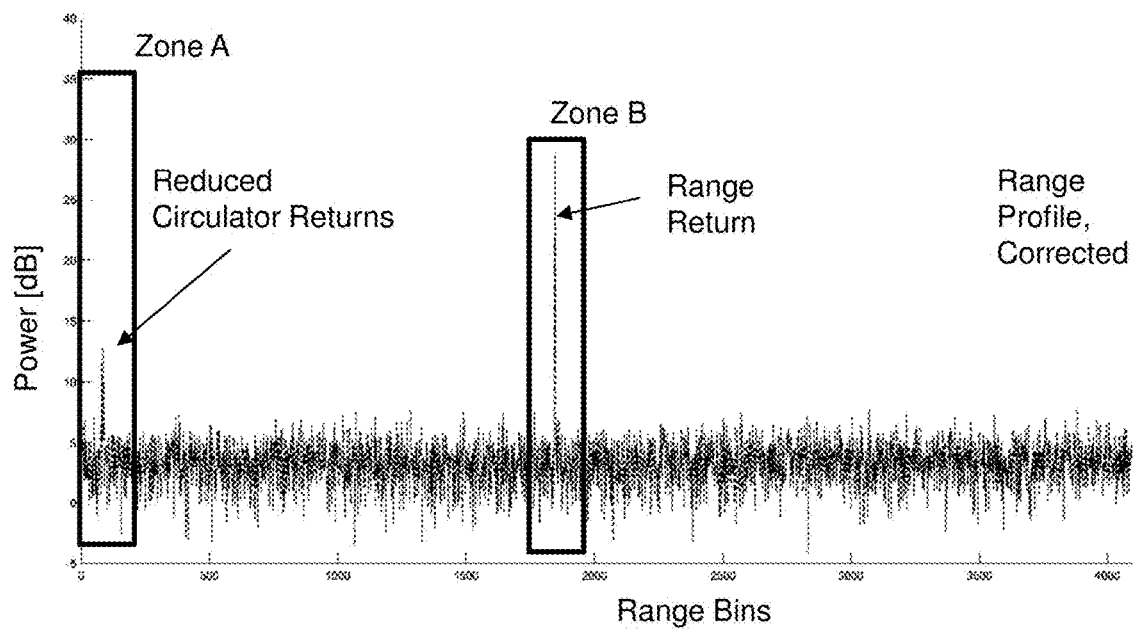
Figure 12C:
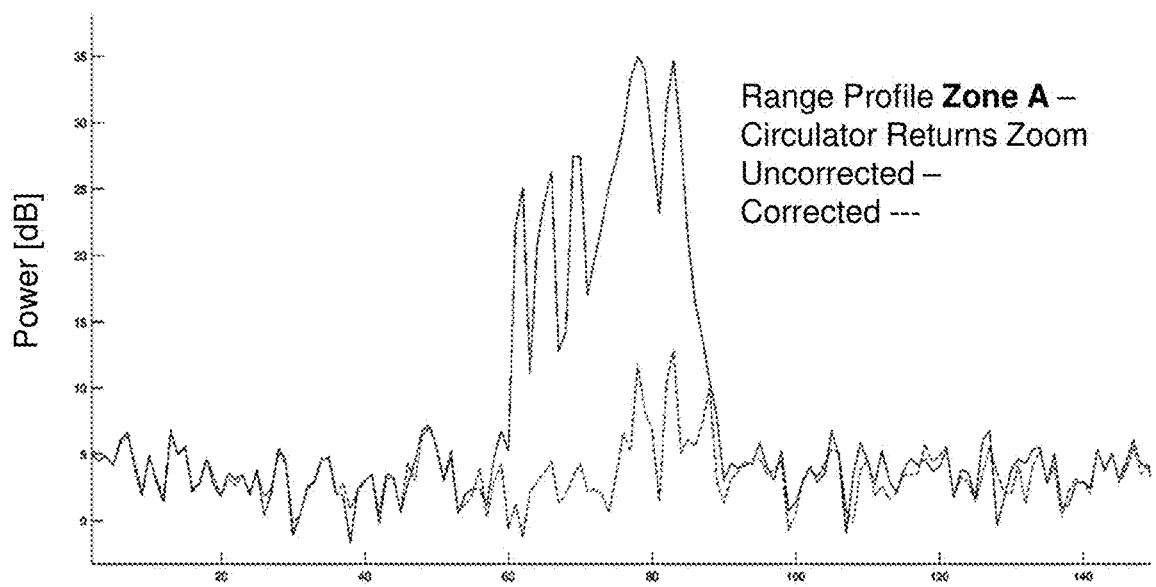
Figure 12D:
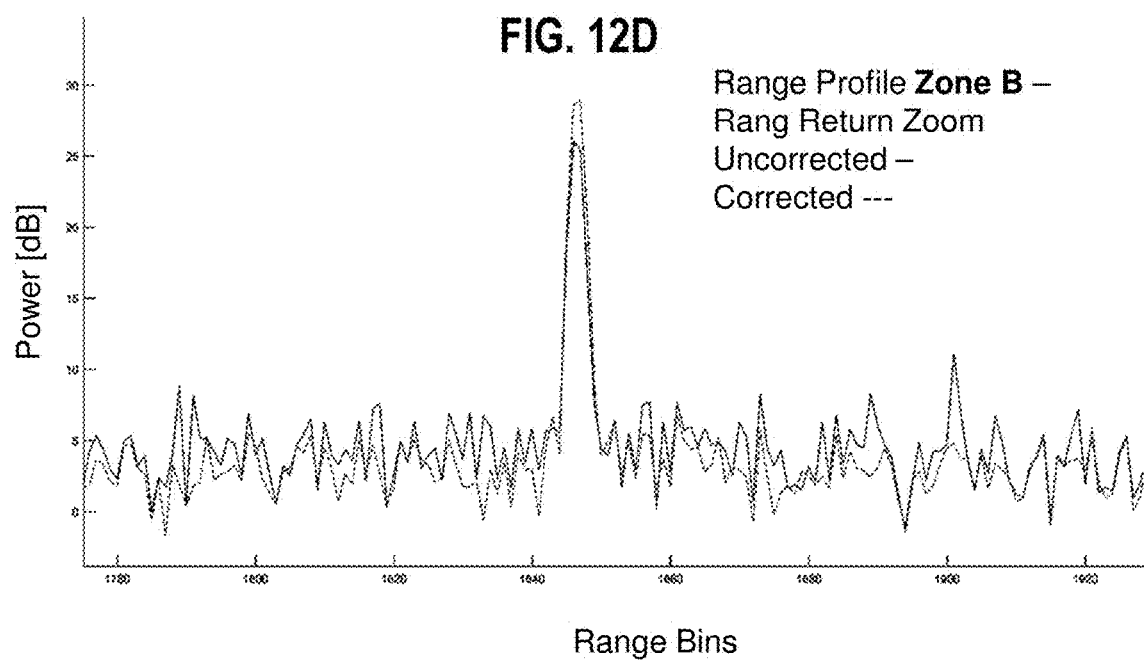

FIG. 12A through FIG. 12D are graphs that illustrate example range signals before and after corrections to remove returns from internal optics, according to an embodiment. In FIG. 12A, the horizontal axis indicates range bins in meters from zero to over 4000 m; and, the vertical axis indicates cross correlation power in decibels (dB, 1 dB=log(y/$y_o$) relative to reference $y_o$). The trace shows the correlation peaks before subtracting the average of 32 spots. A large peak appears about 100 m and a smaller peak at about 2000m. In FIG. 12B, the axes are the same, but the trace shows the correlation peaks after correction by subtracting the average of 32 spots. The spurious peak at about 100 m due to internal optical components (here, a circulator used in place of PBS 322) is greatly reduced and the peak at about 2000 m due to an actual external object is somewhat enhanced. This is shown more clearly in FIG. 12C which expands the region of Zone A near the returns from the internal optical components, and in FIG. 12D which expands the region of Zone A near the actual returns from the external object. FIG. 12C shows a solid trace that indicates multiple spurious reflections between 60 and 90 meters, which are nearly completely removed in the dashed trace that indicates the corrected range profile. FIG. 12D shows a solid trace that indicates an actual peak at about 1850 m, which is enhanced about 10% in the dashed trace that indicates the corrected range profile. This correction was used to produce the image of walkers' feet in FIG. 13

Figure 13:
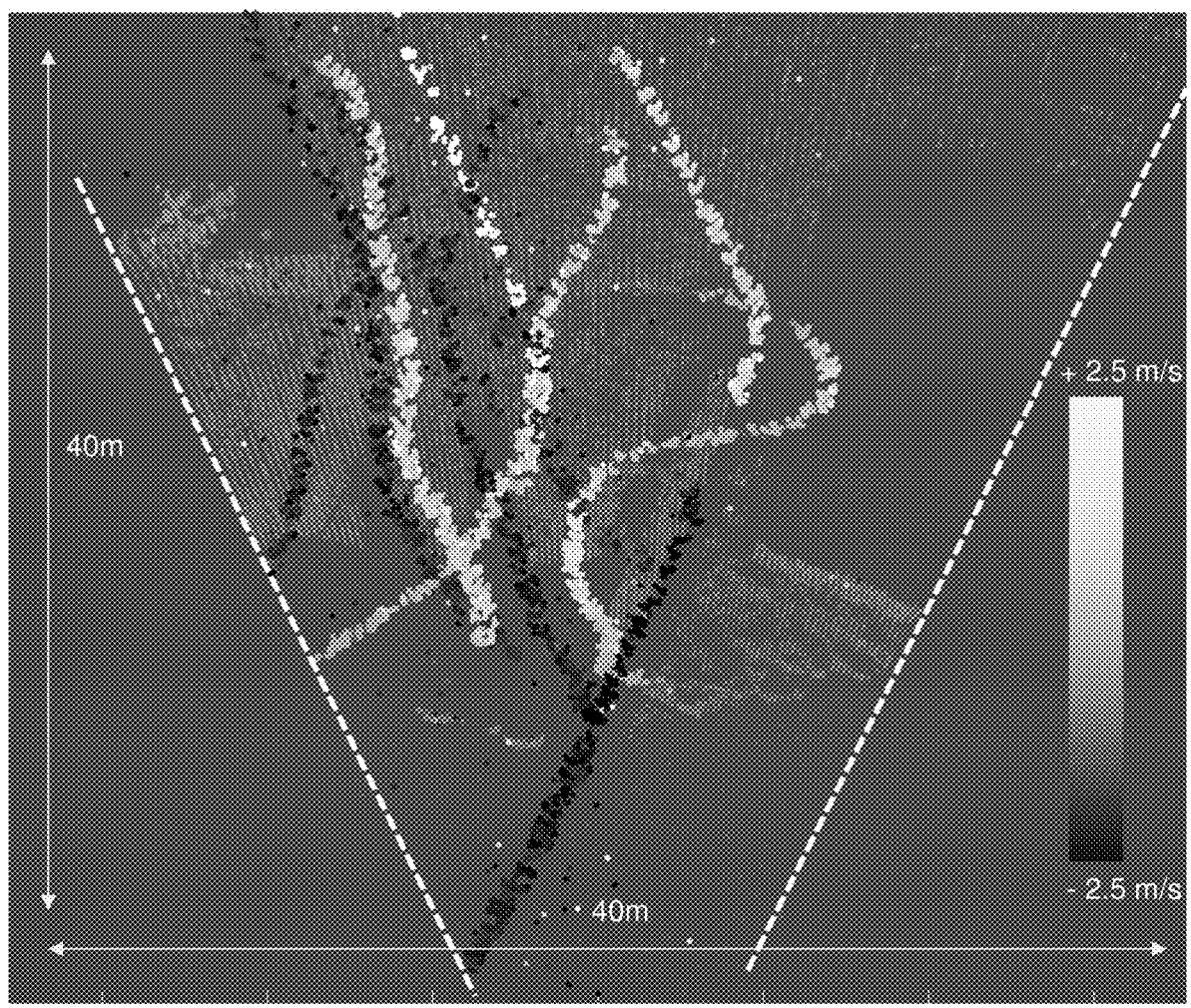
FIG. 13 is an image that illustrates example multiple range returns with multiple different Doppler shifts successfully processed, according to an embodiment.

FIG. 13 is an image that illustrates example multiple range returns with multiple different Doppler shifts successfully processed, according to an embodiment. This image was collected between +/−25 deg in the horizontal (a 50 degree horizontal field of view) and over a 10 deg vertical field of view. The scene was scanned at a 10 Hz frame rate with a vertical zipper pattern. A 2048 code was utilized. It was played out at a 625 Mbps rate and the signal was sampled at 1.25 Gsps. The data was processed and stored in real time using a CUDA implementation of the algorithms described. The scene was a parking lot with several people walking around. The 10 degree vertical angle captured the walker's legs and feet. The coloration shows Doppler value such that the composite of several frames shown shows the tracks of people walking at different rates towards and away from the sensor.

In various embodiments, the desired type of target identification, spatial resolution and accuracy, and object speed resolution and accuracy are used to select values for one or more parameters of the systems described above. Such parameters include one or more of code length, code block length, number of code blocks for averaging, the code itself (looking into engineered codes), shift between signal and code for better detection at long range, optimizations for speed, data acquisition rate, depth of phase modulation, transmitted laser power, laser spot size, scanning method and scan pattern.

5. COMPUTATIONAL HARDWARE OVERVIEW

Figure 14:
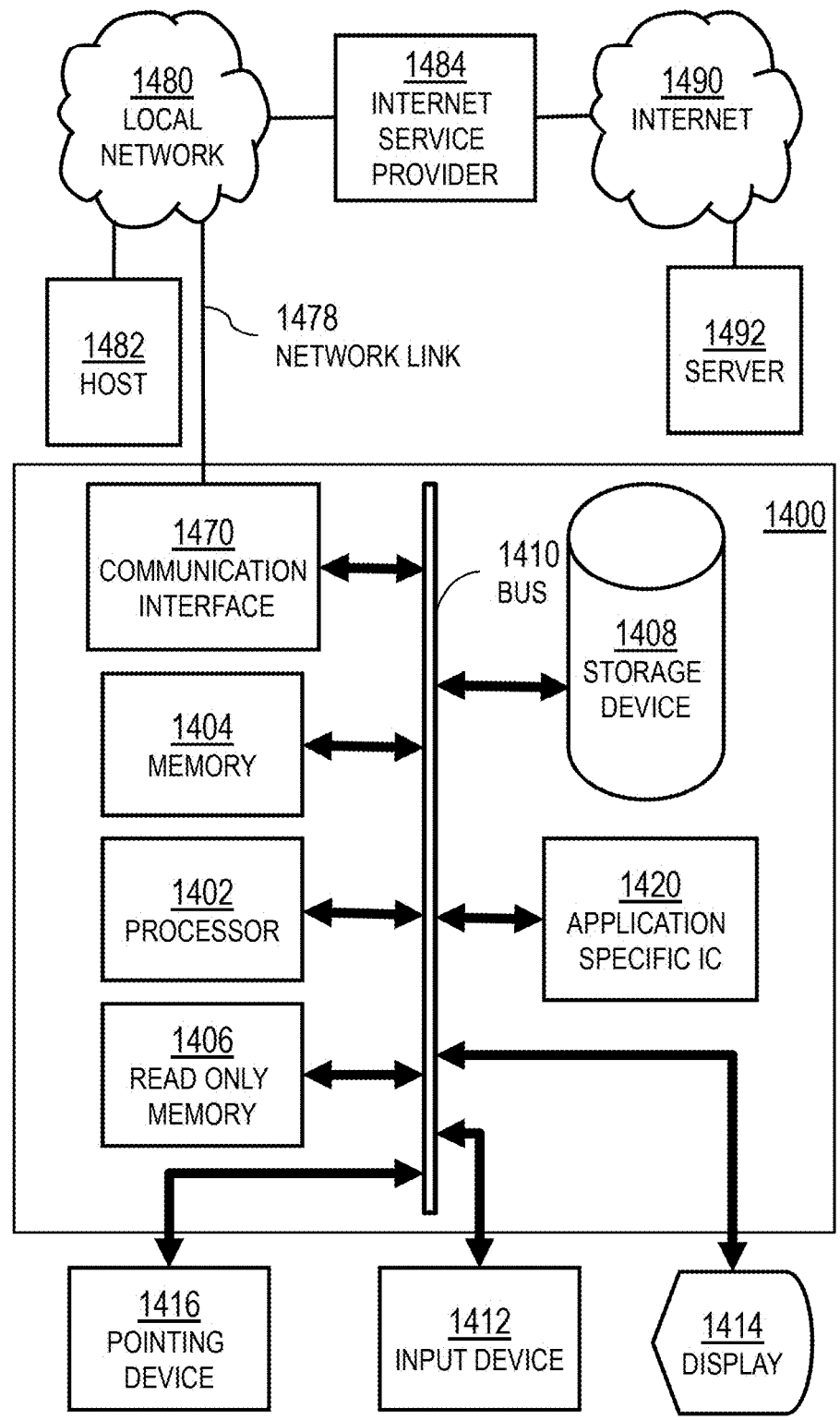
FIG. 14 is a block diagram that illustrates a computer system upon which an embodiment of the invention may be implemented.

FIG. 14 is a block diagram that illustrates a computer system 1400 upon which an embodiment of the invention may be implemented. Computer system 1400 includes a communication mechanism such as a bus 1410 for passing information between other internal and external components of the computer system 1400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit)). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1400, or a portion thereof, constitutes a means for performing one or more steps of one or more methods described herein.

A sequence of binary digits constitutes digital data that is used to represent a number or code for a character. A bus 1410 includes many parallel conductors of information so that information is transferred quickly among devices coupled to the bus 1410. One or more processors 1402 for processing information are coupled with the bus 1410. A processor 1402 performs a set of operations on information. The set of operations include bringing information in from the bus 1410 and placing information on the bus 1410. The set of operations also typically include comparing two or more units of information, shifting positions of units of information, and combining two or more units of information, such as by addition or multiplication. A sequence of operations to be executed by the processor 1402 constitutes computer instructions.

Computer system 1400 also includes a memory 1404 coupled to bus 1410. The memory 1404, such as a random access memory (RAM) or other dynamic storage device, stores information including computer instructions. Dynamic memory allows information stored therein to be changed by the computer system 1400. RAM allows a unit of information stored at a location called a memory address to be stored and retrieved independently of information at neighboring addresses. The memory 1404 is also used by the processor 1402 to store temporary values during execution of computer instructions. The computer system 1400 also includes a read only memory (ROM) 1406 or other static storage device coupled to the bus 1410 for storing static information, including instructions, that is not changed by the computer system 1400. Also coupled to bus 1410 is a non-volatile (persistent) storage device 1408, such as a magnetic disk or optical disk, for storing information, including instructions, that persists even when the computer system 1400 is turned off or otherwise loses power.

Information, including instructions, is provided to the bus 1410 for use by the processor from an external input device 1412, such as a keyboard containing alphanumeric keys operated by a human user, or a sensor. A sensor detects conditions in its vicinity and transforms those detections into signals compatible with the signals used to represent information in computer system 1400. Other external devices coupled to bus 1410, used primarily for interacting with humans, include a display device 1414, such as a cathode ray tube (CRT) or a liquid crystal display (LCD), for presenting images, and a pointing device 1416, such as a mouse or a trackball or cursor direction keys, for controlling a position of a small cursor image presented on the display 1414 and issuing commands associated with graphical elements presented on the display 1414.

In the illustrated embodiment, special purpose hardware, such as an application specific integrated circuit (IC) 1420, is coupled to bus 1410. The special purpose hardware is configured to perform operations not performed by processor 1402 quickly enough for special purposes. Examples of application specific ICs include graphics accelerator cards for generating images for display 1414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1400 also includes one or more instances of a communications interface 1470 coupled to bus 1410. Communication interface 1470 provides a two-way communication coupling to a variety of external devices that operate with their own processors, such as printers, scanners and external disks. In general the coupling is with a network link 1478 that is connected to a local network 1480 to which a variety of external devices with their own processors are connected. For example, communication interface 1470 may be a parallel port or a serial port or a universal serial bus (USB) port on a personal computer. In some embodiments, communications interface 1470 is an integrated services digital network (ISDN) card or a digital subscriber line (DSL) card or a telephone modem that provides an information communication connection to a corresponding type of telephone line. In some embodiments, a communication interface 1470 is a cable modem that converts signals on bus 1410 into signals for a communication connection over a coaxial cable or into optical signals for a communication connection over a fiber optic cable. As another example, communications interface 1470 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1470 sends and receives electrical, acoustic or electromagnetic signals, including infrared and optical signals, that carry information streams, such as digital data.

The term computer-readable medium is used herein to refer to any medium that participates in providing information to processor 1402, including instructions for execution. Such a medium may take many forms, including, but not limited to, non-volatile media, volatile media and transmission media. Non-volatile media include, for example, optical or magnetic disks, such as storage device 1408. Volatile media include, for example, dynamic memory 1404. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1402, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1402, except for carrier waves and other signals.

Logic encoded in one or more tangible media includes one or both of processor instructions on a computer-readable storage media and special purpose hardware, such as ASIC 1420.

Network link 1478 typically provides information communication through one or more networks to other devices that use or process the information. For example, network link 1478 may provide a connection through local network 1480 to a host computer 1482 or to equipment 1484 operated by an Internet Service Provider (ISP). ISP equipment 1484 in turn provides data communication services through the public, world-wide packet-switching communication network of networks now commonly referred to as the Internet 1490. A computer called a server 1492 connected to the Internet provides a service in response to information received over the Internet. For example, server 1492 provides information representing video data for presentation at display 1414.

The invention is related to the use of computer system 1400 for implementing the techniques described herein. According to one embodiment of the invention, those techniques are performed by computer system 1400 in response to processor 1402 executing one or more sequences of one or more instructions contained in memory 1404. Such instructions, also called software and program code, may be read into memory 1404 from another computer-readable medium such as storage device 1408. Execution of the sequences of instructions contained in memory 1404 causes processor 1402 to perform the method steps described herein. In alternative embodiments, hardware, such as application specific integrated circuit 1420, may be used in place of or in combination with software to implement the invention. Thus, embodiments of the invention are not limited to any specific combination of hardware and software.

The signals transmitted over network link 1478 and other networks through communications interface 1470, carry information to and from computer system 1400. Computer system 1400 can send and receive information, including program code, through the networks 1480, 1490 among others, through network link 1478 and communications interface 1470. In an example using the Internet 1490, a server 1492 transmits program code for a particular application, requested by a message sent from computer 1400, through Internet 1490, ISP equipment 1484, local network 1480 and communications interface 1470. The received code may be executed by processor 1402 as it is received, or may be stored in storage device 1408 or other non-volatile storage for later execution, or both. In this manner, computer system 1400 may obtain application program code in the form of a signal on a carrier wave.

Various forms of computer readable media may be involved in carrying one or more sequence of instructions or data or both to processor 1402 for execution. For example, instructions and data may initially be carried on a magnetic disk of a remote computer such as host 1482. The remote computer loads the instructions and data into its dynamic memory and sends the instructions and data over a telephone line using a modem. A modem local to the computer system 1400 receives the instructions and data on a telephone line and uses an infra-red transmitter to convert the instructions and data to a signal on an infra-red a carrier wave serving as the network link 1478. An infrared detector serving as communications interface 1470 receives the instructions and data carried in the infrared signal and places information representing the instructions and data onto bus 1410. Bus 1410 carries the information to memory 1404 from which processor 1402 retrieves and executes the instructions using some of the data sent with the instructions. The instructions and data received in memory 1404 may optionally be stored on storage device 1408, either before or after execution by the processor 1402.

Figure 15:
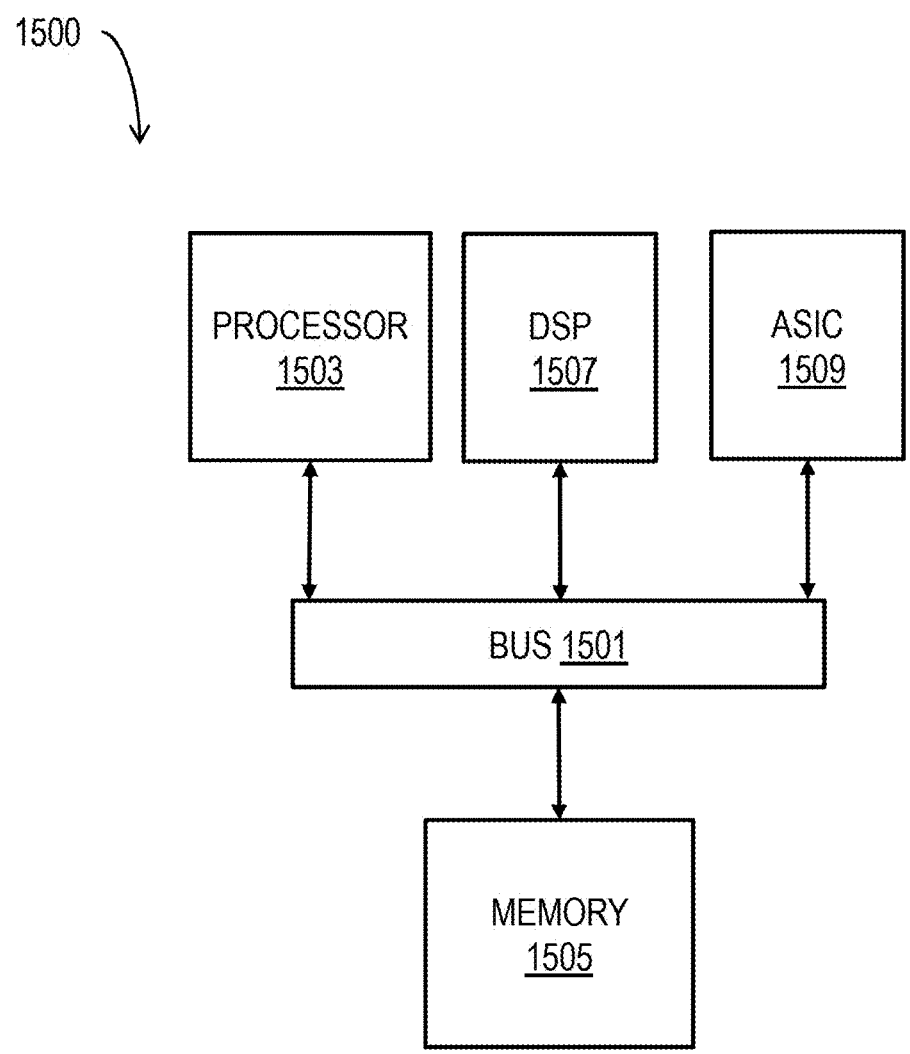
FIG. 15 illustrates a chip set upon which an embodiment of the invention may be implemented.

FIG. 15 illustrates a chip set 1500 upon which an embodiment of the invention may be implemented. Chip set 1500 is programmed to perform one or more steps of a method described herein and includes, for instance, the processor and memory components described with respect to FIG. 14 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1500, or a portion thereof, constitutes a means for performing one or more steps of a method described herein.

In one embodiment, the chip set 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1503 and accompanying components have connectivity to the memory 1505 via the bus 1501. The memory 1505 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1505 also stores the data associated with or generated by the execution of one or more steps of the methods described herein.

6. ALTERATIONS, EXTENSIONS AND MODIFICATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

7. REFERENCES

The following references were cited herein, the entire contents of each of which are hereby incorporated by reference as if fully set forth herein, except for terminology inconsistent with that used herein.

Foucras, M. et al., 2014, "Detailed Analysis of the Impact of the Code Doppler on the Acquisition Performance of New GNSS Signals," ION ITM 2014, International Technical Meeting of The Institute of Navigation, San Diego, United States. January 2014.

Kachelmyer, A. L., 1990, "Range-Doppler Imaging with a Laser Radar", The Lincoln Laboratory Journal, v 3 (1), pp 87-118.

Krasner, N. F., 1998, "GPS Receiver and Method for Processing GPS Signals," U.S. Pat. No. 5,781,156, July 1998.

What is claimed is:

1. A light detection and ranging (LIDAR) system for a vehicle, the LIDAR system comprising:
    a transmitter configured to transmit a frequency-modulated signal that is generated by modulating a laser signal from a laser;
    a receiver configured to receive a returned signal in response to transmitting the frequency-modulated signal; and
    a processor configured to
        determine a Doppler frequency shift of the returned signal,
        determine, based on a Fourier Transform, a correlation of the transmitted frequency-modulated signal and the returned signal,
        determine, based on the Doppler frequency shift, a corrected correlation of the transmitted frequency-modulated signal and the returned signal,
        determine a range based on a time lag of a peak in the corrected correlation, and
        provide data including the range to an autonomous vehicle such that the vehicle is operated based on the data.

2. The LIDAR system according to claim 1, wherein the processor is configured to determine the Doppler frequency shift of the returned signal relative to a reference spectrum.

3. The LIDAR system according to claim 1, wherein the frequency-modulated signal is generated by modulating the laser signal using wideband radio frequency (RF) electrical signals.

4. The LIDAR system according to claim 1, further comprising an optical mixer configured to mix the returned signal with a reference signal to generate a mixed optical signal with a beat frequency, wherein
    the reference signal is generated based on the laser signal, and
    the beat frequency is in an RF band that is proportional to a difference in frequencies between the reference and the returned signal.

5. The LIDAR system according to claim 1, further comprising an optical mixer, wherein
    the optical mixer is configured to mix the returned signal with a reference signal to generate an electrical signal, wherein the reference signal is generated based on the laser signal;
    the processor is further configured to determine a cross spectrum between an in-phase component of the electrical signal and a quadrature component of the electrical signal; and
    the processor is further configured to determine the Doppler frequency shift of the returned signal based on the cross spectrum.

6. The LIDAR system according to claim 5, wherein in determining the Doppler frequency shift of the returned signal, the processor is further configured to:
    determine the Doppler frequency shift of the returned signal based on a peak in the cross spectrum.

7. The LIDAR system according to claim 5, wherein in determining the Doppler frequency shift based on the cross spectrum, the processor is further configured:
    to determine the Doppler frequency shift based on a peak in an imaginary part of the cross spectrum.

8. The LIDAR system according to claim 5, further comprising:
    an optical detector configured to detect mixed signals to generate the electrical signal.

9. The LIDAR system according to claim 8, wherein
    the optical mixer is configured to mix the returned signal with the reference signal to generate an in-phase optical signal and a quadrature optical signal, the optical detector is configured to detect the in-phase optical signal and the quadrature optical signal to generate a first electrical signal and a second electrical signal, respectively, and the processor is configured to determine the cross spectrum between the first electrical signal and the second electrical signal.

10. The LIDAR system according to claim 1, further comprising:

a display device, wherein the transmitter is configured to transmit the frequency-modulated signal to a plurality of spots, and the processor is configured to present on the display device an image that indicates a Doppler corrected position of at least one object located at the plurality of spots.

11. The LIDAR system according to claim 1, wherein the transmitter is configured to transmit the frequency-modulated signal to a plurality of spots, and the processor is configured to communicate, to the vehicle, data that identifies at least one object based on a point cloud of Doppler corrected positions at the plurality of spots.

12. The LIDAR system according to claim 1, further comprising:

a display device, wherein the transmitter is configured to transmit the frequency-modulated signal to a plurality of spots, and the processor is configured to present on the display device an image that indicates the Doppler frequency shift that is mapped to a corresponding spot among the plurality of spots, such that moving objects are distinguished from stationary objects.

13. A method for controlling a light detection and ranging (LIDAR) system that comprises a transmitter, a receiver and a processor, the method comprising:

transmitting, by the transmitter, a frequency-modulated signal that is generated by modulating a laser signal from a laser;

receiving, by the receiver, a returned signal in response to transmitting the frequency-modulated signal;

determining, by the processor, a Doppler frequency shift of the returned signal;

determining, by the processor based on a Fourier Transform, a correlation of the transmitted frequency-modulated signal and the returned signal;

determining, by the processor based on the Doppler frequency shift, a corrected correlation of the transmitted frequency-modulated signal and the returned signal;

determining, by the processor, a range based on a time lag of a peak in the corrected correlation; and providing, by the processor, data including the range to an autonomous vehicle such that the vehicle is operated based on the data.

14. The method according to claim 13, further comprising:

determining the Doppler frequency shift of the returned signal relative to a reference spectrum.

15. The method according to claim 13, further comprising:

generating the frequency-modulated signal by modulating the laser signal using wideband radio frequency (RF) electrical signals.

16. The method according to claim 13, further comprising:

mixing, by an optical mixer of the LIDAR system, the returned signal with a reference signal to generate a mixed optical signal with a beat frequency, wherein the reference signal is generated based on the laser signal, and the beat frequency is in an RF band that is proportional to a difference in frequencies between the reference and the returned signal.

17. The method according to claim 13, further comprising:

mixing, by an optical mixer of the LIDAR system, the returned signal with a reference signal to generate an electrical signal, wherein the reference signal is generated based on the laser signal;

determining, by the processor, a cross spectrum between an in-phase component of the electrical signal and a quadrature component of the electrical signal; and determining, by the processor, the Doppler frequency shift of the returned signal based on the cross spectrum.

18. The method according to claim 17, wherein determining the Doppler frequency shift of the returned signal comprises:

determining the Doppler frequency shift of the returned signal based on a peak in the cross spectrum.

19. The method according to claim 17, wherein determining the Doppler frequency shift based on the cross spectrum comprises:

determining the Doppler frequency shift based on a peak in an imaginary part of the cross spectrum.

20. An autonomous vehicle control system comprising:

a transmitter configured to transmit a frequency-modulated signal that is generated by modulating a laser signal from a laser;

a receiver configured to receive a returned signal in response to transmitting the frequency-modulated signal; and a processor configured to:

determine a Doppler frequency shift of the returned signal;

determine, based on a Fourier Transform, a correlation of the transmitted frequency-modulated signal and the returned signal;

determine, based on the Doppler frequency shift, a corrected correlation of the transmitted frequency-modulated signal and the returned signal;

determine a range based on a time lag of a peak in the corrected correlation, and control operation of an autonomous vehicle using the range.

* * * * *